(12) United States Patent
Oswald et al.

(10) Patent No.: US 9,372,263 B2
(45) Date of Patent: Jun. 21, 2016

(54) RADAR SYSTEM AND METHOD

(75) Inventors: Gordon Kenneth Andrew Oswald, Huntingdon (GB); Craig Duncan Webster, Histon (GB); Allan Geoffrey Smithson, Linton (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 12/995,169

(22) PCT Filed: Dec. 3, 2008

(86) PCT No.: PCT/GB2008/003997
§ 371 (c)(1),
(2), (4) Date: Jun. 21, 2011

(87) PCT Pub. No.: WO2009/144435
PCT Pub. Date: Dec. 3, 2009

(65) Prior Publication Data
US 2011/0241928 A1 Oct. 6, 2011

(30) Foreign Application Priority Data

May 29, 2008 (WO) ................ PCT/GB2008/001816

(51) Int. Cl.
*G01S 13/58* (2006.01)
*G01S 13/95* (2006.01)
(Continued)

(52) U.S. Cl.
CPC .............. *G01S 13/951* (2013.01); *G01S 13/42* (2013.01); *G01S 13/87* (2013.01); *G01S 2013/0263* (2013.01); *Y02B 10/30* (2013.01)

(58) Field of Classification Search
CPC ..... G01S 7/415; G01S 13/5244; G01S 7/414; G01S 13/87; H01Q 11/10; H01Q 21/24
USPC .................... 342/90, 107–109, 114, 159, 160
See application file for complete search history.

(56) References Cited

U.S. PATENT DOCUMENTS

| 3,828,348 A | 8/1974 | Murray, Jr. |
| 3,935,572 A * | 1/1976 | Broniwitz .............. H01Q 1/421 342/107 |

(Continued)

FOREIGN PATENT DOCUMENTS

| EP | 0 443 243 A2 | 8/1991 |
| EP | 1 571 462 | 9/2005 |

(Continued)

OTHER PUBLICATIONS

PCT Notification of Transmittal of International Preliminary Examination Report on Patentability for PCT Application No. PCT/GB2008/001816, 8 pgs. (Oct. 21, 2009).

(Continued)

*Primary Examiner* — John B Sotomayor
*Assistant Examiner* — Marcus Windrich
(74) *Attorney, Agent, or Firm* — Blakely, Sokoloff, Taylor & Zafman LLP

(57) ABSTRACT

A radar system for discriminating between sources of radar interference and targets of interest. The system includes a transmitter for transmitting radar signals into a region, a receiver for receiving return signals of the radar signals returned from within the region, and a processor for processing the return signals to discriminate between return signals returned from a first object and return signals returned from a second object where the return signals from the second object comprise both zero and non-zero Doppler components and interfere with the return signals from the first object. The radar system is operable for discriminating between the return signals when the return signals are received at a distance from the second object which is less than a proximity limit based on the geometry of the object.

17 Claims, 25 Drawing Sheets

(51) Int. Cl.
G01S 13/42 (2006.01)
G01S 13/87 (2006.01)
G01S 13/02 (2006.01)

(56) References Cited

U.S. PATENT DOCUMENTS

| | | | |
|---|---|---|---|
| 4,241,347 A | 12/1980 | Albanese et al. | |
| 4,275,396 A | 6/1981 | Jacomini | |
| 4,318,102 A | 3/1982 | Poirier | |
| 4,649,388 A * | 3/1987 | Atlas | 342/26 D |
| 5,231,402 A * | 7/1993 | Ludloff | G01S 13/52 342/192 |
| 5,262,782 A | 11/1993 | Rubin et al. | |
| 5,481,270 A | 1/1996 | Urkowitz et al. | |
| 5,485,157 A * | 1/1996 | Long | G01S 13/5244 342/159 |
| 5,568,151 A * | 10/1996 | Merritt | 342/192 |
| 6,288,672 B1 | 9/2001 | Asano et al. | |
| 6,400,306 B1 * | 6/2002 | Nohara | G01S 13/5244 342/160 |
| 7,145,503 B2 * | 12/2006 | Abramovich et al. | 342/159 |
| 7,154,433 B1 | 12/2006 | Madewell | |
| 7,195,445 B2 | 3/2007 | Wobben | |
| 7,626,536 B1 | 12/2009 | Rihaczek et al. | |
| 7,916,068 B2 * | 3/2011 | Wicks et al. | 342/162 |
| 8,314,732 B2 * | 11/2012 | Oswald et al. | 342/114 |
| 8,860,604 B2 | 10/2014 | Oswald | |
| 2003/0142011 A1 * | 7/2003 | Abramovich | G01S 7/352 342/159 |
| 2003/0210169 A1 | 11/2003 | Steele et al. | |
| 2004/0150552 A1 | 8/2004 | Barbella et al. | |
| 2006/0179934 A1 | 8/2006 | Smith et al. | |
| 2006/0203224 A1 | 9/2006 | Sebastian et al. | |
| 2008/0001808 A1 | 1/2008 | Passarelli et al. | |
| 2008/0111731 A1 * | 5/2008 | Hubbard | G01S 13/5246 342/160 |
| 2009/0027257 A1 * | 1/2009 | Arikan | G01S 7/292 342/159 |
| 2009/0202347 A1 * | 8/2009 | Rugger | F03D 7/0204 416/31 |
| 2009/0303107 A1 | 12/2009 | Ando | |
| 2010/0265122 A1 | 10/2010 | Oswald | |

FOREIGN PATENT DOCUMENTS

| | | |
|---|---|---|
| EP | 1916541 A1 | 4/2008 |
| FR | 2 769 373 A1 | 4/1999 |
| GB | 2 387 053 A | 10/2012 |
| WO | WO 97/14058 | 4/1997 |
| WO | WO 01/59473 | 8/2001 |
| WO | WO 2005/038488 | 4/2005 |
| WO | WO 2007/046082 | 4/2007 |
| WO | WO 2008/105892 A2 | 9/2008 |
| WO | WO 2008/145993 | 12/2008 |

OTHER PUBLICATIONS

William H. Long, et al., "Chapter 17—Pulse Doppler Radar", Radar Handbook (2nd Edition), (edited by: Skolnik, Merrill I.), 1990 McGraw-Hill, retrieved from the Internet: http://www.knovel.com/web/portal/browse/display?_EXT_KNOVEL_DISPLAY_bookid=701&VerticalID=0, XP-002516141, 44 pgs., (1990).

Takayuki Inaba, "Element-Localized Doppler STAP (Space Time Adaptive Processing) for Clutter Suppression in Automotive Forward-Looking Radar", Electronics and Communications in Japan, Part 1, vol. 90, No. 1, XP-007910151, pp. 77-89, (2007).

Koen Van Caekenberghe, et al., "Monopulse-Doppler Radar Front-End Concept for Automotive Applications based on RF MEMS Technology", 2006 IEEE International Conference on Electro/Information Technology, 5 pgs., (May 2006).

Gaspare Galati, et al., "A short-range, high-resolution millimeter-wave surface movement radar", Annals of Telecommunication, vol. 52, No. 3-4, XP-007910158, pp. 224-229, (1997).

PCT Notification of Transmittal of the International Search Report and the Written Opinion of the International Searching Authority, or the Declaration for PCT Application No. PCT/GB2008/001816, 19 pgs., (May 7, 2009).

Merrill Skolnik, "Attributes of the Ubiquitous Phased Array Radar", IEEE Phased Array Systems and Technology Symposium, pp. 101-106, (Oct. 14-17, 2003).

Patents Act 1977: Search Report under Section 17 for United Kingdom Application No. GB0710209.8, 1 pg., (Sep. 7, 2007).

PCT International Search Report for PCT Counterpart Application No. PCT/GB2008/003997 containing Communication relating to the Results of the Partial International Search Report, 5 pgs., (Jun. 9, 2009).

James Perry, et al., "Wind Farm Clutter Mitigation in Air Surveillance Radar", Radar Conference, 2007 IEEE, pp. 93-98, (Apr. 1, 2007).

Gerhard Greving, et al., "Application of the Radar Cross Section RCS for Objects on the Ground—Example of Wind Turbines", International Radar Symposium, IRS 2006, pp. 1-4, (May 21, 2008).

Cambridge Consultants, "Cambridge Consultants Presents Low-Cost Solution to Current Wind Farm Conflict", XP-002520627, retrieved from the Internet on Mar. 23, 2009: http://www.cambridgeconsultants.com/news_pr202.html, 2 pgs., (Feb. 27, 2008).

Extended European Search Report for EP Counterpart Patent Application No. 11168622.6-2220, 8 pgs. (Aug. 25, 2011).

Dong-Ping Liao, et al., "Identification of Air Targets Based on Dopple Spectrum Features," Modern Radar, vol. 27, No. 6, pp. 8-11 (Jun. 2005).

Patents Act 1977: Further Search Report under Section 17 for United Kingdom Counterpart Application No. GB1021882.4, 2 pgs., (Aug. 13, 2012).

PCT International Search Report for PCT Application No. PCT/GB2008/001816 containing Communication relating to the Results of the Partial International Search Report, 2 pages, (Mar. 4, 2009).

Search and Examination Report for GB1021882.4, 3 pages, (Aug. 13, 2012).

Non-Final Office Action for U.S. Appl. No. 12/602,496, mailed Mar. 26, 2012, 13 pages.

Final Office Action for U.S. Appl. No. 12/602,496, mailed Oct. 17, 2012, 13 pages.

Non-Final Office Action for U.S. Appl. No. 12/602,496, mailed Apr. 15, 2013, 13 pages.

Non-Final Office Action for U.S. Appl. No. 12/602,496, mailed Nov. 21, 2013, 14 pages.

Notice of Allowance for U.S. Appl. No. 12/602,496, mailed Jun. 9, 2014, 8 pages.

* cited by examiner

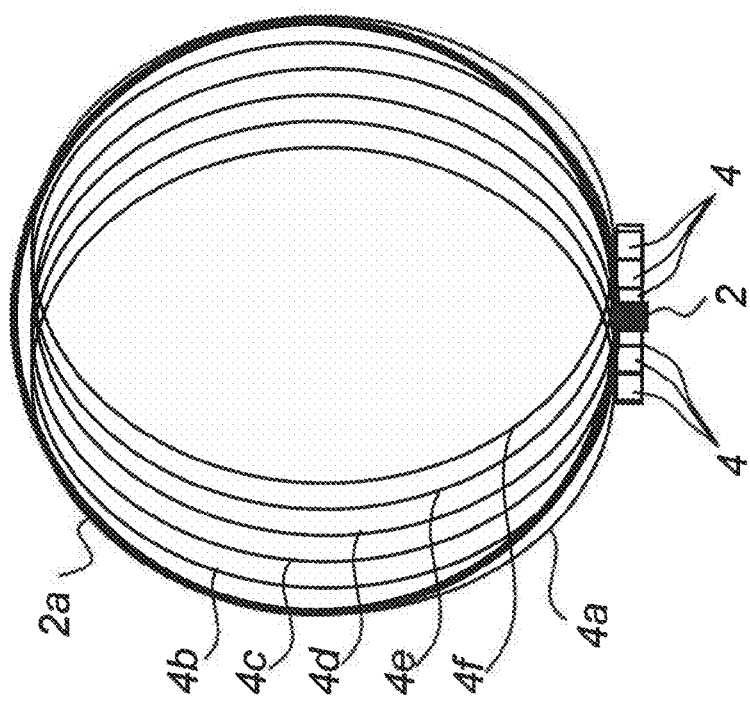
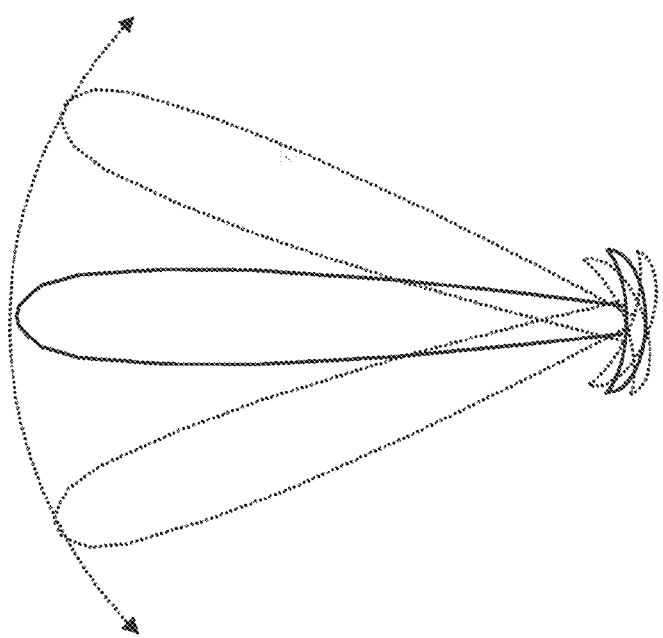
Fig 1(b)
Fig 1(a)

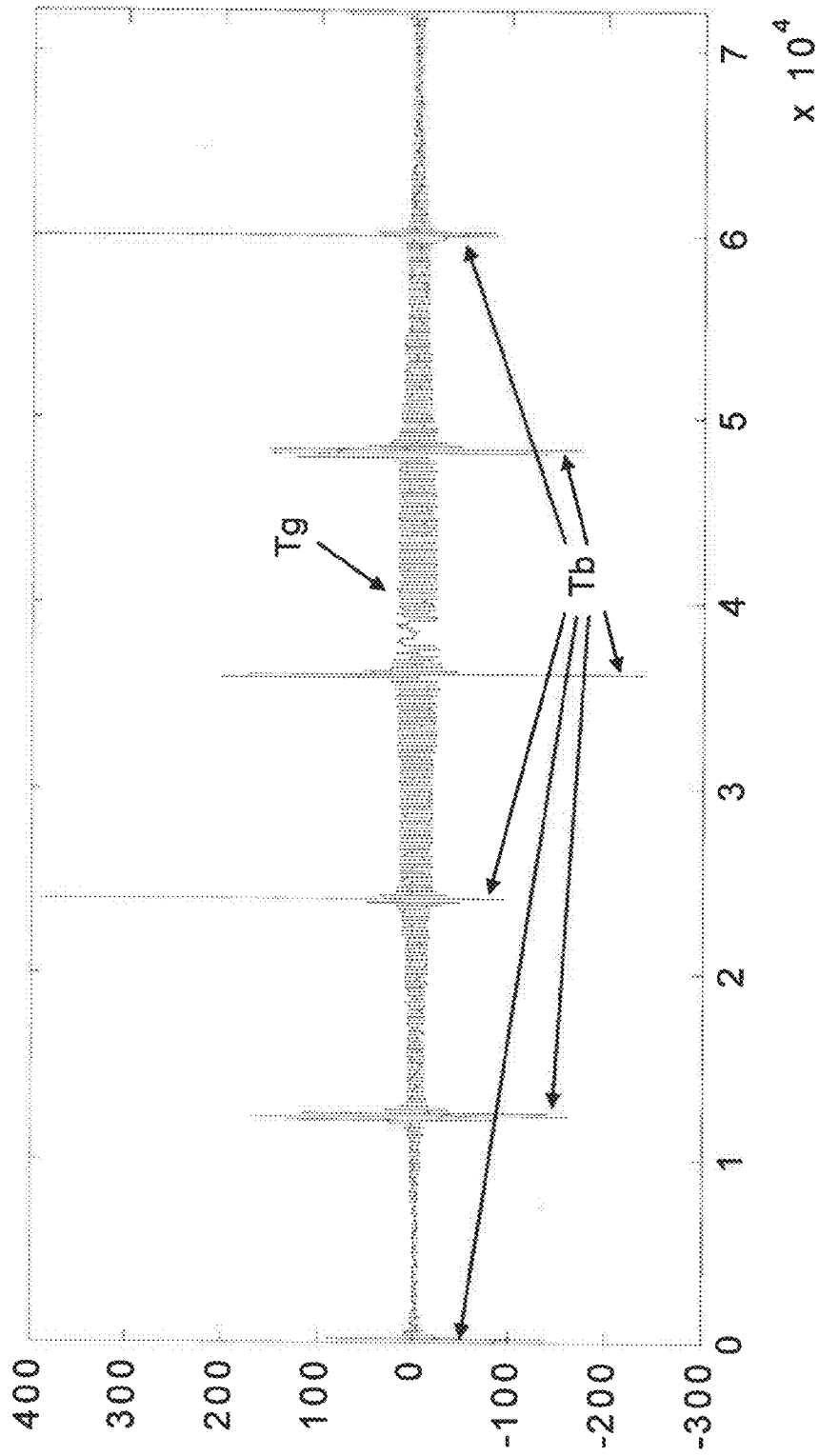

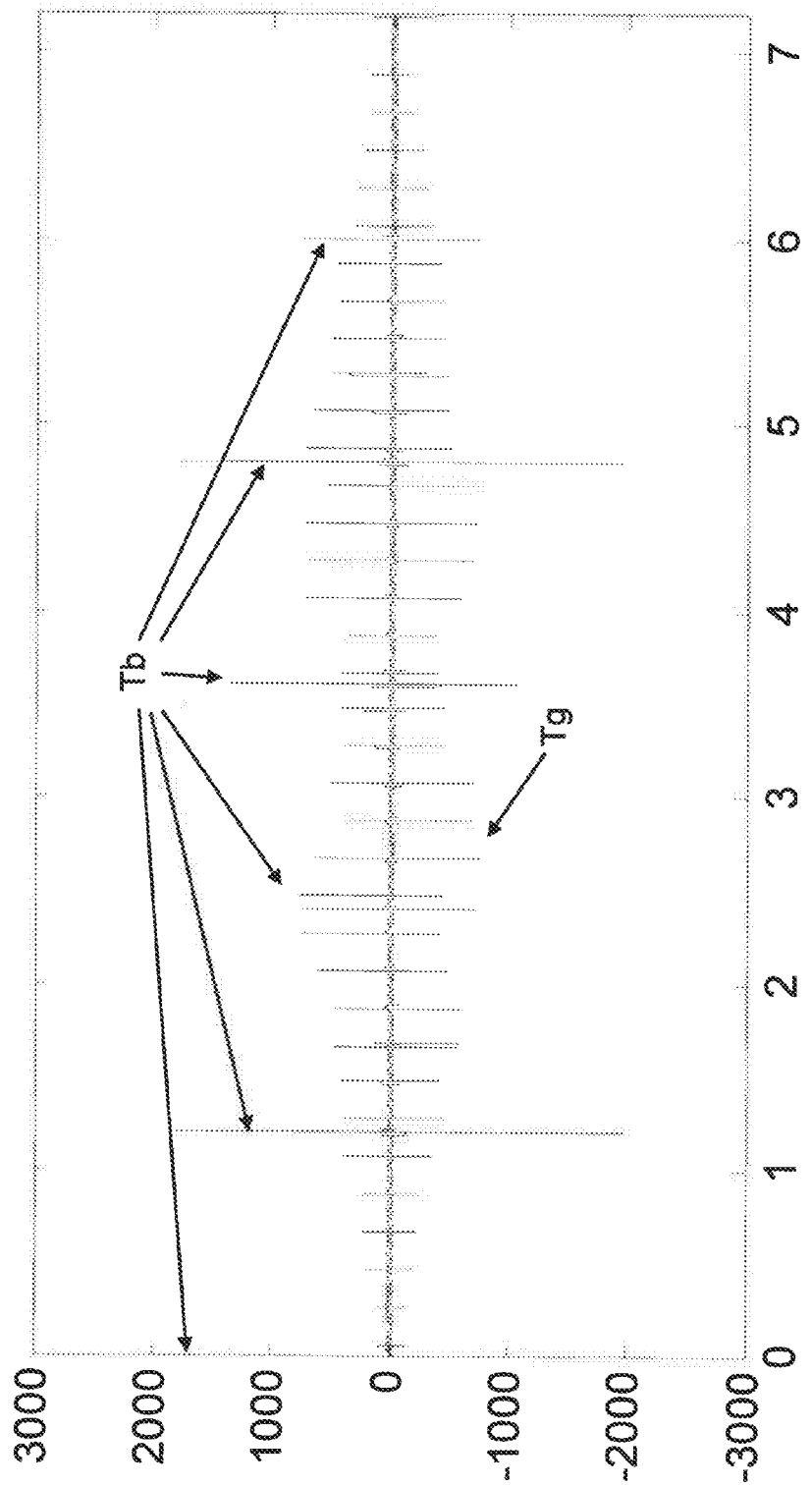

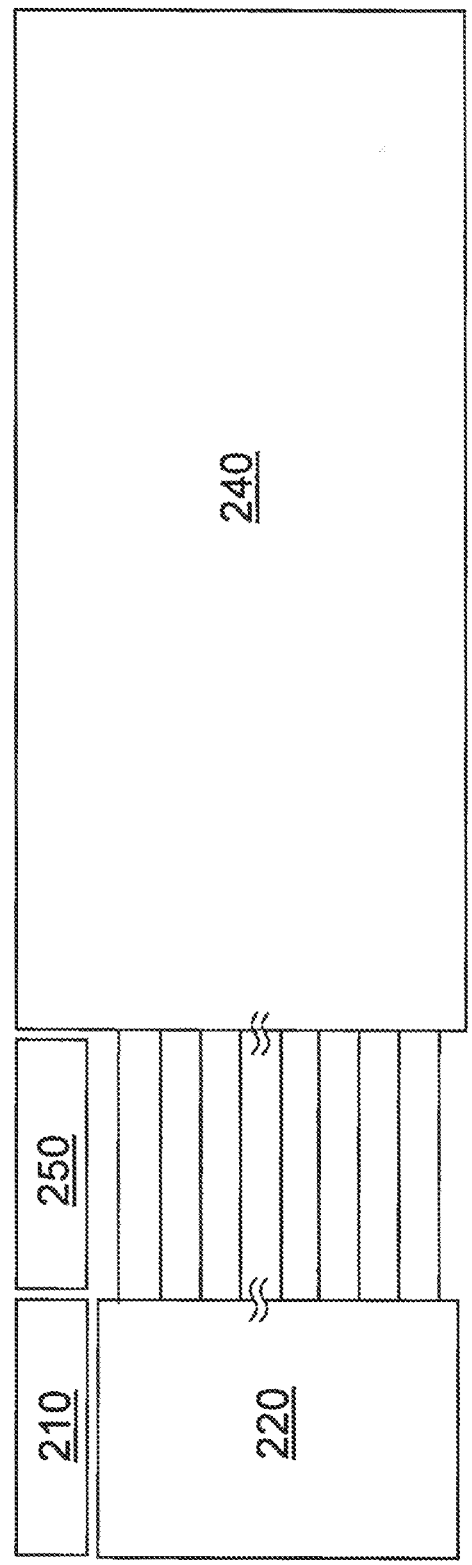

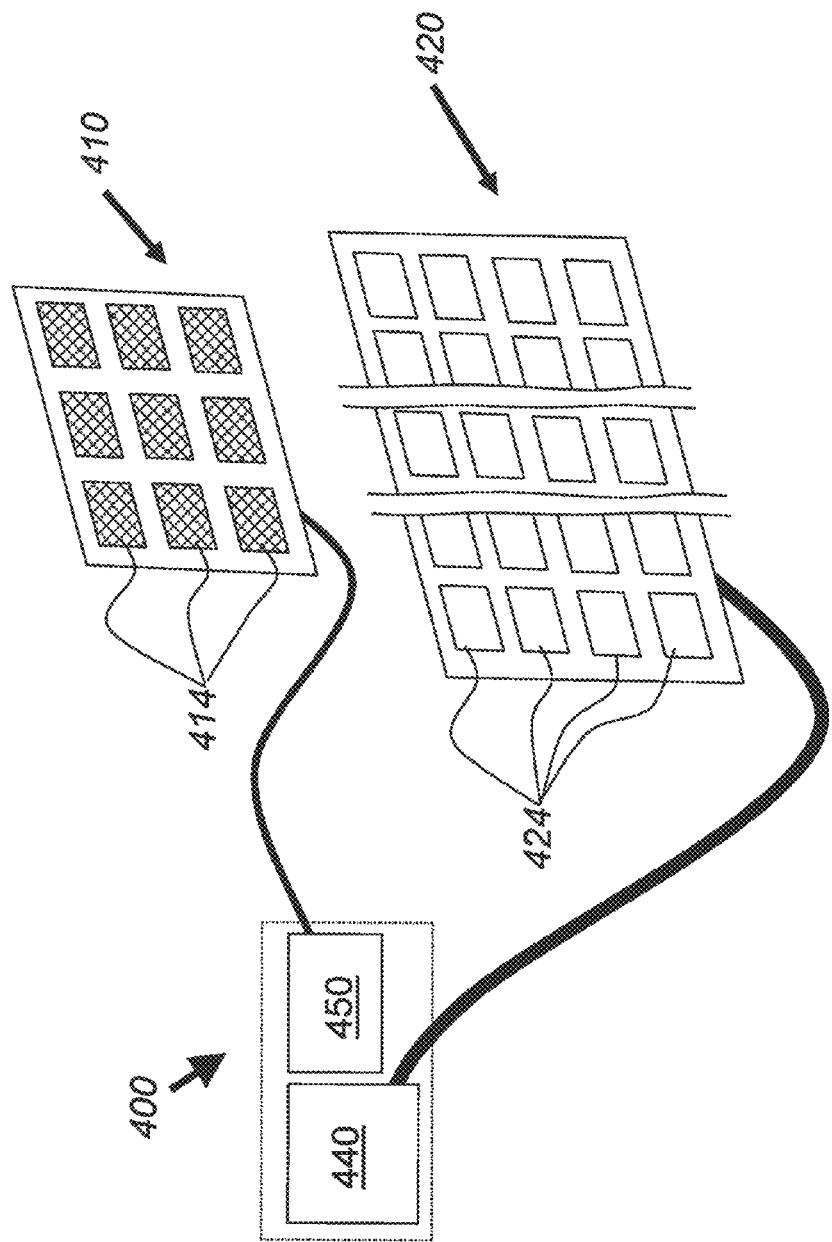

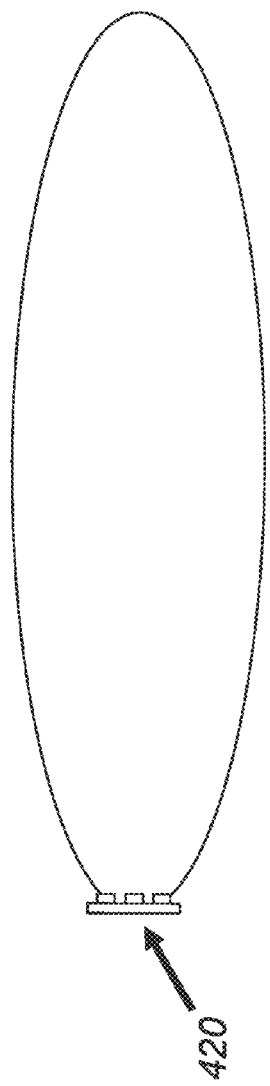
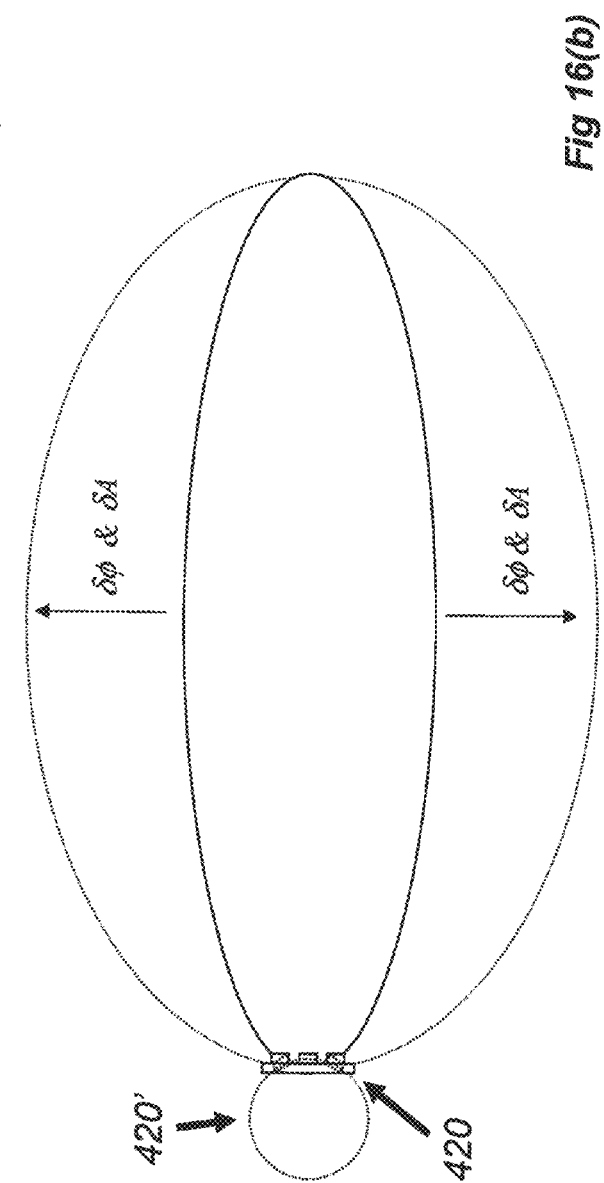
Fig 16(a)
Fig 16(b)

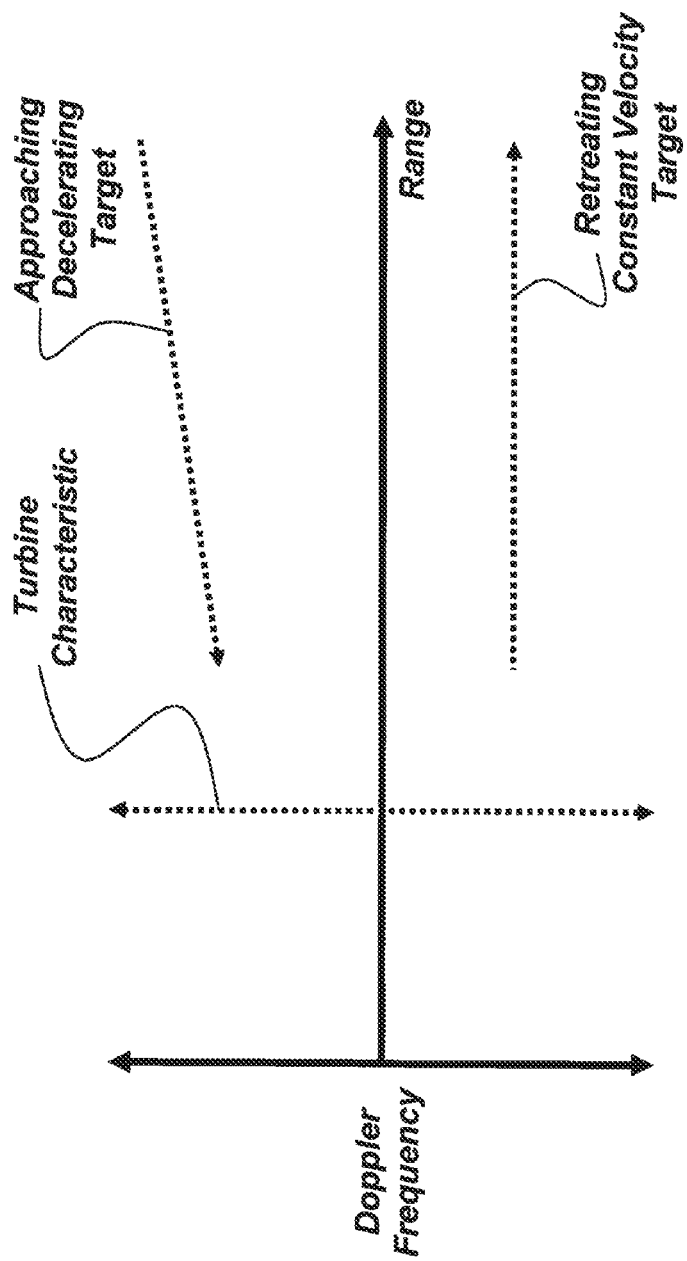

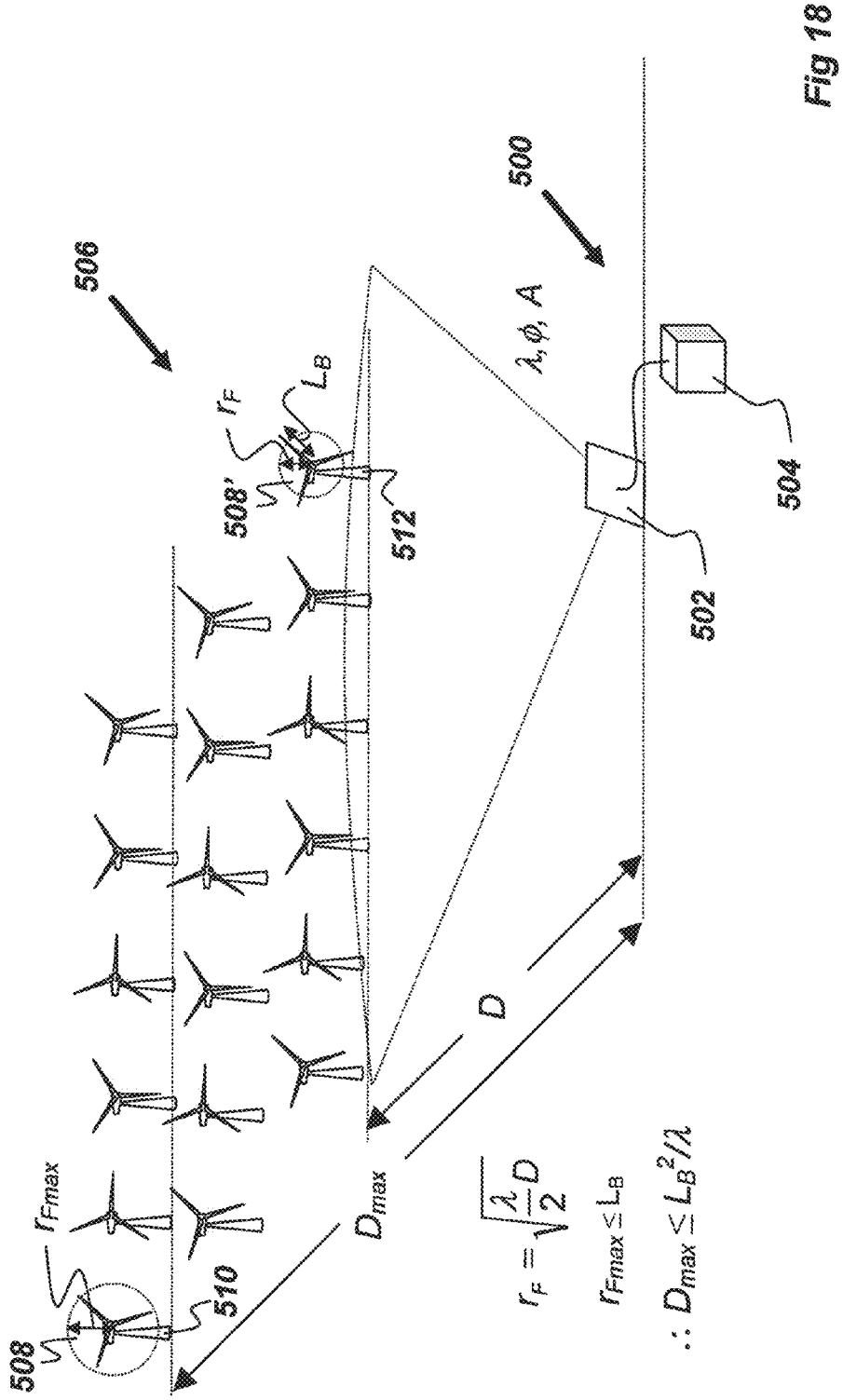

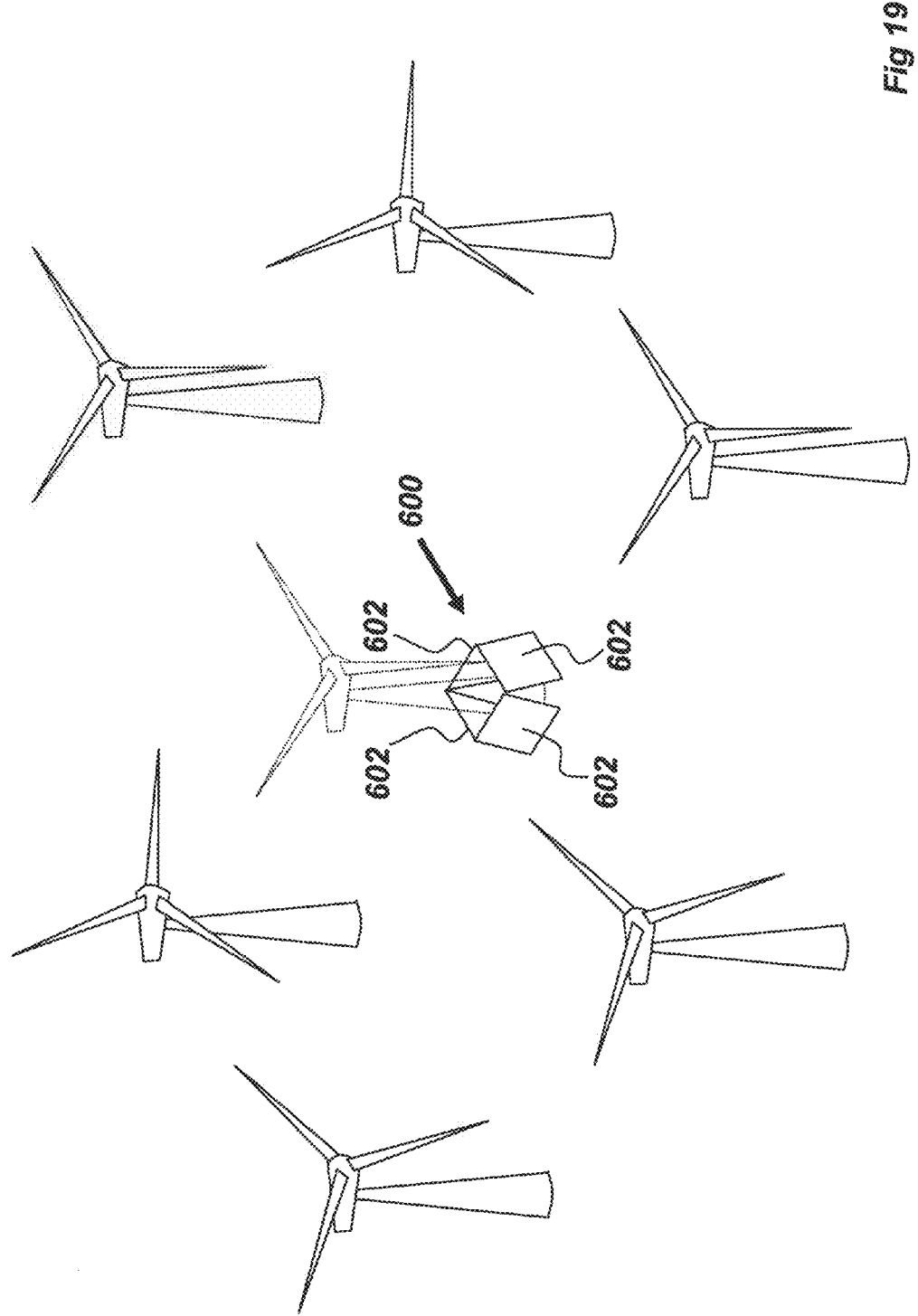

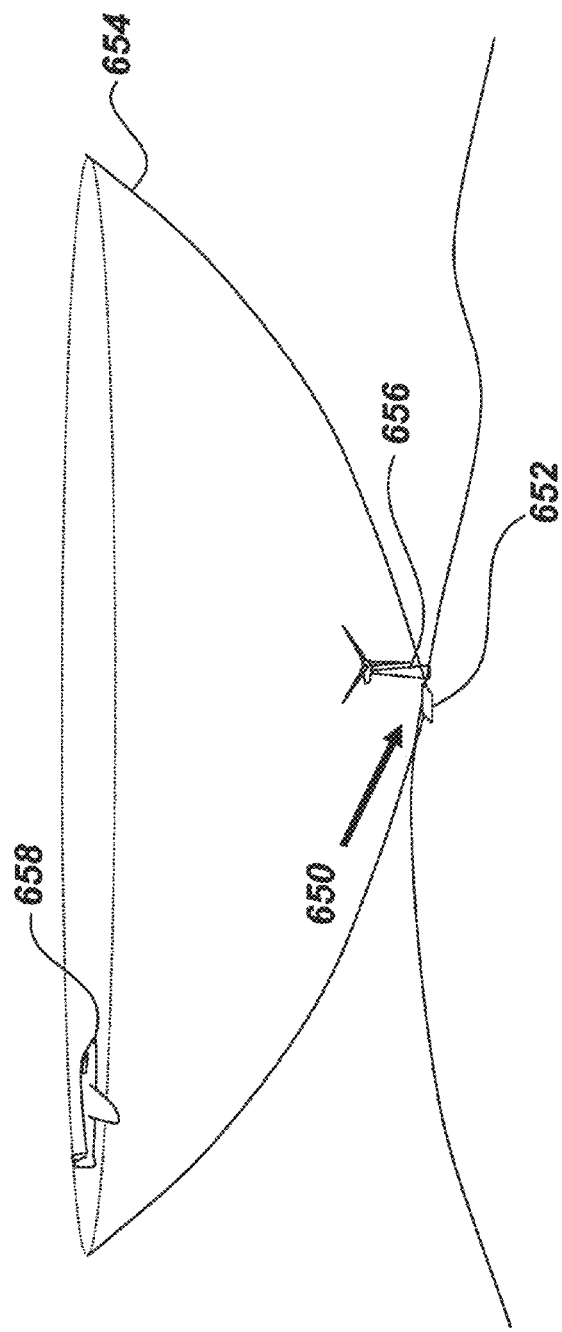

RADAR SYSTEM AND METHOD

CROSS-REFERENCE TO RELATED APPLICATIONS

This patent application is a U.S. National Phase application under 35 U.S.C. §371 of International Application No. PCT/GB2008/003997, filed on Dec. 3, 2008, entitled RADAR SYSTEM AND METHOD, which claims priority to International Application No. PCT/GB2008/001816, filed on May 29, 2008.

FIELD

The invention relates to a radar system and to a method of enhancing radar system capability. The invention relates in particular to a radar system with enhanced detection capabilities in a region affected by clutter, structures and moving structures (for example wind turbines) which interfere with radar signals.

BACKGROUND

There is increasing concern over the effects of new structures, and in particular large man made structures such as wind turbines, on the capability of new and existing radar systems, for example air traffic control, marine, and/or air defence systems.

Radar systems are generally designed to differentiate between radar returns containing reflections from many objects, both moving and stationary. Such reflected signals (collectively termed clutter) may for example originate from stationary objects such as trees, the ground and even the wind turbine towers themselves. Whilst existing radars may be designed to differentiate between clutter and moving objects based on the Doppler effect, there are many effects associated with structures such as wind turbines which contribute to a significant reduction in radar performance. The fact that large numbers of such structures are typically arranged in relatively close proximity to one another exacerbates the problem.

Wind farms, for example, typically comprise an array of large wind turbines, spaced out over an off-shore or inland area that may extend many kilometers. Each wind turbine typically comprises three principal elements: a tower, a nacelle and a blade assembly. The size and configuration of turbines may differ significantly from location to location (there are currently in the region of 40 or so different turbine designs in the UK alone). Generally, however, each turbine comprises a vertically-mounted blade assembly (having a horizontal rotational axis), and a tower exceeding a height of many tens of meters, or potentially over a hundred meters. The size of such structures, combined with the presence of large moving parts (e.g. the blade assemblies), means that the turbines act as effective scatterers of radio signals, with metal towers and/or blade assemblies in particular reflecting a high proportion of the transmitted signal back towards the radar and distorting returns from objects of interest. Thus, the turbines provide spurious moving targets for a radar system and cause shadowing or apparent modulation of signals associated with targets of interest, such as aircraft, marine vessels or the like.

Discriminating against spurious moving targets such as those associated with a moving blade assembly is complex and as such consumes significant additional processor time compared, for example, with simple static clutter reduction or the like.

The large size of the unwanted targets may cause undesirable effects such as saturation of a radar receiver, or the like. A large reflection, for example, can result in amplitude limiting within the receiver/signal processing thereby causing distortion and possibly resulting in reduced sensitivity and hence degraded detection capability.

Objects located behind the turbine(s) (from the perspective of the radar) may lie in the 'shadow' of the turbine. A large portion of the radar energy is blocked by the turbine and is thus lost by reflection in other directions. The radar energy that partially fills the shadow region behind the turbine (for example by diffraction) therefore represents only part of the original signal energy and so the field strength behind the turbine is diminished over a region behind the turbine. Shadowing may therefore result in missed detections.

The rotation of the blades also causes modulation effects, for example time modulation of the return signal as the blades present varying aspect angles, modulation or "chopping" of the radar cross section of objects behind the blade (as the blades intermittently obscure the returns from other objects), and Doppler modulation effects as a result of the blades' movement in the direction of the radar. Such modulation effects may cause a wanted target to be missed or to be miss-classified.

Other potential effects include the reflection and re-reflection (cascading reflection) of signals between turbines before they are returned to the radar.

Degradation in the capability of radar systems such as air traffic control systems to accurately detect and track targets of interest whilst discriminating against spurious targets is of particular concern because of the potential impact on aircraft safety.

There is therefore a need for improvements to enhance the function of important radar systems such as those used in air traffic control and air defence. There is also a more general need for radar systems which are resistant to the negative effects of large structures and in particular large man-made structures having moving parts, such as wind turbines.

The present invention aims to provide an improved radar system, useful in this and/or in other cluttered scenarios.

International Patent Application having publication number WO01/059473, which names Cambridge Consultants Ltd as patent applicant and whose disclosure is incorporated by reference, discloses a radar system which comprises apparatus for obtaining positional information relating to an object, the apparatus comprising: a warning zone definition stage for defining a warning zone (in two or three dimensions) within a detection field of the apparatus; and a discrimination stage for determining whether a detected object is within the warning zone; in which the warning zone is preferably defined as a three-dimensional region within the detection field.

International Patent Application having publication number WO97/14058, which names Cambridge Consultants Ltd as patent applicant and whose disclosure is incorporated by reference, discloses apparatus for and method of determining positional information for an object, including a method for determining the position of an object by means of detecting the relative timing of probe signals returned by said object at a plurality of spaced apart locations.

Radar Systems for Cluttered Environments

SUMMARY

In one aspect of the present invention there is provided a radar system for location within a cluttered environment, the radar system comprising: means for transmitting (preferably a transmitter) radar signals into a region (or a volume of interest); means for receiving (preferably a receiver) return signals of said radar signals when reflected from within said region (or volume of interest), wherein said transmitting and receiving means are configured for location within the cluttered environment; and means for processing (preferably a processor) the return signals to extract data for said region including data associated with clutter in said region.

The radar system preferably comprises a radar capable of discriminating targets in a high clutter environment, for example where the clutter is more significant or gives greater returns than likely targets of interest, and/or where the return signals from the clutter would otherwise obscure return signals from targets of interest.

The cluttered environment may include one, some or all of the following: an individual wind turbine (whether off- or on-shore), a wind farm, a collection of wind farms, a ship or groups of ships, sea clutter, buildings and other similar major structures, especially ports, docks, marinas or harbours or the like.

Targets of interest may include aircraft, unmanned aircraft, missiles, road and off-road vehicles, people, pedestrians, boats, ships, submarines.

Targets of interest may also include weather features such as rain, snow, wind and air turbulence.

In another aspect of the present invention a radar system is provided which comprises: means for transmitting (preferably a transmitter) radar signals into a region (or a volume of interest); means for receiving (preferably a receiver) return signals of said radar signals when reflected from within said region (or volume of interest), wherein said transmitting and receiving means are adapted for location on a structure at a wind farm; and means for processing (preferably a processor) the return signals to extract wind farm associated data for said region.

It has been appreciated pursuant to the present invention location of radar sensors at wind farms, whilst counter-intuitive because of the well known deleterious effects of large metallic structures (and especially those having moving parts) such as wind turbines on radar signal processing, has a number of distinct and surprising advantages. It makes use of existing infrastructure (power and mechanical support); it reduces the range of targets within the area of the turbine array; and it increases angular diversity between turbines. In addition, locating a receiver and/or a transmitter at a wind-farm allows information of relevance to the wind farm itself to be extracted. For example, this may include information on objects (such as marine vessels or aircraft) moving in a volume of interest in close proximity to the wind-farm, to be detected where local air traffic control, navel, or air defence radar would have difficulty.

The transmitting means may comprise a static transmitter.

Preferably the transmitting means has a first aperture and the receiving means a second aperture such that said first aperture is of a different size to said second aperture. The first aperture is preferably smaller than said second aperture. The receiving means may comprise a plurality of sub-arrays each of which may have a sub-aperture of substantially equal size and shape to the first aperture.

The transmitting means is preferably configured to persistently illuminate said region, preferably without being sequentially scanned or directed.

The processing means may be configured for forming multiple receiving beams.

Coherent integration of return signals may occur subject to a limit on the range and/or range rate associated with a corresponding observation represented by the return signals. The limit may be inversely proportional to an operating frequency of the radar system and/or may be proportional to the square of the speed of light. The range may be limited in inverse proportion to the maximum magnitude of the range rate and/or the range rate may be limited in inverse proportion to the maximum range.

The limit is preferably expressed by the inequality:

$$\left(\left|\frac{dR}{dt}\right|(\max) \times R(\max)\right) \leq \frac{c^2}{(8 \times F_{op})}$$

where R is the range and dR/dt is the range rate associated with the observation, c is the speed of light, and $F_{op}$ is operating frequency of the radar system.

The transmitting means is preferably configured to illuminate said whole region with a broad beam, may be configured to illuminate a whole volume of interest simultaneously, may be configured to illuminate said region with a coherent signal modulated to permit range resolution, and/or may be configured to illuminate said region with a coherent signal modulated as a regular sequence of pulses. The transmitting means may be configured to illuminate targets in the region at a rate (for example a pulse rate) sufficient to exceed the Nyquist limit for Doppler shifts associated with the targets.

The processing means may be configured to assess the significance of an observation represented by a return signal preferably only after data relating to the observation has been extracted, stored, and analysed. The processing means may be configured to classify a target represented by an observation only after data relating to the observation has been extracted, stored, and analysed. The processing means may be configured to identify observations of interest from said extracted data and preferably stores historical data for said identified observations.

The historical data may comprise phase and/or amplitude histories. The processing means may be configured to form tracks for said targets based on processing and interpretation of said historical data and/or may be configured to discriminate between significant and insignificant observations (and/or targets representing one class or another) based on said historical data.

The processing means may be configured to store extracted data representing an observation in process pixels each of which represents a unique set of attributes. The attributes for each pixel may comprise a combination comprising at least two of time, range, range rate and/or Doppler frequency for the associated observation. The attributes for each pixel may comprise at least one of beam number, sub-array number and/or element number for the associated observation. The processing means may be configured to store a characteristic of a return signal representing the observation in an associated pixel. The characteristic may comprise at least one of amplitude, phase and frequency. The observation may represent one of a target, an item of clutter, or a 'null'.

The receiving means preferably comprises at least one array comprising a plurality of receiving elements (or sub-arrays), each element may be configured to receive signals from substantially a whole volume of interest, thereby forming an associated signal channel. The receiving means may comprise a plurality of said arrays (or sub-arrays).

The processing means may be configured for forming a plurality of beams by combining different signal channels with suitable amplitude and/or phase weightings. The processing means may be configured for forming a plurality of beams having substantially a different look direction. The processing means may be configured for forming a plurality of apertures with beams having substantially the same look direction. The beams are preferably formed for each of a plurality receiving elements. The beams may be formed for each of the plurality of sub-arrays of receiving elements.

The processing means may be configured for monopulse angular measurement using a plurality of the beams. The monopulse angular measurement may comprise phase monopulse angular measurement. The monopulse angular measurement may comprise amplitude monopulse angular measurement.

The receiving means may have a substantially larger total aperture than said transmitting means. The processing means may be configured for determining the amplitude, frequency, delay and/or phase of said return signals using a signal which is coherent with the transmitted radar signal.

The receiving means may comprise a planar array of receiving elements and/or may comprise a non-planar array of receiving elements conformal to a known shape.

The radar system is preferably located at the wind farm. The radar system preferably comprises a holographic radar.

The processing means may be configured to process signals received by the sub-arrays in a first data stream and a second data stream in parallel. Each data stream may be processed using different amplitude and/or phase weightings. The amplitude and/or phase weightings used for the first data stream may be configured to provide a null in a direction of a land or sea surface thereby to reject surface targets. Similarly, the amplitude and/or phase weightings used for the second data stream may be configured to provide a null in the direction of raised objects thereby to reject such objects in favour of surface targets.

Asymmetric Aperture Aspects

The transmitting means preferably has a first aperture; and said receiving means preferably has a second aperture; wherein said second aperture is preferably of a different size to said first aperture.

According to another aspect of the present invention there is provided a radar system for location in a cluttered environment, the radar system comprising: means for transmitting (preferably a transmitter) radar signals into a region, said transmitting means having a first aperture; means for receiving (preferably a receiver) return signals of said radar signals, reflected from within said region, said receiving means having a second aperture; and means for processing (preferably a processor) the return signals to extract data including clutter related data; wherein said second aperture is of a different size to said first aperture.

The transmitting means may comprise a static transmitter.

Preferably the transmitting means has a first aperture and the receiving means a second aperture such that said first aperture is of a different size to said second aperture. The first aperture is preferably smaller than said second aperture. The receiving means may comprise a plurality of sub-arrays each of which may have a sub-aperture of substantially equal size and shape to the first aperture.

The transmitting means is preferably configured to persistently illuminate said region, preferably without being sequentially scanned or directed.

The processing means may be configured for forming multiple receiving beams.

Coherent integration of return signals may occur subject to a limit on the range and/or range rate associated with a corresponding observation represented by the return signals. The limit may be inversely proportional to an operating frequency of the radar system and/or may be proportional to the square of the speed of light. The range may be limited in inverse proportion to the maximum magnitude of the range rate and/or the range rate may be limited in inverse proportion to the maximum range.

The limit is preferably expressed by the inequality:

$$\left(\left|\frac{dR}{dt}\right|(\max) \times R(\max)\right) \leq \frac{c^2}{(8 \times F_{op})}$$

where R is the range and dR/dt is the range rate associated with the observation, c is the speed of light, and $F_{op}$ is operating frequency of the radar system.

The transmitting means is preferably configured to illuminate said whole region with a broad beam, may be configured to illuminate a whole volume of interest simultaneously, may be configured to illuminate said region with a coherent signal modulated to permit range resolution, and/or may be configured to illuminate said region with a coherent signal modulated as a regular sequence of pulses. The transmitting means may be configured to illuminate targets in the region at a rate (for example a pulse rate) sufficient to exceed the Nyquist limit for Doppler shifts associated with the targets.

In-Fill Application Aspects

The radar system is preferably configured for detecting objects in a surveillance area; the region is preferably a region within the surveillance area, which has a detection capability which is degraded by wind farm associated interference; the return signals may therefore be reflected from objects located within the region; and the processing means is preferably configured for extracting wind farm associated data for the objects and for analysing the wind farm associated data to enhance detection of the objects within the region.

The radar system preferably further comprises primary means for receiving (preferably a receiver) radar signals reflected from an object when said object is located within a surveillance area; wherein the receiving means which is adapted for location at the wind farm is a secondary means for receiving (preferably a receiver) return signals reflected from an object when said object is located within a region within the surveillance area, wherein said region has a detection capability which is subject to wind farm associated degradation when compared to the rest of the surveillance area; and wherein the processing means is configured for: (i) processing said return signals received by said primary receiving means to detect said object within said surveillance area; (ii) for processing said signals received by said secondary receiving means to extract said wind farm associated data for said object when said object is located within said region; and (iii) for analysing said wind farm associated data to enhance the detection capability within said region.

According to another aspect of the present invention there is provided a radar system (or service) adapted to operate in the presence of primary means for receiving (preferably a receiver) radar signals reflected from an object of interest within a surveillance area; and comprising secondary means for receiving (preferably a receiver) radar signals reflected from said object when said object is located within a clutter-affected region within said surveillance area; and means for processing said signals received by said secondary receiving means to detect said object within said region; wherein said processing means is configured to process said signals received by said secondary receiver means to enhance detection within said region and to provide the results to said primary means.

According to another aspect of the present invention there is provided a radar system comprising: primary means for receiving (preferably a receiver) radar signals reflected from an object of interest within a surveillance area; secondary means for receiving (preferably a receiver) radar signals reflected from said object when said object is located within a region within said surveillance area; and means for processing said signals received by said primary receiving means to detect said object within said surveillance area; wherein said processing means is configured to process said signals received by said secondary receiver means to enhance detection within said region.

Thus the radar system advantageously augments the function of existing and/or new surveillance radar systems in the presence of new structures, for example to ameliorate the effect of wind farms on air traffic control radar systems. Advantageously, the secondary receiving means provides additional coverage to fill in areas degraded by the wind farm (or other such group of interfering structures). Preferably the secondary receiving means includes a transmitting element arranged such that it illuminates the wind farm itself in a way that does not suffer such degradation.

Preferably the secondary receiving means comprises a suitable form of a radar sensor (or group of sensors) mounted at a wind farm (or the like) for example attached to a turbine (or group of turbines).

A preferred form of the radar sensor is a static sensor (i.e. one that does not require a rotating antenna) thereby avoiding mechanical interference with the turbines. A static sensor has the further advantages of ease of installation and reduced susceptibility to the harsh environment to be expected at a wind farm. Many wind farms, for example, are sited offshore and as such are subjected to particularly severe weather and stormy seas.

The radar sensor may comprise a static array of transmitting and/or receiving elements (for example similar to that described in WO01/059473) whose region of sensitivity may be adjusted. More specifically the sensitivity of the sensor array may be adjustable to define a region which coincides with a region of reduced detection capability (or degraded radar performance). The ability of the sensor array to measure the position of targets is preferably provided by calculation of amplitude and/or phase relationships (and/or) delays between signals received at different elements or combinations of elements of the receiving array (for example as described in WO97/14058).

Each radar sensor preferably has a wide field of view and can measure directions in both azimuth and elevation. Wider angular coverage 360 degree coverage may be provided by installing two or more radar sensors comprising, for example, planar antenna arrays pointed appropriately. Alternatively or additionally wider angular coverage may be provided by one or more radar sensors comprising, for example non-planar arrays. In the case of a wind farm the radar sensors may be positioned separately, may be located at different positions around the perimeter of a turbine support shaft, or may be attached to different turbine supports.

Data related to targets detected by the radar sensors may be communicated by a wireless link to processing means associated with the primary transmitter/receiver (e.g. main air traffic control system or systems) for integration with similar data generated by other radar sensors. The processing means may comprise suitable computer software or the like.

The integration of target data is preferably simplified for example by defining a detection zone for the secondary receiver means which substantially matches a region of reduced radar performance. The detection zone may be defined in a similar manner to the 'warning zone' described in WO01/059473.

The region is preferably a region having a reduced detection capability. The detection capability may be degraded by interference from at least one structure or a multiplicity of such structures. The structures may have at least one moving part and/or may have a size comparable to or larger than the object detected (indeed the size may be significantly larger than the object detected). The or each structure may be capable of causing multiple multi-path and/or cascading reflections (either in isolation or in combination with other such structures) and/or may be a man made structure. The structure(s) may be largely metallic and/or may be designed for the production of electricity. The or each structure is preferably a wind turbine.

The or each secondary receiving means may be located on the or at least one of the structure(s).

The radar system may comprise means for communicating data corresponding to the radar signals received by the secondary receiving means to the processing means. The communicating means may comprise wireless or optical communicating means.

The secondary receiving means may be located remotely from the primary receiving means at a location within or at the edge of the region.

The processing means may comprise a detection zone definition stage for defining a detection zone for said secondary receiving means within a detection field of said secondary receiving means. The processing means may comprise a discrimination stage for determining whether a detected object is within the detection zone. The detection zone may be defined as being substantially coincident with said region. The detection zone may be contained within and may be smaller than the detection field of the secondary receiving means. The shape of the detection zone may be dissimilar to the shape of the detection field of the secondary receiving means. The shape of the detection zone may be non-circular or non-spherical. The detection zone definition stage may include an algorithm that defines a detection zone as a function of a coordinate within the detection field.

The processing means may comprise an object location stage preferably for determining the position of a detected object within the detection field of the apparatus. The discrimination stage may include a coordinate generating stage for generating a coordinate of a detected object, which coordinate may then compared with the detection zone.

The discrimination stage may be operable to determine the coordinates of the detected object and preferably to compare the determined coordinates with the coordinates of the detection zone preferably to determine whether the object is within the detection zone.

The detection zone definition stage may define at least a limiting value of one or more ordinates of a coordinate within the detection field. The detection zone definition stage may define at least a limiting value of one or more angles of a polar coordinate within the detection field. The detection zone definition stage may define at least a limiting value of a range of a polar coordinate within the detection field. The detection zone may include a plurality of discontinuous spatial regions. The detection zone may be limited in range and/or may be approximately cuboid.

The discrimination stage may be operative to generate an output signal indicative that the object is within the detection zone. The discrimination stage may be operable to apply different logic to at least two of the zones.

The detection zone definition stage may define a plurality of non-coextensive detection zones, and preferably in which the discrimination stage is operative to generate an output signal indicative of which of the plurality of detection zones contains the object.

The discrimination stage may be operative to analyse a characteristic of an object outside of the detection zone and/or may be operable to track an object outside the detection zone and to predict its entry into the detection zone.

The processing means may be configured for definition and redefinition of said detection zone in dependence on requirements.

The secondary receiving means preferably comprises an antenna array having at least one (preferably two) receiving elements for receiving said reflected radar signals. The array may comprise at least one transmitting element for transmitting radar signals for reflection from said object of interest.

The antenna array may be a planar array or may be a non-planar array. The antenna array may be arranged for receiving a plurality of signals indicative of an azimuth of the object and wherein said processing means may be configured for determining said azimuth from said signals.

The antenna array may be arranged for receiving a plurality of signals indicative of an elevation of said object and wherein said processing means may be configured for determining said elevation from said signals.

The radar system may comprise a plurality of the secondary receiving means arranged in geographical association with said region (preferably at different locations within and/or at the edge of said region).

According to another aspect of the invention there is provided a radar system for enhancing detection of an object within a region of a surveillance area, wherein detection capability within said region is degraded by interference caused by at least one structure; the radar system comprising: means for receiving (preferably a receiver) radar signals reflected from said object when said object is located within said region; wherein said receiving means is located on the or at least one of the structure(s).

The detection capability may be degraded by interference from a multiplicity of the structures. The or each structure may have at least one moving part and/or may have a size comparable to or larger than (or significantly larger than) the object detected. The or each structure may be capable of causing multiple multi-path and/or cascading reflections (either in isolation or in combination with other such structures). The or each structure may be a man made structure and/or may be a largely metallic structure. The or each structure may be designed for the production of electricity. The or each structure is preferably a wind turbine. The or each secondary receiving means may be located on the or at least one of the structure(s).

The radar system preferably comprises a plurality of the receiving means, each of the receiving means being arranged on the or at least one of the structure(s).

According to another aspect of the invention there is provided a method of enhancing radar system capability comprising: receiving radar signals reflected from an object of interest within a surveillance area at a primary receiving means; receiving radar signals reflected from said object when said object is located within a region within said surveillance area at a secondary receiving means; integrating said signals received at said primary receiving means with said signals received at said secondary receiving means to enhance detection within said region.

Environmental Application Aspects

The returned signals preferably comprise indicators of prevailing environmental conditions in the region; and the processing means is preferably configured for extracting wind farm associated data for said indicators and preferably for analysing said data to determine operating parameters for said wind farm.

According to another aspect of the invention there is provided a radar system comprising: means for transmitting (preferably a transmitter) radar signals into a region; means for receiving (preferably a receiver) return signals of said radar signals reflected from within said region, wherein said transmitting and receiving means are adapted for location on a structure at a wind farm; and means for processing (preferably a processor) the return signals to extract wind farm associated data for said region; wherein the returned signals comprise indicators of prevailing environmental conditions in said region, and said processing means is configured for extracting wind farm associated data for said indicators and for analysing said data to determine operating parameters for said wind farm.

The indicators may comprise indications of changes in air borne moisture and/or precipitation characteristics and/or may comprise indications of fluid flow characteristics. The fluid flow characteristics may comprise characteristics of air flow, may comprise wind shear and/or turbulence characteristics, and/or may comprise characteristics of vertical air flow stratification.

The processing means may be configured for processing said return signals to resolve different layers of vertical air flow stratification using, for example, vertical receiver beamforming.

The receiving means may comprise an array of receiving elements and processing means may be configured for processing said return signals to resolve different layers of vertical air flow stratification by analysing Doppler frequencies and/or phases across the receiving array.

The fluid flow characteristics may comprise characteristics of water movement, for example, characteristics of waves. The processing means may be configured for processing the return signals to discriminate between indicators of air flow characteristics and indicators of surface characteristics. The surface characteristics may comprise characteristics of waves.

The processing means may be configured to output signals for controlling said operating parameters. The control signals may comprise signals for modifying the pitch of at least one blade of at least one wind turbine, may comprise signals for modifying the pitch of the at least one blade over time as the blade rotates, and or may comprise signals for modifying the direction at which at least one wind turbine faces. The control signals may comprise signals for feathering the blades of at least one wind turbine, may comprise visual or audio signals for alerting an operator to said operating parameters, and or may comprise signals for interpretation by a controller for automatic control of said operating parameters.

The processing means may be configured for extracting information from said indicators for use in estimating the future power output of a energy generation facility (for example a wind turbine or wind farm)

Fresnel Zone Clutter De-Emphasis

According to another aspect of the invention there is provided a radar system (e.g. radar apparatus) for discriminating between sources of radar interference (e.g. in a cluttered or highly cluttered environment) and targets of interest, the radar system comprising: means for transmitting (preferably a transmitter) radar signals into a region; means for receiving (preferably a receiver) return signals of said radar signals returned from within said region; and means for processing (preferably a processor) the return signals to discriminate between return signals returned from a first object and return signals returned from a second object preferably where said return signals from said second object comprise both zero and non-zero Doppler components and preferably where said returns from said second object interfere with said return signals from said first object.

As used herein the term "Doppler components" preferably connotes a measure of a Doppler shift, so that preferably, a zero-Doppler component denotes a stationary target and a non-zero Doppler component denotes a moving target. Furthermore, as used herein the term "interference" preferably connotes not merely destructive and constructive interference but more widely any circumstance in which one signal masks or otherwise obscures another signal.

The radar system is preferably operable for discriminating between the return signals (from the first and second objects) at a distance from the second object which is preferably less than a predefined proximity limit which may be based on the geometry of the object and/or may be based on the wavelength (and hence the frequency) of the signal transmitted by the transmitter means.

According to another aspect of the invention there is provided a radar system for discriminating between sources of radar interference and targets of interest, the system comprising: means for transmitting (preferably a transmitter) radar signals into a region; means for receiving (preferably a receiver) return signals of said radar signals returned from within said region; and means for processing (preferably a processor) the return signals to discriminate between return signals returned from a first object and return signals returned from a second object wherein said return signals from said second object comprise both zero and non-zero Doppler components and interfere with said return signals from said first object; wherein said radar system is operable for discriminating between said return signals when said return signals are received at a distance from said second object which is less than a proximity limit based on the geometry of the object.

The radar system may be adapted to discriminate between the return signals where the second object has an effective radar cross-section when observed from a distance greater than the proximity limit which is greater than an effective radar cross-section of the first object.

The radar system may be adapted to operate within the proximity limit where the proximity limit is preferably a distance within which an effective radar cross-section of the second object varies with the distance of the transmitting and/or receiving means from the second object.

The processing means may be operable to carry out the discrimination where the return signals from the second object comprise signals returned from a distance at which the effective radar cross-section of the second object is preferably substantially less than a theoretical observable radar cross section when observed from an infinite distance.

The radar system may be adapted to operate within the proximity limit where the proximity limit is preferably dependent on at least one dimension of the second object substantially perpendicular to a line of sight of the transmitting means.

The radar system may be adapted to operate within the proximity limit where the proximity limit is preferably substantially dependent on the square of the dimension of the second object. The dimension may be a dimension of a moving part of the second object and/or may be a dimension of a rotating part of the second object.

The radar system may be adapted to operate within the proximity limit where the proximity limit is preferably dependent on a wavelength of the signals transmitted by the transmitting means. The proximity limit may be inversely proportional to the wavelength of the signals transmitted by the transmitting means.

The radar system may be adapted to operate within the proximity limit where the proximity limit is preferably given substantially by the equation:

$$D_P \approx \frac{2}{\lambda} r_{tg}^2$$

where $D_P$ is the proximity limit, $\lambda$ is a (or the) wavelength of the transmitted signal, and $r_{tg}$ is a (or the) dimension target.

The radar system may be adapted to operate within the proximity limit where the proximity limit is preferably dependent on the size of a zone at the second object across which returns from features of the object exhibit a phase deviation of less than 180°.

The radar system may be adapted to operate within the proximity limit where the proximity limit is preferably dependent on the size of a zone at the second object across which returns from the object exhibit a deviation of less than half a wavelength.

The radar system may be adapted to operate within the proximity limit where the proximity limit is preferably determined based on a comparison of a size of the zone (a radius) with the geometry (preferably a dimension) of the second object (preferably in a plane perpendicular to a line of sight of the transmitting and/or receiving means). The zone preferably comprises a (e.g. the first) Fresnel zone at said object. The second object may comprise a wind turbine or a part thereof.

The second object may comprise a blade of a wind turbine.

The radar system may be adapted to operate within the proximity limit where the proximity limit is preferably dependent on the square of a length of the blade divided by the wavelength of the transmitted signal.

The radar system may be adapted to operate within the proximity limit where the proximity limit is preferably given substantially by the equation:

$$D_P \approx \frac{2}{\lambda} L_B^2$$

where $D_p$ is the proximity limit, $\lambda$ is the wavelength of the transmitted signal, and $L_B$ is the length of the blade.

The transmitting means may comprise a static transmitter. The transmitting means may have a first aperture and the receiving means may have a second aperture. The first aperture may be of a different size to the second aperture (for example, smaller than the second aperture).

The receiving means may comprise a plurality of sub-arrays each of which may have a sub-aperture of substantially equal size and shape to the first aperture.

The transmitting means may be configured to persistently illuminate the region (for example, without being sequentially scanned or directed).

The processing means may be configured for forming multiple receiving beams.

Coherent integration of return signals may occur subject to a holographic limit on the range and/or range rate associated with a corresponding observation represented by the return signals.

The holographic limit may be inversely proportional to an operating frequency of the radar system and/or may be proportional to the square of the speed of light.

Compliance with the holographic limit may require range to be limited in inverse proportion to the maximum magnitude of the range rate and/or may require the magnitude of range rate to be limited in inverse proportion to the maximum range.

The limit may be expressed by the inequality:

$$\left(\left|\frac{dR}{dt}\right|(\max) \times R(\max)\right) \leq \frac{c^2}{(8 \times F_{op})}$$

where R is the range and dR/dt is the range rate associated with the observation, c is the speed of light, and $F_{op}$ is operating frequency of the radar system.

The transmitting means may be configured to illuminate targets in the region at a rate (for example a pulse rate) sufficient to exceed the Nyquist limit for Doppler shifts associated with the targets.

The processing means may be configured to identify observations of interest from the extracted data and to store historical data for the identified observations (for example, phase and/or amplitude histories).

The processing means may be configured to discriminate between significant and insignificant observations (and/or targets representing one class or another) based on the historical data.

The processing means may be configured to store extracted data representing an observation in process pixels each of which may represent a unique set of attributes (for example, a combination comprising at least two of time, range, range rate and/or Doppler frequency for the associated observation).

The attributes for each pixel may comprise may be at least one of beam number, sub-array number and/or element number for the associated observation.

The receiving means may comprise at least one array comprising a plurality of receiving elements (or sub-arrays), each element may be configured to receive signals from substantially a whole volume of interest, thereby to form an associated signal channel.

The processing means may be configured for forming a plurality of beams by combining different signal channels with suitable amplitude and/or phase weightings. The processing means may be configured for forming a plurality of beams, for example having substantially a different look direction.

The processing means may be configured for forming a plurality of apertures with beams having substantially the same look direction (for example, substantially parallel beams).

The beams may be formed for each of a plurality receiving elements and/or may be formed for each of the plurality of sub-arrays of receiving elements.

The processing means may be configured for phase and/or may be configured for amplitude monopulse angular measurement using a plurality of the beams.

The receiving means may comprise an array of receiving elements (for example, a planar array of receiving elements or a non-planar array of receiving elements conformal to a known shape).

The radar system may be located at a wind farm. The radar system may comprise a holographic radar.

According to another aspect of the invention there is provided a combination of a radar system according to any preceding aspect and the second object wherein the second object has a given geometry. The given geometry may, for example, comprise a given turbine blade length.

The return signals from each said object may comprise at least one Doppler component and the processing means may be operable for discriminating between the return signals in dependence on a spread of the Doppler components for each object.

Discrimination Based on Spread of Doppler Spectrum

According to another aspect of the invention there is provided a radar system for discriminating between sources of radar interference and targets of interest, the system comprising: means for transmitting (preferably a transmitter) radar signals into a region; means for receiving (preferably a receiver) return signals of said radar signals returned from within said region; and means for processing (preferably a processor) the return signals to discriminate between return signals returned from a first object and return signals returned from a second object wherein said return signals from said objects comprise at least one Doppler component; wherein said processing means is operable for discriminating (or comprises means for discriminating e.g. a discriminator) between said return signals in dependence on a spread of said Doppler components for each object.

The processing means may be operable to determine that said return signals are returned from said second object if said at least one Doppler component comprises a plurality of components at a plurality of locations across a pre-defined Doppler spectrum.

The processing means may be operable for discriminating between said return signals in dependence on said spread of Doppler components in a single observation.

The processing means may be operable to determine that said return signals are returned from said first object if said at least one Doppler component comprises a localised part of a (or the) pre-defined Doppler spectrum.

The processing means may be operable to place said at least one Doppler component into at least one of a plurality of discrete Doppler bins and to discriminate between said return signals in dependence on the or each Doppler bin in which said at least one Doppler component is preferably located.

The processing means may be operable to determine that said return signals are returned from said second object if said at least one Doppler component of said return signal comprises a plurality of Doppler components located in a number (preferably a proportion) of said plurality of Doppler bins which is preferably not less then a first predetermined threshold (for example, a threshold between 5% and 100% of the plurality of Doppler bins).

The processing means may be operable to determine that said return signals are returned from said first object if said at least one Doppler component of said return signal is preferably located in a number (preferably a proportion) of Doppler bins which does not exceed a second predetermined threshold (for example, a threshold comprising anywhere from a single Doppler bin to 1%, 2%, 5% or up to 25% of the plurality of Doppler bins).

The number of Doppler bins may represent a target of interest comprising an environmental target (for example, rain, snow or wind) (which may be wind farm associated) and said processing means may be configured to extract information relating to said target for use in estimating the future power output of an energy generation facility (for example a wind turbine or wind farm).

The processing means may be operable to discriminate between said return signals in dependence on an evolution of Doppler characteristics exhibited by said objects over time.

The evolution of Doppler characteristics may be related to the evolution of the signal in the time domain.

The evolution of the signal in the time domain may take the form of flashes (for example, from a rotating object such as a wind turbine blade or the like)

The processing means may be operable to discriminate between said return signals in dependence on the conformity of said evolution of Doppler characteristics with a model or function.

The model or function may comprise a sinusoidal, exponential, quadratic, and/or logarithmic model or function.

The system may comprise means for determining a range of said objects based on said return signals, and said processing means may be further operable to discriminate between said return signals in dependence on a change in said determined range of the objects over time.

The processing means may be operable to determine that said return signals are returned from said first object if said range changes over a time period.

The processing means may be operable to determine that said return signals are returned from said second object if said range remains substantially constant over a time period.

The transmitter means may be operable to transmit said radar signals in an transmitter beam directed upwardly at no less than 45° relative to a horizon; said receiving means may be operable to detect return signals of said radar signals returned from an airborne object within said upwardly directed transmitter beam; and said processing means may be operable to process the return signals returned from said airborne object thereby to detect and track said airborne object.

Vertically Facing Radar

According to another aspect of the invention there is provided a radar system for detecting and tracking an airborne object the system comprising: means for transmitting (preferably a transmitter) radar signals in an transmitter beam directed upwardly at no less than 45° relative to a horizon; means for receiving (preferably a receiver) return signals of said radar signals returned from an airborne object within said upwardly directed transmitter beam; and means for processing (preferably a processor) the return signals returned from said airborne object thereby to detect and track said airborne object.

The upwardly directed transmitter beam preferably comprises a substantially vertically directed transmitter beam.

The transmitting means may be configured for transmitting further radar signals in at least one further transmitter beam directed at an angle of no more than 45° relative to the horizon; said receiving means may be configured for receiving return signals of said further radar signals returned from an object within the at least one further transmitter beam; and said processing means may be operable to process said return signals received by said receiving means thereby to detect and track objects within said upwardly and/or said at least one further beam.

The at least one further transmitter beam may comprise a plurality of transmitter beams each preferably directed at an angle of no more than 45° relative to the horizon and at a different angle in azimuth.

Each further transmitter beam may be directed at substantially a 90° (and/or a 180°) angle in azimuth relative to at least one other further transmitter beam.

The transmitter means may be configured such that said further transmitter beams are directed to illuminate a volume from substantially the same location within the volume.

The transmitter means may be configured such that said further transmitter beams are directed to illuminate a volume from different locations within the volume or at a perimeter of the volume.

The radar system may be configured to process signals returned from said airborne object and to discriminate them from signals returned from clutter objects (for example, sources of radar interference) containing rotating components.

The receiving means may be operable to receive return signals of said radar signals returned from within said region via an array of receiver elements and in a plurality of channels each corresponding to at least one of said receiver elements, and the processing means may be operable to process the return signals to form (or represent) concurrently a plurality of beams in the frequency domain, the plurality of beams comprising at least one beam for each channel.

Time-Frequency Transformation Prior to Beamforming

According to a further aspect of the present invention there is provided a radar system for discriminating between sources of radar interference and targets of interest, the system comprising: means for transmitting (preferably a transmitter) radar signals into a region; means for receiving (preferably a receiver) return signals of said radar signals returned from within said region via an array of receiver elements and in a plurality of channels each corresponding to at least one of said receiver elements; and means for processing (preferably a processor) the return signals to form (or represent) concurrently a plurality of beams in the frequency domain, the plurality of beams comprising at least one beam for each channel.

Preferably, the processing means is configured for transforming the received return signals from the time domain into the frequency domain (for example, using a Fourier transform such as the so called fast Fourier transform/FFT).

Preferably, the processing means is configured for forming the beams only after said transformation from the time domain into the frequency domain is completed.

Preferably, the processing means is configured for detecting any targets in each beam.

Preferably, the processing means is configured for forming a migration surface (for example, a range-range rate surface) for each beam so formed and for detecting targets using the migration surfaces.

Preferably, the processing means is configured for determining an angular measurement for a target detected in at least one of the beams.

Preferably, the angular measurement comprises a phase monopulse angular measurement, or amplitude monopulse angular measurement.

Preferably, the processing means is configured for re-forming the beams prior to the angular measurement.

Preferably, the beam formation and the beam re-formation are based on the same frequency domain data.

Preferably, the angular measurement is determined using a plurality of re-formed beams.

Preferably, the transmitting means is operable to transmit radar signals into a region from an array of transmitter elements; the receiving means is operable to receive return signals of the radar signals returned from within the region via an array of receiver elements and in a plurality of channels each corresponding to at least one of the receiver elements; and the processing means is operable to process the return signals to form a receiver beam for each of said channels; and wherein the number of transmitter elements in the array of transmitter elements is greater than the number of receiver elements to which each channel corresponds.

Broad Beam Transmitter

According to a further aspect of the invention, there is provided a radar system for discriminating between sources of radar interference and targets of interest, the system comprising: means for transmitting (preferably a transmitter) radar signals into a region from an array of transmitter elements; means for receiving (preferably a receiver) return signals of said radar signals returned from within said region via an array of receiver elements and in a plurality of channels each corresponding to at least one of said receiver elements; and means for processing (preferably a processor) the return signals to form a receiver beam for each of said channels; wherein the number of transmitter elements in said array of transmitter elements is greater than the number of receiver elements to which each channel corresponds.

Preferably, the system further comprises means for adapting (preferably a adaptor or adaptor module) said signals for transmission from said transmitter elements such that said transmitted signals form a transmitter beam which substantially conforms with each said receiver beam.

Preferably, said adapting means is configured to adapt the signals for transmission from at least one said transmitter element in a different manner than the from at least one further transmitter element.

Preferably, said adapting means is configured to adapt the signals for transmission from said transmitter elements to form a broader transmitter beam than would be formed if the signals from each transmitter element were substantially the same as one another (for example in phase and/or amplitude). More preferably, said adapting means is configured to adapt the phase of the signals for transmission from at least one said element.

Preferably, said adapting means is configured to adapt the phase of the signals for transmission from each element in dependence on the position of the element in the transmitter array.

Preferably, said adapting means is configured to adapt the amplitude of the signals for transmission from at least one said element.

More preferably, said adapting means is configured to adapt the amplitude of the signals for transmission from each element in dependence on the position of the element in the transmitter array.

Preferably, said array of transmitter elements is formed on a surface of a particular shape, and wherein said adapting means is configured to adapt the signals for transmission from said transmitter elements to form a transmitter beam which is substantially the same as the transmitter beam that would be formed if the array of transmitter elements were formed on a surface of a different shape.

Preferably, said adapting means is configured to adapt the signals for transmission from said transmitter elements to form a transmitter beam which is substantially the same as the transmitter beam that would be formed if the array of transmitter elements were formed on a curved surface (for example, of a cylinder, sphere, or the like).

Preferably, said transmitting means comprises a planar array of transmitting elements.

Preferably, said transmitting means comprises a non-planar array of transmitting elements conformal to a known shape.

Preferably, said known shape comprises a shape having a plurality of planar facets (for example, a multi-faceted, polyhedral, prismatic, geodesic, and/or pyramidal shape).

Other Method Aspects

According to another aspect of the invention there is provided a method for obtaining information about a region including or in the vicinity of a wind farm, the method comprising: transmitting radar signals into a region from a location at the wind farm; receiving, at the wind farm, return signals of the radar signals reflected from within the region; and processing the return signals to extract wind farm associated data for the region.

The radar system may be configured for detecting objects in a surveillance area, the region may be a region within the surveillance area which has a detection capability which is degraded by wind farm associated interference, and the return signals may be reflected from objects located within the region; and the processing step may comprise extracting wind farm associated data for the objects and analysing the wind farm associated data to enhance detection of the objects within the region.

The returned signals may comprise indicators of prevailing environmental conditions in said region; and said processing step may comprise analysing said extracted data to determine operating parameters for said wind farm.

According to another aspect of the invention there is provided a method for determining operating parameters for a wind farm; transmitting radar signals into a region from a wind farm, the method comprising: receiving return signals of said radar signals reflected from within said region at said wind farm; and processing the return signals to extract wind farm associated data for said region wherein the returned signals comprise indicators of prevailing environmental conditions in said region; and analysing, in said processing step, said extracted data to determine operating parameters for said wind farm.

According to another aspect of the invention there is provided a method for extracting data in a cluttered environment, the method comprising: transmitting radar signals into a region using a transmitter having a first aperture; receiving return signals of said radar signals, reflected from within said region, using a receiver having a second aperture; and processing the return signals to extract data including clutter related data; wherein said second aperture used in said receiving step is of a different size to said first aperture used in said transmitting step.

According to a further aspect of the invention, there is provided a method for discriminating between sources of radar interference and targets of interest, the method comprising: transmitting radar signals into a region; receiving return signals of said radar signals returned from within said region; and processing the return signals to discriminate between return signals returned from a first object and return signals returned from a second object wherein said return signals from said second object comprise both zero and non-zero Doppler components and interfere with said return signals from said first object; wherein said processing step comprises discriminating between said return signals when said return signals are received at a distance from said second object which is less than a proximity limit based on the geometry of the object.

According to another aspect of the invention, there is provided a method for siting a radar system, the method comprising: providing means for transmitting (preferably a transmitter) radar signals into a region; providing means for receiving (preferably a receiver) return signals of said radar signals returned from within said region; providing means for processing (preferably a processor) the return signals to discriminate between return signals returned from a first object and return signals returned from a second object wherein said return signals from said second object comprise both zero and non-zero Doppler components and interfere with said return signals from said first object; and siting said receiving means at a distance from said second object which is less than a proximity limit based on the geometry of the object.

According to yet another aspect of the invention, there is provided a method for discriminating between sources of radar interference and targets of interest, the method comprising: transmitting radar signals into a region; receiving return signals of said radar signals returned from within said region; and processing the return signals to discriminate between return signals returned from a first object and return signals returned from a second object wherein said return signals from said objects comprise at least one Doppler component; wherein said processing step comprises discriminating between said return signals in dependence on a spread of said Doppler components for each object.

According to a further aspect of the invention, there is provided a method for detecting and tracking an airborne object the method comprising: transmitting radar signals in an transmitter beam directed upwardly at no less than 45° relative to a horizon; receiving return signals of said radar signals returned from an airborne object within said upwardly directed transmitter beam; and processing the return signals returned from said airborne object thereby to detect and track said airborne object.

According to another aspect of the invention, there is provided a method for discriminating between sources of radar interference and targets of interest, the system comprising: transmitting radar signals into a region; receiving return signals of said radar signals returned from within said region via an array of receiver elements and in a plurality of channels each corresponding to at least one of said receiver elements; processing the return signals to form (or represent) concurrently a plurality of beams in the frequency domain, the plurality of beams comprising at least one beam for each channel.

According to a further aspect of the invention, there is provided a method for discriminating between sources of radar interference and targets of interest, the system comprising: transmitting radar signals into a region from an array of transmitter elements; receiving return signals of said radar signals returned from within said region via an array of receiver elements and in a plurality of channels each corresponding to at least one of said receiver elements; and processing the return signals to form a receiver beam for each of said channels; wherein the number of transmitter elements in said array of transmitter elements is greater than the number of receiver elements to which each channel corresponds.

Other Aspects

According to another aspect of the invention there is provided a radar system comprising: a transmitter to transmit radar signals into a region; a receiver to receive return signals of said radar signals reflected from within said region, wherein said transmitter and receiver are adapted for location on a structure at a wind farm; and a processor to process the return signals to extract wind farm associated data for said region.

The radar system may be configured to detect objects in a surveillance area. The region may be a region within said surveillance area, which region has a detection capability which is degraded by wind farm associated interference. The return signals may be reflected from objects located within said region. The processor may be configured to extract wind farm associated data for said objects and to analyse said wind farm associated data to enhance detection of said objects within said region.

The returned signals may comprise indicators of prevailing environmental conditions in said region, and said processor may be configured to extract wind farm associated data for said indicators, and to analyse said data to determine operating parameters for said wind farm.

According to another aspect of the invention there is provided a radar system comprising: a primary receiver to receive radar signals reflected from an object of interest within a surveillance area; a secondary receiver to receive radar signals reflected from said object when said object is located within a region within said surveillance area; and a processor to process said signals received by said primary receiver to detect said object within said surveillance area; wherein said processor is configured to process said signals received by said secondary receiver to enhance detection within said region.

According to another aspect of the invention there is provided a radar system comprising: a transmitter to transmit radar signals into a region; a receiver to receive return signals of said radar signals reflected from within said region, wherein said transmitter and receiver are adapted for location on a structure at a wind farm; and a processor to process the return signals to extract wind farm associated data for said region; wherein the returned signals comprise indicators of prevailing environmental conditions in said region, and said processor is configured to extract wind farm associated data for said indicators and to analyse said data to determine operating parameters for said wind farm.

According to another aspect of the invention there is provided a radar system for location in a cluttered environment, the radar system comprising: a transmitter to transmit radar signals into a region, said transmitter having a first aperture; a receiver to receive return signals of said radar signals reflected from within said region, reflected from within said region, said receiver having a second aperture; and a processor to process the return signals to extract data including clutter related data; wherein said second aperture is of a different size to said first aperture.

In further aspects, the invention may comprise one, some or all of the following features: a radar located in a cluttered environment; a radar capable of discriminating an object that has both zero and non-zero Doppler components; a (preferably holographic) radar operable under the holographic limit; and/or a radar capable of discrimination in a high clutter environment, for example where the clutter is more significant or gives greater returns than likely targets of interest, or where the return signals from the clutter would otherwise obscure return signals from targets of interest.

The cluttered environment preferably includes one, some or all of the following: an individual wind turbine (whether off- or on-shore), a wind farm, a collection of wind farms, a ship or groups of ships, sea clutter, buildings and other similar major structures, especially ports, marinas or harbours.

A preferable embodiment of the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

A preferable embodiment of the invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

A preferable embodiment of the invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

According to the present invention, there is provided a radar system as set out in the corresponding independent claims. Other preferable features of the invention are recited in the dependent claims.

BRIEF DESCRIPTION OF THE DRAWINGS

The invention will now be described by way of example only with reference to the attached figures in which:

FIGS. 1(a) and 1(b) illustrate, in simplified plan, the fields of view associated with two different types of radar.

FIG. 2 shows a continuously-sampled time-domain signal for turbine blade (flashes) and a target;

FIG. 5 shows a chopped signal after filtering;

FIGS. 6(a) to 6(c) illustrate an embodiment of holographic radar;

FIG. 15 illustrates a further embodiment of holographic radar;

FIGS. 16(a) and (b) illustrates beam broadening using the embodiment of FIG. 15;

FIG. 18 illustrates a further embodiment of holographic radar;

FIG. 19 illustrates a further embodiment of holographic radar;

FIG. 20 illustrates a further embodiment of holographic radar;

DETAILED DESCRIPTION

In air traffic control (ATC) and air defence radar systems and the like the radar transmitter typically scans a volume of interest (either mechanically or electronically). Thus, in scanned radar systems, targets are illuminated successively as a transmitter beam sweeps or switches its position. This has the effect of 'chopping' the received signal from any target into a number of short sequences, with the result (inherent in Fourier-domain signal theory) that changes in target position between illuminations result in aliasing of Doppler returns, and that complex tracking methods are required in any attempt to discriminate between clutter and targets.

FIG. 1(a) shows a field of view for a scanning type radar. The scanning radar has a relatively narrow field of view and has to be swept to allow a large volume of interest to be illuminated, piecewise, in a sequential manner thereby effectively 'chopping' the signals received from the volume of interest at a rate determined by the sweep frequency.

FIGS. 2 to 5 illustrate the effect of 'chopping' the return signals from turbine blades (Tb) and targets (Tg).

In FIG. 2 a continuously-sampled time-domain signal is shown in which turbine blade (Tb) (flashes) and target (Tg) characteristics are both exhibited. As seen in FIG. 2 movement of the turbine blades (Tb) is characterised by six short high amplitude 'flashes' (typically associated with a three blade turbine) which, in the example, are very large compared with the target signal. The target, on the other hand, is characterised by a slow-varying signal which increases and decreases in amplitude as the target approaches and recedes respectively.

Figure 3:
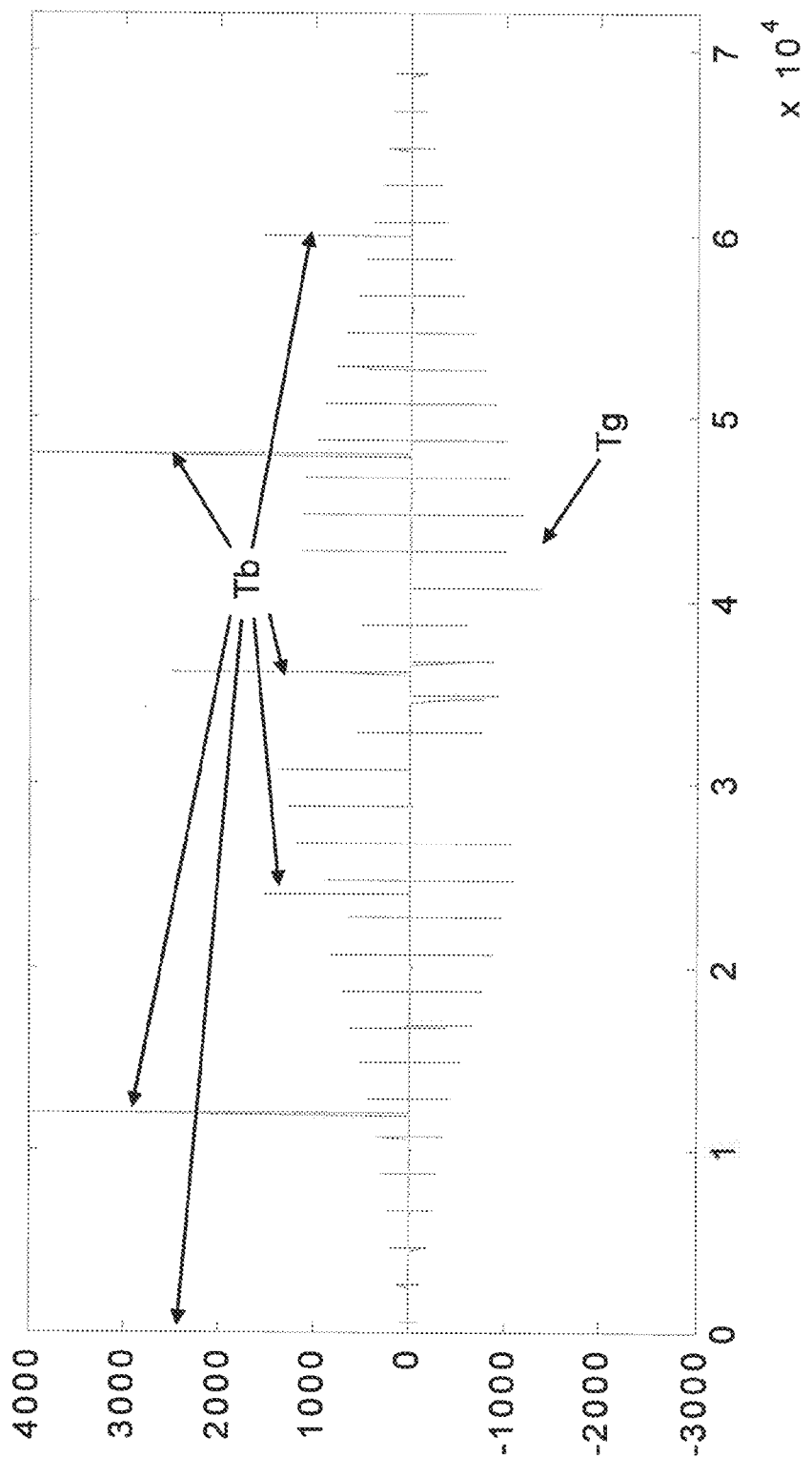
FIG. 3 shows a chopped signal from a target and turbine.
Figure 4:
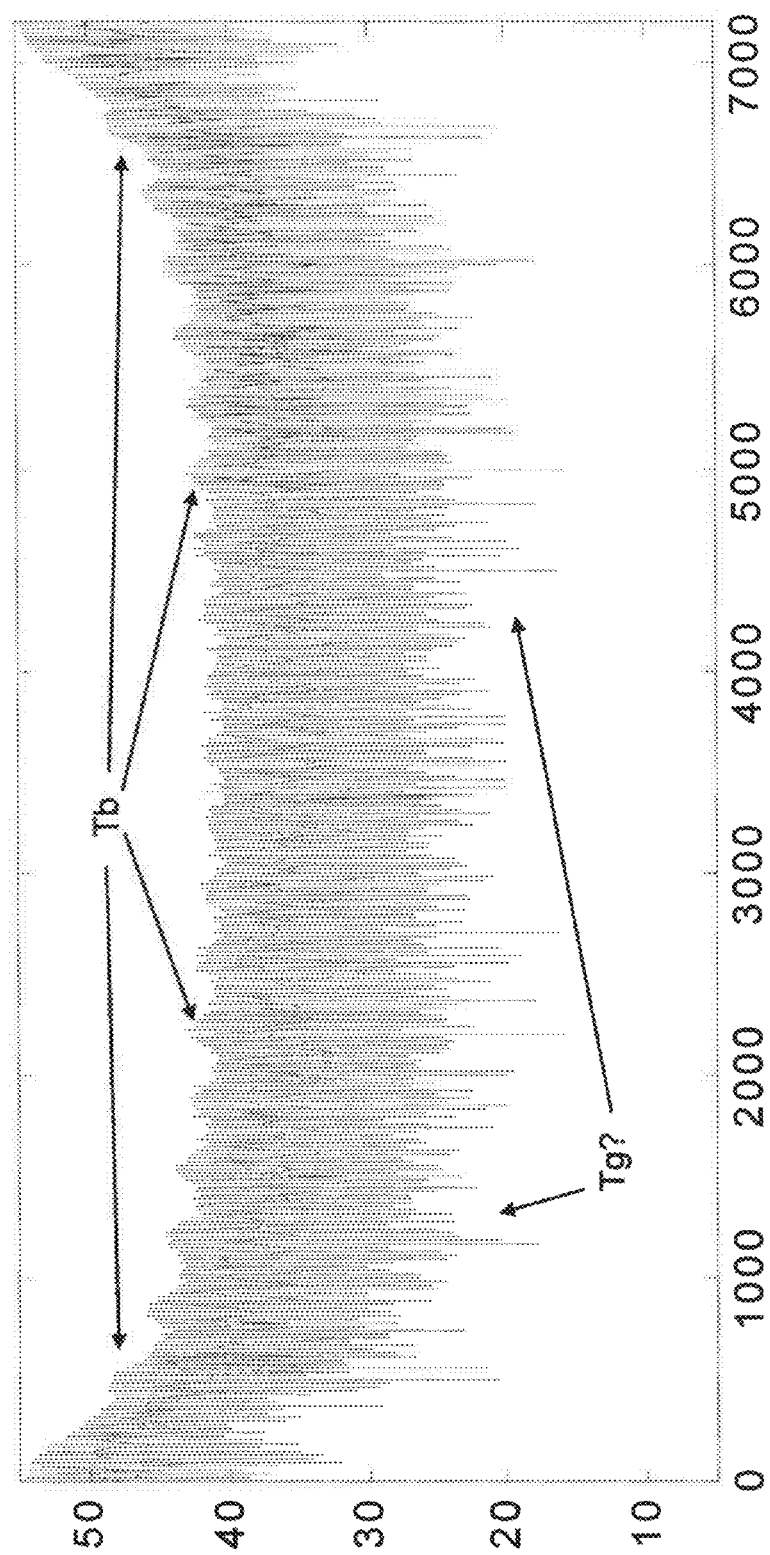
FIG. 4 shows a spectrum of the chopped signal aliased across the entire band.

FIG. 3 illustrates the 'chopping' effect typical of scanning radar systems for the signal shown in FIG. 2 and FIG. 4 shows a high resolution frequency spectrum for the chopped signal of FIG. 3. The chopping of the signal effectively represents a significant loss of information about what is occurring in the volume of interest, which makes discrimination between target (Tg) effects and turbine (Tb) effects difficult, if not impossible.

As seen in FIG. 4, for example, the chopping of the signal causes aliasing across the entire band. Hence, target (Tg) effects and turbine (Tb) effects cannot be resolved effectively using filtering, and the removal of the effects of the wind turbine becomes virtually impossible. This is illustrated in FIG. 5, which shows the chopped signal of FIG. 3 after filtering, and demonstrates the ineffectiveness of the filtering to remove high-frequency effects associated with the wind turbine. As seen in FIG. 5, the effects of the wind turbine are still very evident.

In preferred embodiments, a static so-called 'holographic' radar is used which is based on the hypothesis that information on the spatial distribution of objects contained in a particular volume of space can be represented by electromagnetic illumination from and reception at the boundary of that volume. In broad terms, therefore, three dimensional data within a particular three dimensional volume of space can be represented by two dimensional data at its boundary in accordance with the holographic principle.

FIG. 1(b) shows a field of view of a simplified embodiment of the so called holographic radar the principles of which are described below in more detail with reference to other embodiments. Unlike the scanning radar, the holographic radar of FIG. 1(b) is static, having a relatively large field of view (~90° or greater) allowing a similar volume to be illuminated persistently. The radar of FIG. 1(b) has a centrally located transmitter 2 having an associated wide transmitter beam 2a and a plurality of receivers 4 each having an associated receiver beam (4a to 4f).

The holographic radar is configured to illuminate a particular volume of space persistently rather than in the discontinuous manner of scanning radar systems. Thus, information contained in signals returned from the volume being illuminated is not lost as a result of such discontinuity.

All beamforming and direction measurement in the holographic radar is performed after reception of return signals reflected from within the volume being illuminated, which effectively allows aliasing effects to be avoided because above-Nyquist sampling is always available, subject to a digitally-controlled multiple beamforming strategy, and to certain limits on the combined range, target speed and operating frequency, known herein as the holographic limit. The holographic limit is defined broadly as the boundary of the interdependent limits of range, range rate and operating frequency for which unambiguous operation of holographic radar can be achieved. The holographic limit may be expressed mathematically as a bound for which the product of maximum range (R) and the magnitude of the maximum range rate (dR/dt) must be less than the square of the speed of light (c) divided by eight times the operating frequency ($F_{op}$):

$$\left(\left|\frac{dR}{dt}\right|(\max) \times R(\max)\right) \leq \frac{c^2}{(8 \times F_{op})}$$

Thus, the use of such a radar also allows the same returns to be analysed in different ways (for example by the formation multiple beams; some to detect airborne targets without interference from sea clutter; others to assess the sea clutter and surface targets) to extract information of relevance to different applications.

Figure 7:
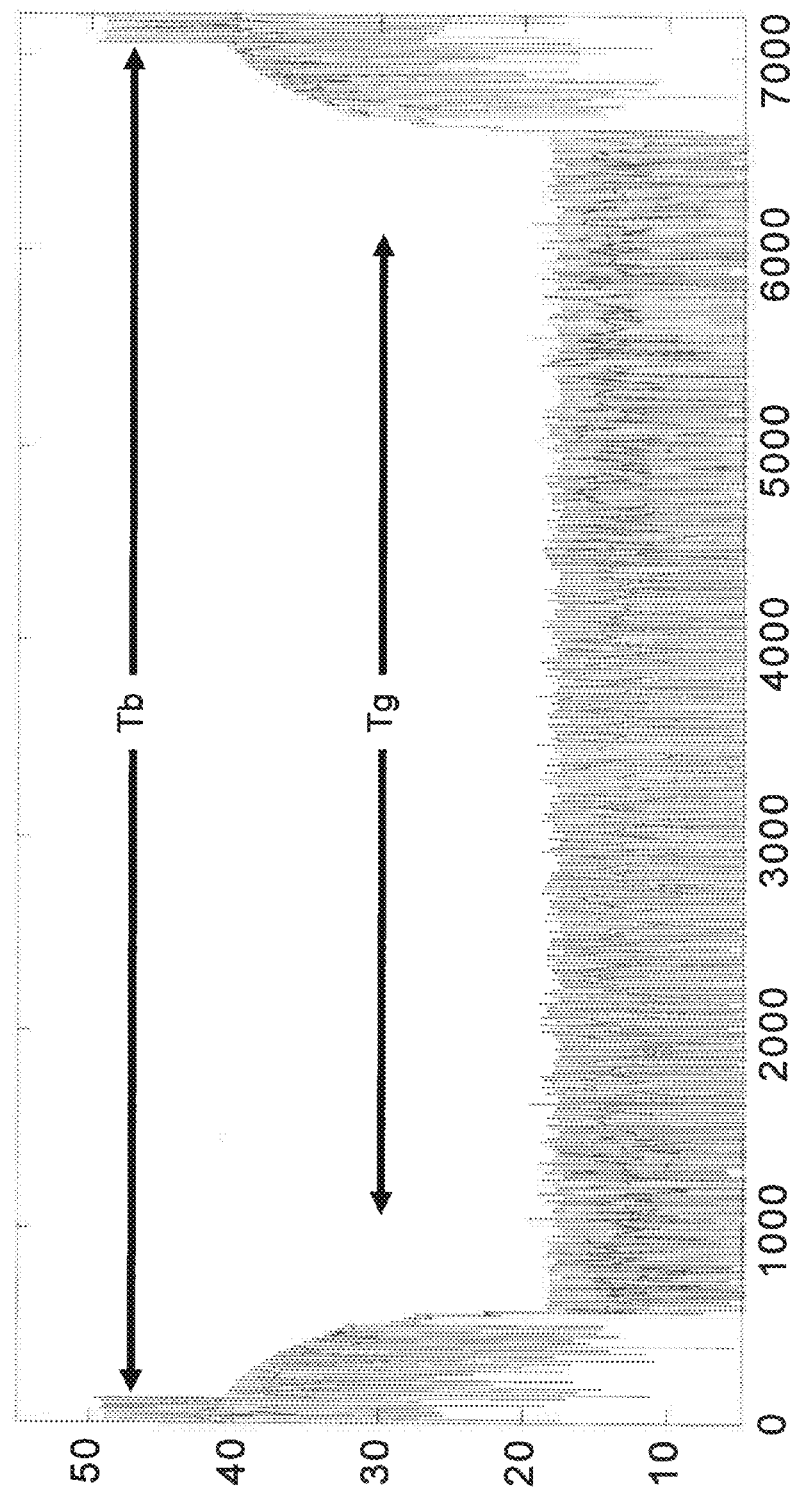
FIG. 7 shows a high-resolution (holographic) spectrum of a target and turbine.
Figure 8:
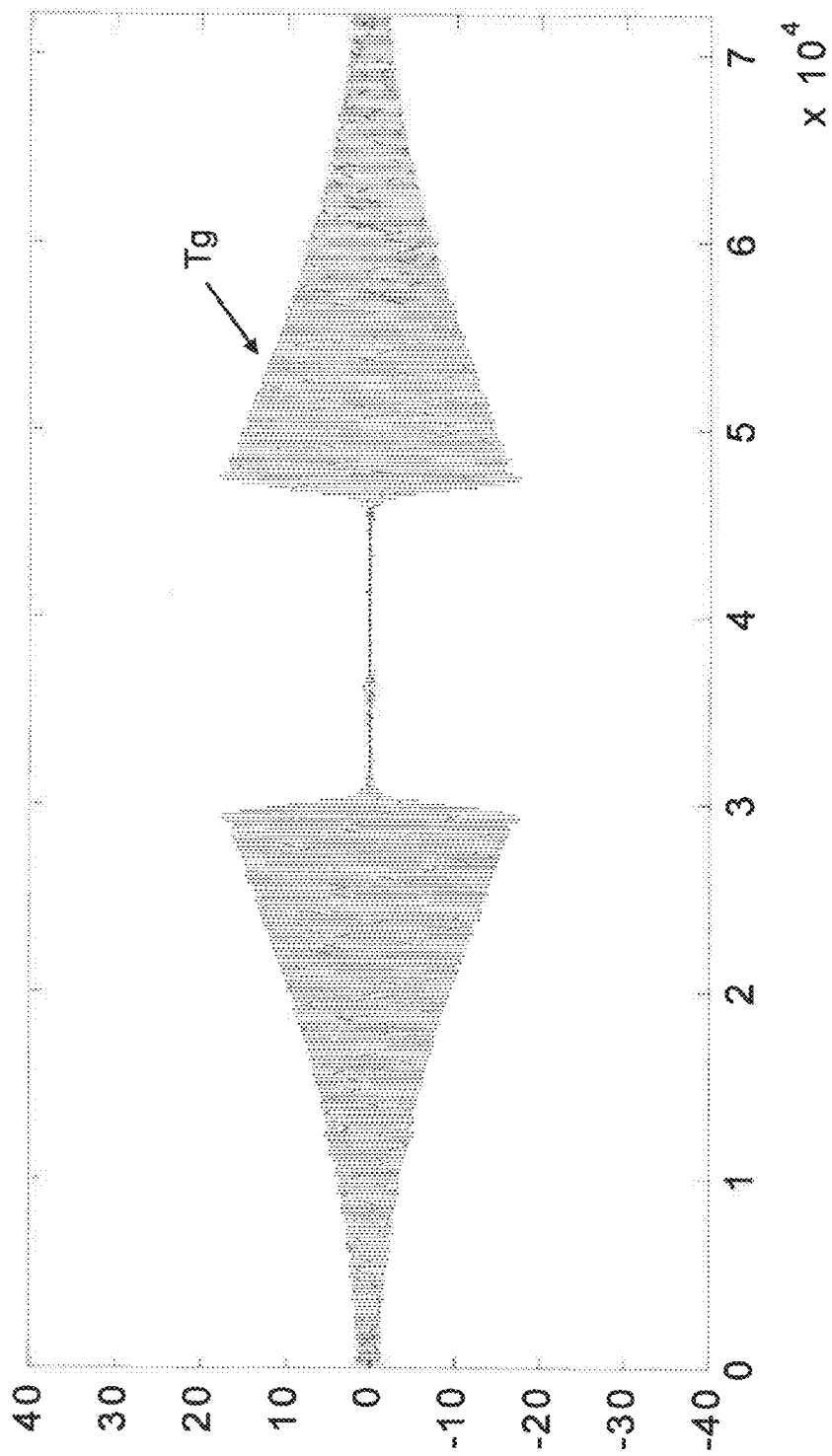
FIG. 8 shows a target signal recovered by filtering from the holographic spectrum.

FIGS. 2, 7 and 8 illustrate further advantages of using the holographic radar. The holographic radar effectively reproduces the continuously-sampled time-domain signal shown in FIG. 2 without the loss of information inherent to scanning radar systems.

In FIG. 7 for example a high-resolution (holographic) spectrum is shown for the target (Tg) and turbine (Tb) of FIG. 2. Unlike the characteristics exhibited in FIG. 4, however, the turbine spectrum is confined near the upper and lower limits with no artifacts at other locations. Thus, as illustrated in FIG. 8, the target signal may be effectively recovered by filtering from the holographic spectrum.

Holographic Radar Implementation

Figure 6A:
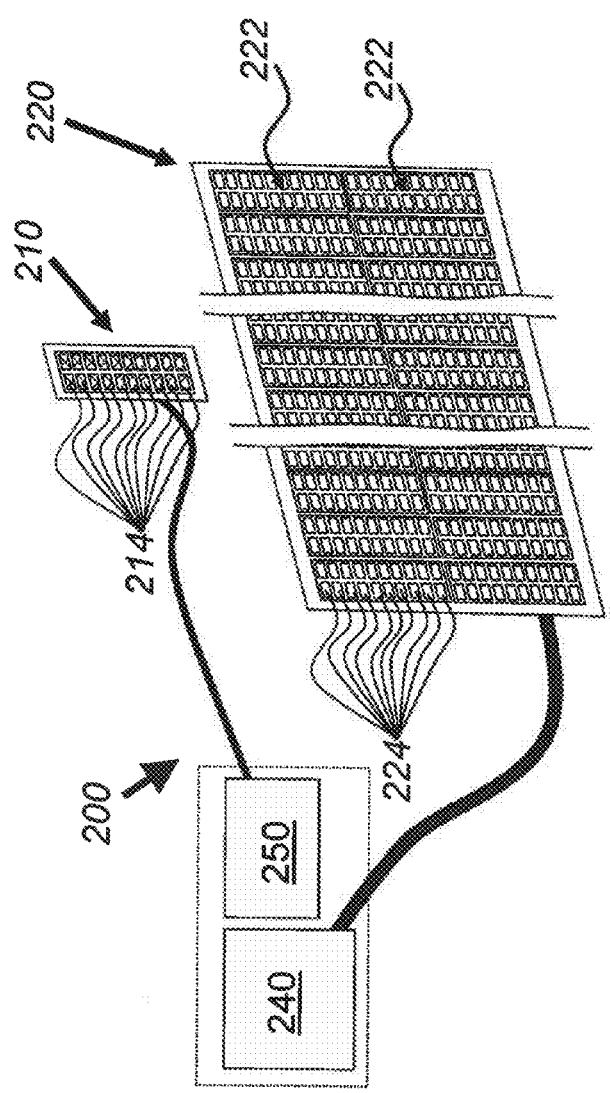
Figure 6B:
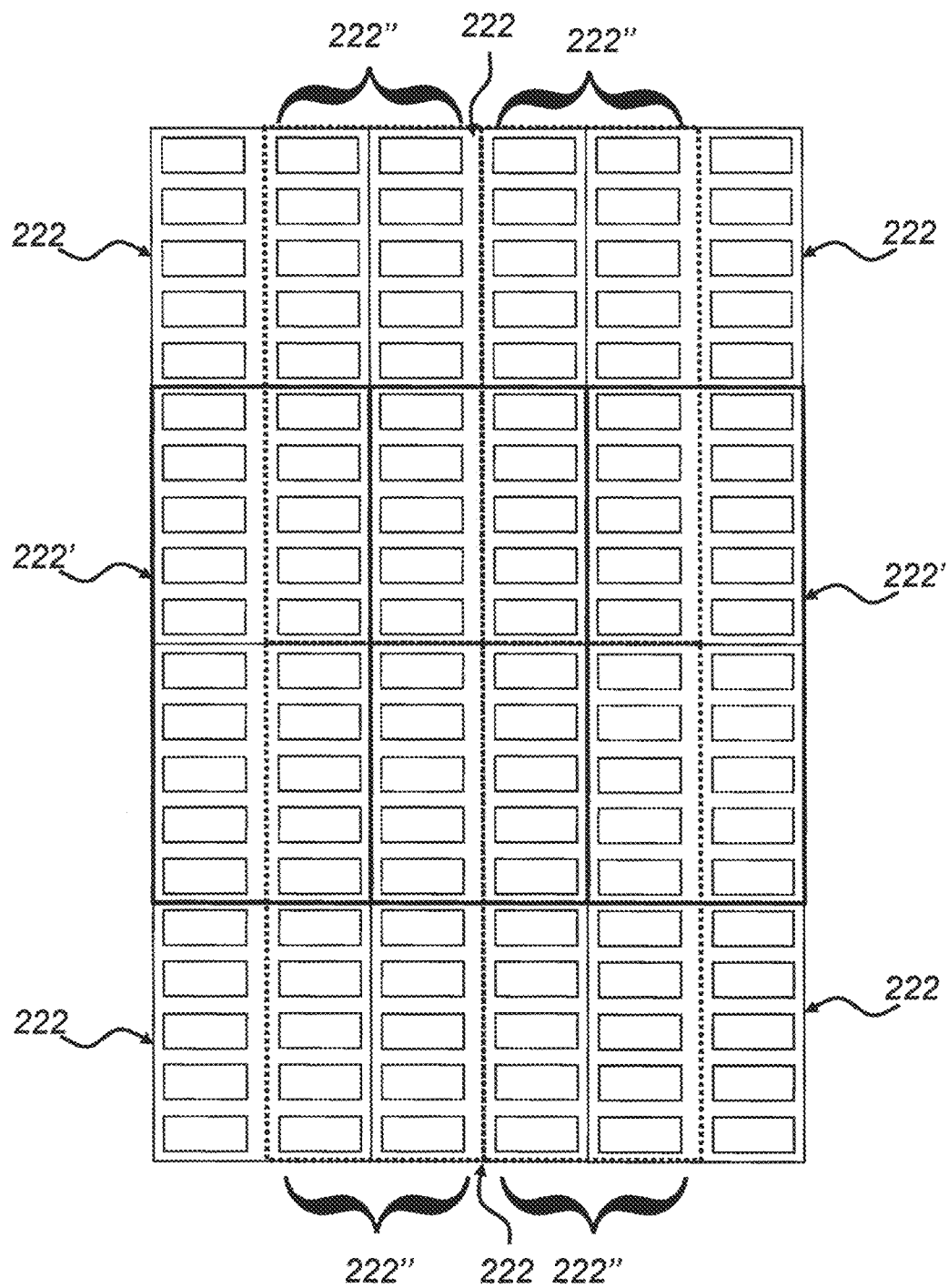

FIGS. 6(a) to 6(c) illustrate an exemplary embodiment of 'holographic' radar generally at 200. The holographic radar 200 comprises at least one array 210 of transmitting elements 214 configured to illuminate a whole volume of interest simultaneously, with a coherent signal modulated appropriately (for example as a regular sequence of pulses) to permit range resolution. It will be appreciated that although an array of elements is described the transmitter may comprise a single transmitting element.

The radar includes a control module 250 configured for controlling the signals transmitted via the transmitter array 210 in dependence on the nature of the application for which the holographic radar is to be used.

The holographic radar also includes a receiving array 220 comprising a plurality of receiving sub-arrays 222. Each sub-array 222 comprises a plurality of receiving elements 224 configured over an area. Each element 224 and sub-array 222 of the receiving array is arranged to receive signals returned from substantially the whole of the illuminated volume, each element 224 and/or sub-array 222 essentially forming a signal channel. The receiving array 220 contains more elements than the transmitter array 210 and has a substantially larger total aperture.

As seen in FIG. 6(a) the transmitter array is ten transmitting elements 214 high by two wide. Similarly, each receiver sub-array 222 is ten receiving elements 224 high by two wide arranged to have substantially the same aperture size as the transmitter array. The sub-arrays are arranged in a grid which is two sub-arrays high by eighty wide.

The elements of the sub-arrays 222 are also configured to form further, overlapping sub-arrays 222', 222" (or 'virtual' sub-arrays) as illustrated in simplified array of sub-arrays (two high by three wide) shown in FIG. 6(b).

As shown in FIG. 6(b) the elements of vertically adjacent sub-arrays are configured to form vertically overlapping sub-arrays 222'. Specifically, the lower five elements in each of the two columns forming each upper sub-array, and the upper five elements in each of the two columns forming each lower sub-array, form a vertically overlapping sub-array 222' which shares some receiving elements with both the associated upper and lower sub-arrays.

The elements of horizontally adjacent sub-arrays are similarly configured to form horizontally overlapping sub-arrays 222". Specifically, for each pair of horizontally adjacent sub-arrays, the elements of the rightmost column of the left sub-array, and the elements of the leftmost column of the right sub-array, form a horizontally overlapping sub-array 222" which shares some receiving elements with both the sub-arrays of the associated horizontally adjacent pair.

In the case of the receiver array shown in FIG. 6(a), therefore, the receiving elements 224 and sub-arrays 222 are arranged in a spaced relationship, facing substantially the same direction, to form an overall aperture comprising eighty-two non-coincident, but overlapping sub-apertures in width and three non-coincident, but overlapping sub-apertures in height.

It will be appreciated that although specific array and sub-array dimensions are described, any appropriate arrangement of sub-arrays and receiving/transmitting elements may be used depending on the requirements of the application for which they are used. This includes, for example, arrangements having different sub-aperture overlaps (or no overlaps), different aperture dimensions, arrays which are wider than they are tall etc.

Whilst the receiving array 220 (and sub-arrays 222) shown in FIG. 6(a) are planar, it will be appreciated that they may be conformal to some other known shape. It will be further appreciated that each transmitting array 210 (or element 214) may form part of the receiver array (or possibly a receiver sub-array).

The radar comprises a signal processing module 240 (such as a computer processor or the like) configured such that signals which are coherent with the transmitted signal may be introduced and used to determine the amplitude, frequency, delay and phase of all signals received at each element or sub-array. The processor module is also configured for the formation of multiple beams by combination of different signal channels with suitable amplitude and phase weightings. The processing module 240 is configured for performing the signal processing tasks required by the application for which the holographic radar is to be used, for example, beamforming, range gating, Doppler processing, low threshold detection, target tracking (e.g. XYZ, Vxyz, A/Phi(m, n, t)), imaging and/or classification.

The processing module 240 and the control module 250 may form part of the same processing apparatus configured to control radar signals transmitted by the transmitter array and to process return signals received by the receiving array.

The arrangement of sub-arrays 222 and receiving elements 220 allows multiple (overlapping) beams to be formed (e.g. one for each of the different sub-arrays 222), by the processor, which have substantially the same look direction, thereby permitting monopulse sub-beam angular measurement. The use of a plurality of sub-arrays 222 permits greater measurement accuracy than phase monopulse angular measurement using, for example, a single array of closely spaced receiver elements.

It will be appreciated that although phase monopulse angular measurement is described, the receiver elements and/or receiver sub-arrays may be arranged to allow amplitude monopulse angular measurement.

It will be further appreciated that a plurality of sub-arrays may also be arranged having different look directions, effectively creating a plurality of separate apertures/sub-apertures. The sub-arrays may be arranged, for example, to provide a wider (for example 360°) coverage. Similarly, the sub-arrays may be arranged to look at a known man made or other obstacle from (slightly) different locations thereby allowing targets which would otherwise be obscured by the obstacle to be resolved with greater accuracy. If, for example, the radar is located at a wind farm the receiver sub-arrays may be arranged to 'look around' turbines which otherwise obscure part of their individual fields of view.

Thus, whilst beamforming on transmission is a process with a single, physically-exclusive outcome, on reception as many beams can be formed as the configuration of the receiver array and the available processing resources can support. Hence, whereas transmission beams must be directed sequentially, receiving beams may be formed simultaneously.

All targets in the illuminated volume may therefore be illuminated at a rate (for example a pulse rate) sufficient to exceed the Nyquist limit for Doppler shifts associated with all targets, subject to the holographic limit.

In this way the signals from all targets are fully sampled, information loss is minimised, and alias effects are avoided, resulting in the ability to: perform precision tracking and coherent tracking; reconstruct imagery; characterize behaviour; classify targets etc. Tracked targets are represented in computer memory not only in terms of XYZ and Vxyz as a function of time, but also in terms of the Doppler phase and amplitude history of the target.

Signals received by the subarrays may simultaneously be combined in a first data stream such that the amplitude and phase weightings provide a null in the direction of the land or sea surface, to reject surface targets, and in a second data stream such that the amplitude and phase weightings provide a null in the direction of raised objects such as wind turbines, allowing the observation of surface targets and rejection of turbines or aircraft. Separate filtering and tracking algorithms can then be applied to the two or more data streams.

The received return signals effectively represent observations (which may or may not represent a target of interest) made by the radar in each of a plurality of signal channels. In the radar, data extracted by the processor for each observation is stored in process 'pixels'. Each pixel may be considered to be a unique set of numbers representing, for example, a single combination of time, range, range rate and/or Doppler frequency, and at least one of beam number, sub-array number, and/or element number.

The pixel content comprises a list of numbers representing, for example, a series of amplitudes, phases and/or frequencies representing the characteristics of the associated observation, which may constitute a target, an item of clutter, or a 'null', whose behaviour may be deemed insignificant. Observations are deemed significant until they are reliably known to be insignificant and a history of the information (e.g. phase histories, amplitude histories, or the like) extracted from the observations is retained. This approach contrasts with the process of thresholding in which observations are deemed insignificant and discarded, without further processing, unless a particular parameter (or set of parameters) meets an associated threshold (or set of thresholds).

In a cluttered environment typified by a wind farm, therefore, the radar functions to form the best tracks possible for all targets, based on amplitude and phase histories, and to discriminate between significant and insignificant targets (or targets representing one class or another) at the end of the analysis rather than at the beginning. Coherent analytical processes can be applied to enhance or minimize targets of different types, since all signal information is retained within the signal and target memories.

Such a radar may be limited in its maximum range, either by intent, by limiting the delays at which signals can be received, or by default, when power, unambiguous range or Doppler coverage are too small, and should fall within the holographic limit. Such a limited-range sensor provides a natural basis for an 'in-fill' radar within a larger field covered by a standard air traffic control, air defence, marine radar or the like.

Thus, the configuration of the radar is such that, being holographic in its mode of operation, as described, it is capable of accommodating and discriminating targets and clutter in a densely populated environment.

Application as In-Fill Radar

Figure 9:
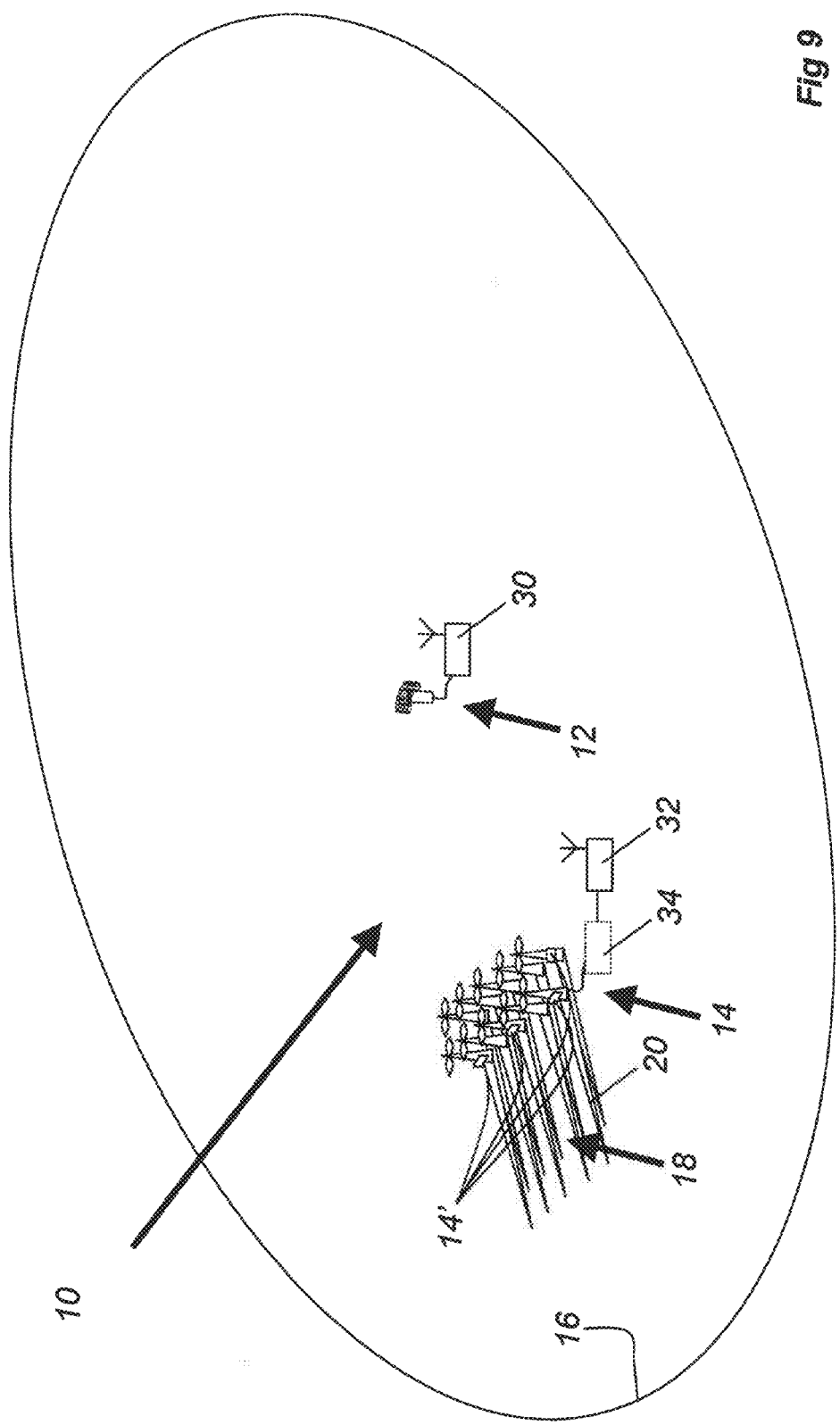
FIG. 9 shows an example of an enhanced radar system including an embodiment of holographic radar.

In FIG. 9 a first application of holographic radar within an overall radar service is shown generally at 10. The radar service 10 comprises a primary radar transmitter/receiver 12 and a secondary radar transmitter/receiver 14. The radar system 10 is configured for scanning a surveillance area 16 which includes a wind farm, another large group of structures, or the like, which causes interference to transmitted and reflected radar signals thereby resulting in a region 18 of reduced radar performance and hence a degraded detection capability (for example as a result of shadowing 20, modulation effects, cascading reflections, or the like).

The primary transmitter/receiver 12 comprises the main transmitter/receiver of an existing or new radar system (for example the transmitter/receiver antenna(s) of an existing air traffic control system or the like).

The secondary transmitter/receiver 14 forms part of a holographic radar system, generally as described previously, in which the information on targets contained in a particular volume of space illuminated by the radar can be represented by information within the radar signals returned from within that region. The secondary transmitter/receiver 14 comprises an array of radar sensors 14' provided at appropriate locations for illuminating the region(s) of reduced radar performance. Each radar sensor 14' is mounted at the wind farm, for example attached to the tower of an appropriately located wind turbine. Alternatively or additionally one or more of the radar sensors may be located away from the wind farm to create a desired detection field for the secondary transmitter/receiver 14. It will be appreciated that whilst use of an array of sensors is advantageous a single radar sensor may be used in certain applications. The radar sensors may be located facing different directions from the wind farm and a plurality of such sensors may be arranged at different orientations around a wind turbine to give a wider angle of coverage.

As described previously, each radar sensor 14' comprises a static sensor as opposed to a rotating antenna, which might cause mechanical interference with the turbines. Furthermore static sensors are easier to install and are less susceptible to the harsh environment to be expected at a wind farm especially those sited offshore and subject to severe weather conditions.

The static sensors advantageously comprise arrays of transmitting and receiving elements (antennas) as generally described with reference to FIGS. 6(*a*) and 6(*b*). It will be appreciated however, that in another arrangement, the system may comprise a much simpler radar sensor one possible example of which is described in more detail below with reference to FIG. 13. The ability of the sensor to provide data for determining the position of targets is provided for by the relative location of the different receiving elements (and/or sub-arrays of receiving elements). This allows calculation of phase relationships or delays between signals received at the different elements (or combinations of elements) of the receiving array and hence calculation and tracking of position.

Each radar sensor has a wide field of view (typically extending ~20 km) and can measure directions in both azimuth (typically ~90° or greater) and elevation (typically ~20°). Wider angle (for example 360 degree) coverage is provided by installing a plurality of antenna arrays (or sub-arrays), pointed appropriately, or by one or more non-planar arrays. These may be positioned separately, may be located at different positions around the perimeter of a turbine support shaft, or may be attached to different turbine supports.

A plurality of sensors 14' may also be provided which have the same look direction but effectively having non-coincident overlapping sub-apertures as described previously. This allows multiple beams to be formed with the same look direction from the different sub-arrays and hence permits monopulse sub-beam angular measurement of greater accuracy.

Figure 10:
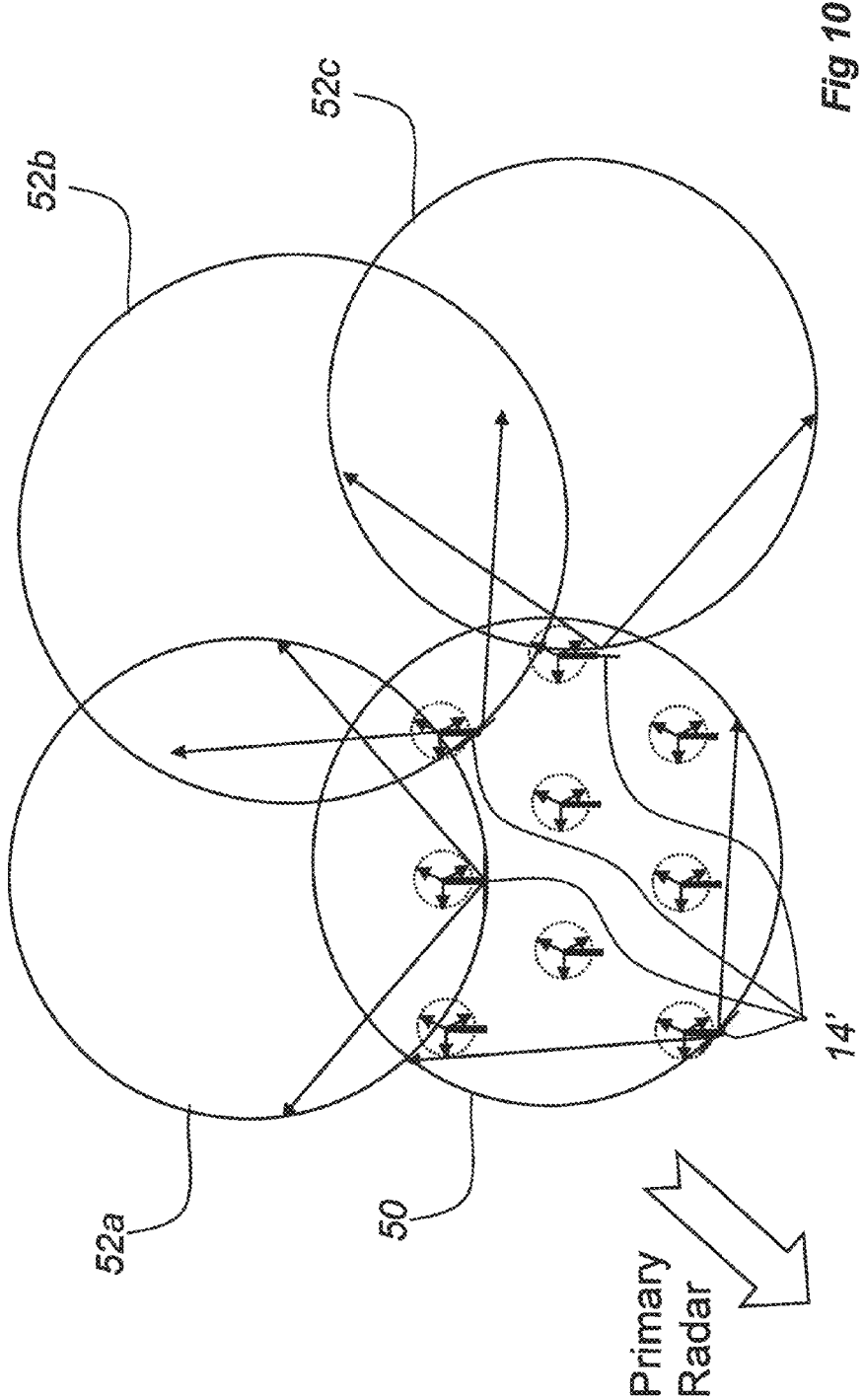
FIG. 10 shows a possible arrangement for the enhanced radar system according to FIG. 9 and the associated azimuth field of views.
Figure 11:
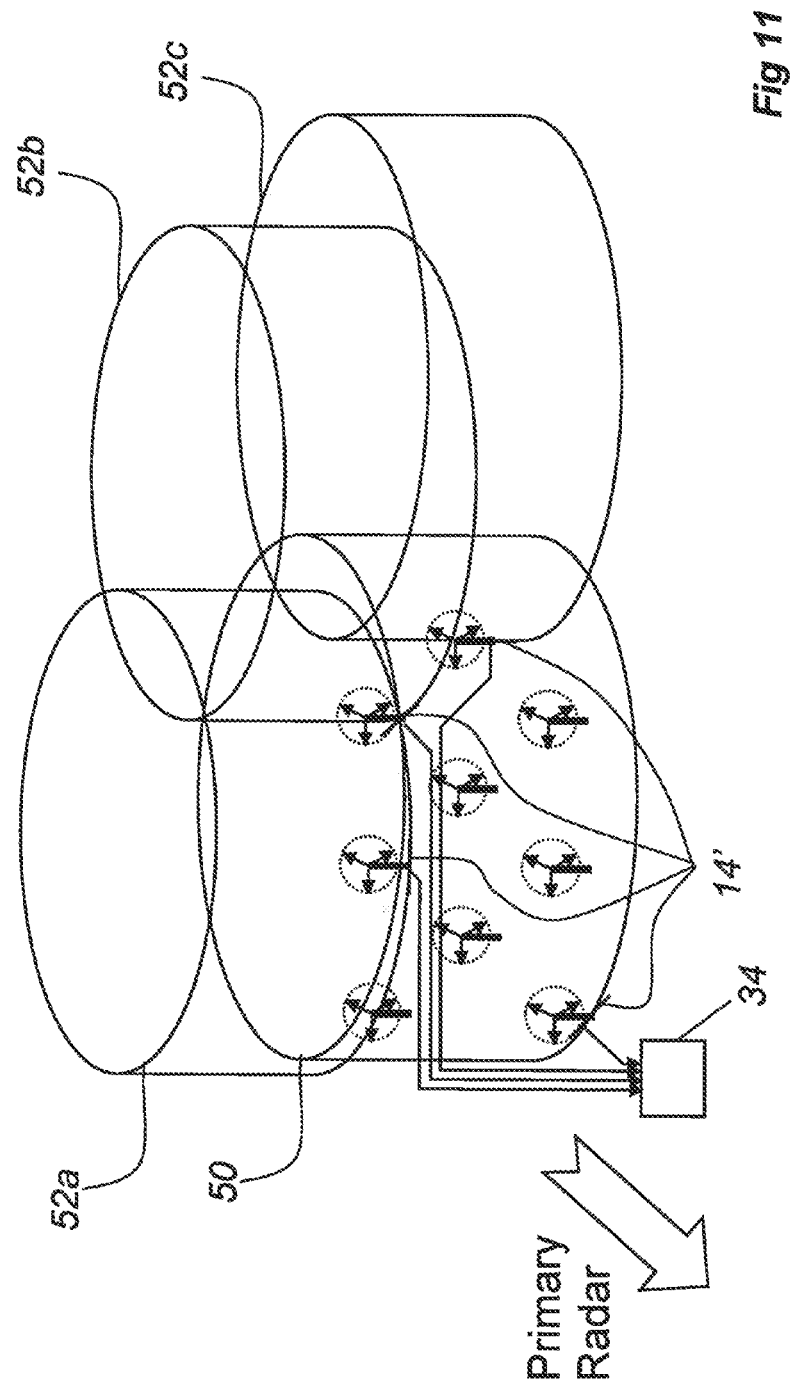
FIG. 11 shows the radar system arrangement of FIG. 10 and an associated field of views.

A possible arrangement of radar sensors 14' is shown in FIGS. 10 and 11. The arrangement comprises four sensors; a first of which illuminates a first region 50 comprising the wind farm itself (or a part thereof); and the remaining three of which together illuminate a further region (comprising smaller regions 52*a*, 52*b*, 52*c*) extending away from and beyond the wind farm (relative to the primary transmitter/receiver). The first sensor is configured such that the first region 50 extends not only in the general direction of the wind turbines but also extends to cover an area above them. Thus, the first sensor persistently illuminates the turbines allowing them to be continuously sampled and Doppler resolved. Coherent tracking by the processing apparatus allows turbine and target returns to be resolved in either range or Doppler.

Each sensor is located relatively low on an associated turbine tower and may be provided with an upward bias to cover a cylinder of obscuration in three dimensions as illustrated in FIG. 11.

Radar return signals received by the primary transmitter/receiver are processed by appropriate processing apparatus 30/32 typically at the location of the primary transmitter/receiver (e.g. the air traffic control tower or the like) or distributed between a remote processing capability 30 at the location of the primary transmitter/receiver and a local processing capability 32 at the wind farm. The processing apparatus may of course be located exclusively at the wind farm itself. The processing apparatus analyses the return signals to detect and track objects of interest as they traverse a surveillance area (detection field) of the primary transmitter/receiver into/out of the region of reduced radar performance.

Figure 12:
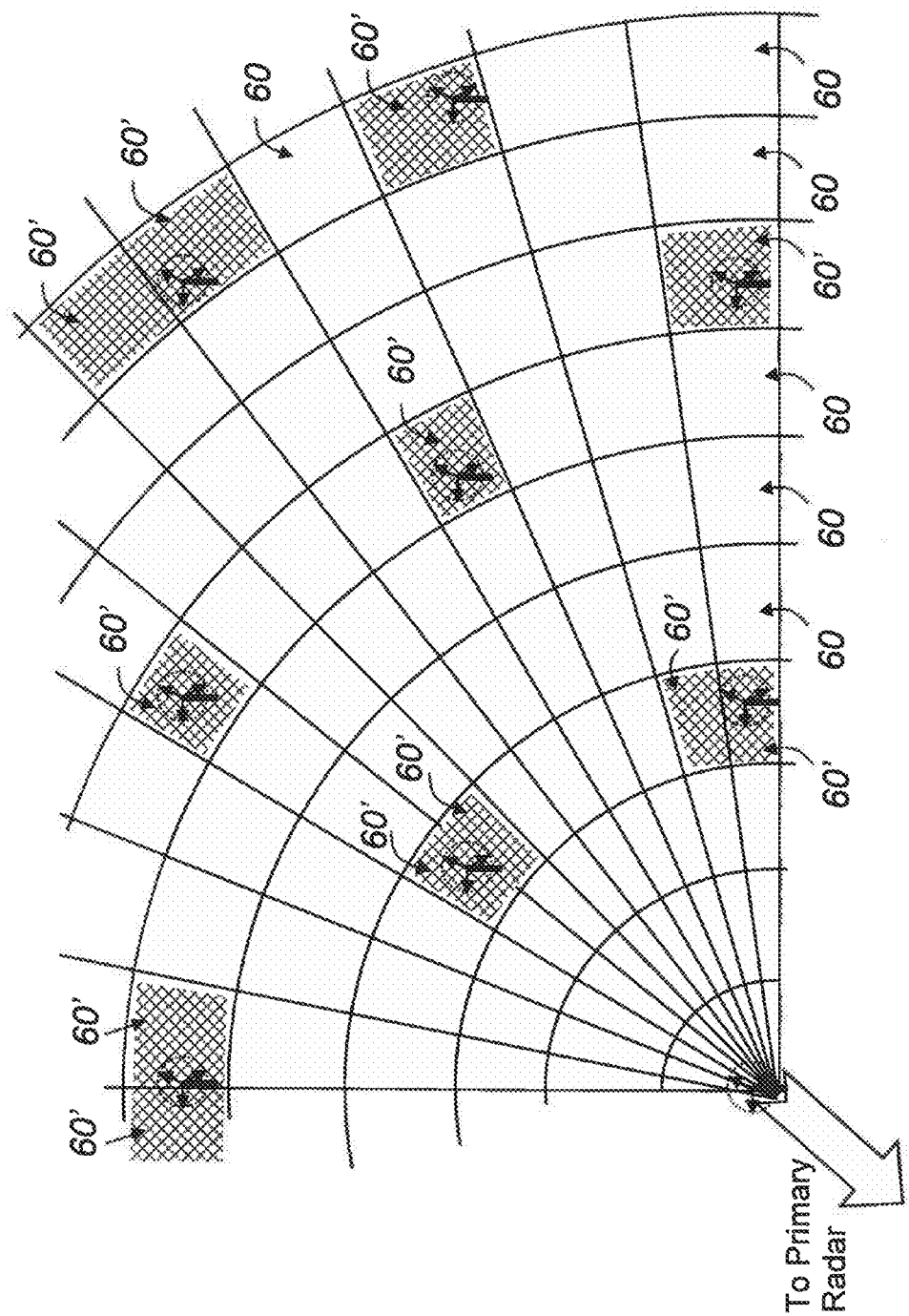
FIG. 12 illustrates the use of the radar system of FIG. 9 to discriminate against wind turbines.

As seen in FIG. 12 the volume or region of interest may be sub-divided using appropriate beam forming and range gating into sub-regions 60, some of which 60' are occupied by wind turbines (or are at least affected by their presence). The sub-division of the volume of interest allows turbine rejection to be applied selectively, thereby minimising the possibility of false rejections.

A typical procedure followed by the processing apparatus 30/32 for turbine rejection (e.g. for signals received by the sensor array associated with region 50) will now be described by way of example only. Typically the processing apparatus treats the holographic system as linear and begins by forming beams for the different sub-arrays including beams covering the turbines in the illuminated volume (Beam 1, 2, 3 . . . n(turbine(1)) . . . ). Range gates are then formed including range gates for the illuminated turbines (RG 1, 2, 3 . . . m(turbine(1)) . . . ). A Fast Fourier Transform (FFT) is applied to each range gate/beam product (RG×Beam) and a high pass Doppler filter is applied to the resulting FFT for each range gate/beam product associated with a turbine (RG(m)×Beam(n) . . . RG(p)×Beam(q)). A coherent tracking algorithm (to track phase across the range bins) may then be applied.

In this manner returns from turbines can be effectively rejected. False alarm detections are severely restricted and residual dropouts are limited to slow passes within the range gate and beam.

Radar return signals received by the secondary transmitter/receiver (which are less affected by the presence of the interfering structures due to the absence of Doppler aliasing) are appropriately analysed and integrated with data from the primary transmitter/receiver by the processing apparatus to enhance detection and/or tracking of the object of interest whilst it traverses the region of reduced radar performance.

Data representing targets detected by the secondary radar sensors are communicated from the secondary transmitter/receiver to the processing apparatus by suitable communication apparatus 32 for subsequent integration with data generated by other radar sensors. Typically, for example, the communication apparatus are configured for wireless communication between the secondary transmitter/receiver and the processing apparatus.

It will be appreciated that the secondary transmitter/receiver may alternatively or additionally be provided with a dedicated processing capability 34 for carrying out preliminary analysis on the signals received by the secondary radar sensors 14' before subsequent transmission to the processing apparatus for further processing of the signals and integration with data from other sensors. For example, tracks of potential targets of interest may be filtered prior to transmission for processing by the processing apparatus at the primary transmitter/receiver which is particularly useful for air traffic control systems. Alternatively (or additionally) the raw data may be transmitted for processing by the processing apparatus at the primary receiver/transmitter (e.g. for air defence systems).

It will be appreciated that the arrangement of the system allows target tracks to be extracted by the processing apparatus in parallel if required.

Typically the sensor has dimensions of the order of a few meters high by a few meters wide, for example, ~6 m high by 3 m wide. The sensor is typically mounted on a turbine at a height of between 5 m and 25 m above ground/high water level, for example, ~15 m above. The sensors are typically mounted with an upward bias of a few degrees, for example ~10°. Alternatively the sensor may be mechanically vertical but the beams electronically steered with an upward bias. It will be appreciated that these examples are purely illustrative and that there may be significant variation in the most suitable implementation used for any particular application.

The processing apparatus is also configured for defining a detection zone for the secondary transmitter/receiver, within the normal detection field of that transmitter/receiver, outside which the secondary transmitter/receiver does not report objects of interest. The detection zone is defined to be generally coincident with the region of reduced radar performance thereby avoiding unnecessary duplication of processing, activity (for example, by limiting processing of signals from the secondary receivers to times when enhancement is required). The processing apparatus may be configured to define separate detection zones for each radar sensor of the secondary transmitter/receiver which may overlap or may comprise distinct non-overlapping regions. Definition of detection zones is described in more detail below.

Application in Pre-Emptive Environmental Condition Detection

Figure 13:
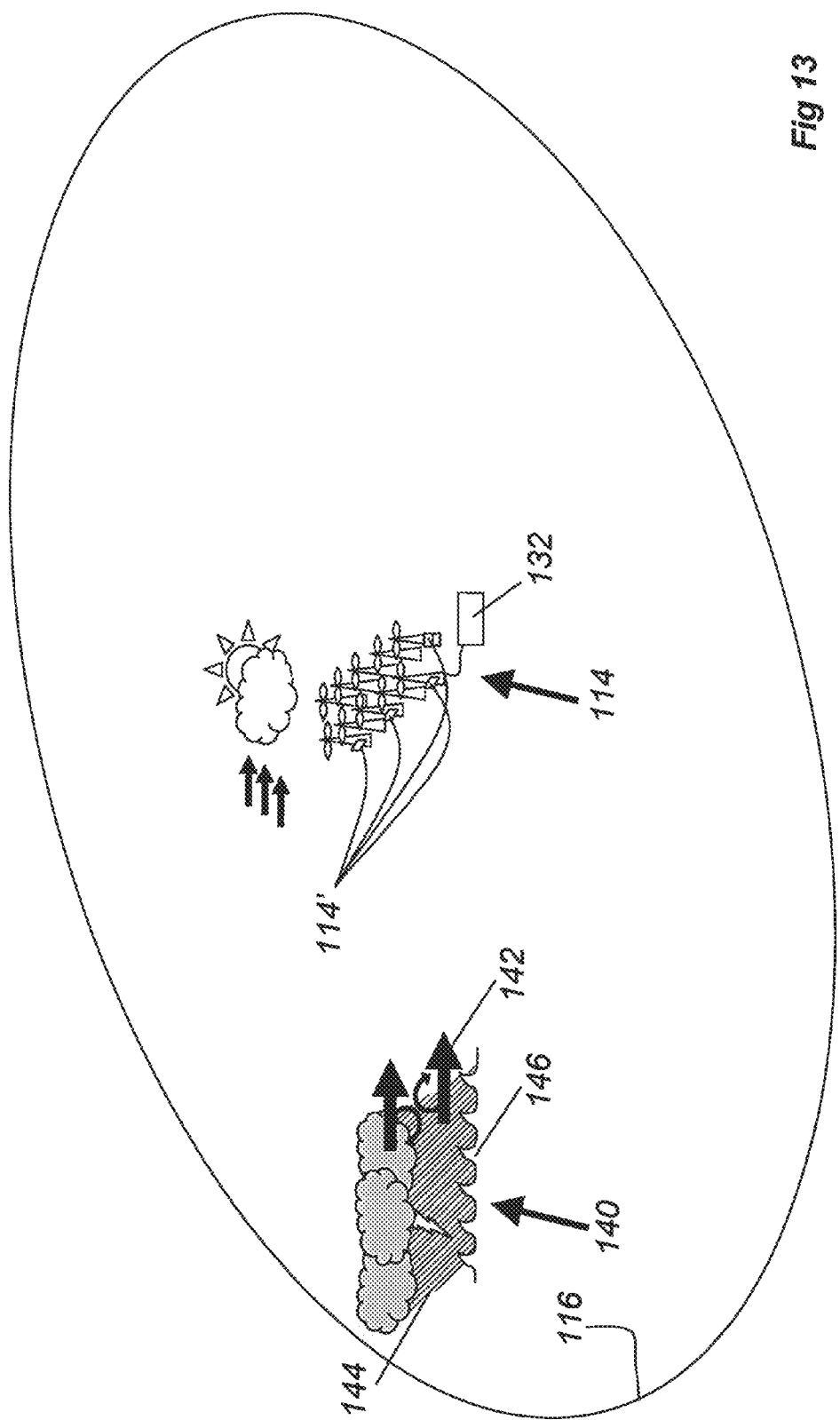
FIG. 13 shows another example of an enhanced radar system including an embodiment of holographic radar.

A further application of such a radar is illustrated in FIG. 13 which shows a radar system 110 in which pre-emptive measurement of wind field can be made in preparation for wind energy generation or in real time as wind eddies or the like approach a wind farm or individual wind turbine. In this case precipitation, eddies and turbulence in the wind cause the scattering of radar signals that can be detected, leading to imagery of the wind field itself.

The radar system 110 comprises a transmitter/receiver array 114' located at a wind farm generally as described previously with the transmitter element(s)/array(s) arranged for illuminating a region 116 of interest either around the wind farm as shown or in a particular direction of interest.

The system 110 includes processing apparatus 132 configured for processing signals returned from within the illuminated volume to extract indicators of prevailing environmental conditions 140 within the volume at some distance from the wind farm. These indicators are analysed by the processing apparatus and the relevance of the environmental conditions 140 which they signify, to the wind farm, is determined. The processing apparatus determines appropriate (optimal) operating parameters for the wind farm (or one or more individual turbines) based on this analysis and outputs the parameters for use in controlling the wind turbines. The output may include timing data to indicate a time at which the current operating parameters of the wind farm should be modified based on a prediction of when the environmental conditions of interest will reach the turbines.

The processing apparatus may, for example, determine that specific environmental conditions 140 are approaching a wind-farm from somewhere in the illuminated volume and that the conditions are of a type (such as changes in the characteristics of the wind) relevant to the wind farm's operation (e.g. its efficiency, its generation capability, its robustness and safety, or the like). Hence, based on this analysis, the processing apparatus provides wind (or other environmental) parameters appropriate to determine operating parameters of the wind farm (or one or more individual turbines) for when the approaching environmental conditions arrive.

The radar system 110 may comprise a controller for adjusting the operating parameters of the wind farm, individual turbines, and/or individual turbine components (e.g. blades) or may be configured for compatibility with an existing controller at the wind farm. Accordingly, the processing apparatus is configured for outputting operating parameters in a suitable format for interpretation by the controller. It will be appreciated that whilst automatic control of the turbines in response to predictions of changing environmental conditions is desirable, the output from the processing apparatus may include visual or audible signals for interpretation and implementation by an operator of the wind farm.

The operating parameters may comprise any modifiable attribute of the wind farm including, for example, the angle which a turbine faces, the pitch of each blade, the status of each blade (e.g. feathered or operational), the status of each turbine (e.g. operational or shut-down), and/or the like.

The environmental conditions may comprise any radar detectable conditions including, for example, wind characteristics 142 (e.g. wind speed, wind shear, turbulent eddies, or the like), precipitation/air borne moisture characteristics 144 (e.g. density, type, etc.), and/or any surface effects 146 (such as wave formations for off-shore facilities).

The mean air flow past a wind turbine affects the available energy, according to a substantially cubic dependence. However the efficiency and safety of a wind turbine is related to variations in the wind speed. A high wind speed near the top of the turbine (assuming a horizontal spin axis), and a lower wind speed closer to the surface (whether the ground or the surface of the sea) can lead to inefficiency given that the upper and lower blades move at the same speed. This can be mitigated by modifying the pitch of the blades during rotation between upper and lower positions. Hence, the processing apparatus is configured to take account not only of the overall environmental conditions in the region of interest (for example average wind speed) but also to take account of localised differences (for example stratified wind speeds, and/or those resulting from turbulence) in the weather patterns.

When a turbulent burst impinges on the turbine the blades may be affected in such a way that stresses build up in directions that can not be accommodated by circular motion of the airfoil. This may represent a hazard to the turbine or its surroundings, and could result in its destruction. In that case it may be beneficial to 'feather' the blades, or otherwise modify their pitch in time, which may be possible if some seconds' advance warning of the burst is available.

The indicators of the environmental conditions may be associated with any environmental features which cause radar reflections. For example, when air moves across the land or sea surface, wind shear and turbulent eddies are generated. Hence, the flow of precipitation (or suspended moisture) in the air is also modified by the air motion. As the density of air or windborne precipitation (or suspended moisture) varies, radar signals propagating through the air are scattered or reflected and may be received by a radar receiver. These signals may be detected and interpreted in terms of the air flow using the principles outlined above.

Whilst scattering in such environments is weak and occurs in the presence of larger, unwanted targets such as land or sea clutter, holographic radar as described may achieve the necessary sensitivity by sufficient coherent integration of scattered signals, and may be used to discriminate between the wind motion and the surface clutter in either case. Wind flow, for example, tends to be vertically stratified, and reflections at different layers may be resolved either by vertical receiver beamforming or by observing their different Doppler frequencies and measuring their phases across the receiving array.

Holographic radar located near a wind generation system can therefore allow wind patterns to be measured beneficially, either to assess the potential wind energy resource, or to enable improved control and safety of one or more installed wind turbines.

In a further environmental application of the holographic radar, the radar's vertical beam pattern may be digitally re-formed to achieve a high sensitivity in the plane of the sea surface, rather than the minimum sensitivity required in the case of wind imaging against sea clutter. In this case the signals generated by waves are observed rather than rejected, and the holographic radar may then be used as a wave sensor.

In each application, the fact that data from all observations is retained and processed, rather than discarded according to specific thresholds, means that the applications can be implemented in parallel with the processing apparatus configured to analyse the stored wind farm associated data purposively in dependence on the requirements of the specific application. For example, information on environmental conditions may be considered irrelevant to the augmentation or 'in-fill' application and so may be ignored for the purposes of improving the detection capability of an air traffic control, air defence and/or marine radar system. Contrastingly, for the purposes of ensuring optimum operating conditions at the wind farm, this same environmental information may be extracted and analysed whilst information on moving objects such as aircraft, ships, or the like is ignored.

Antenna Arrays

Figure 14:
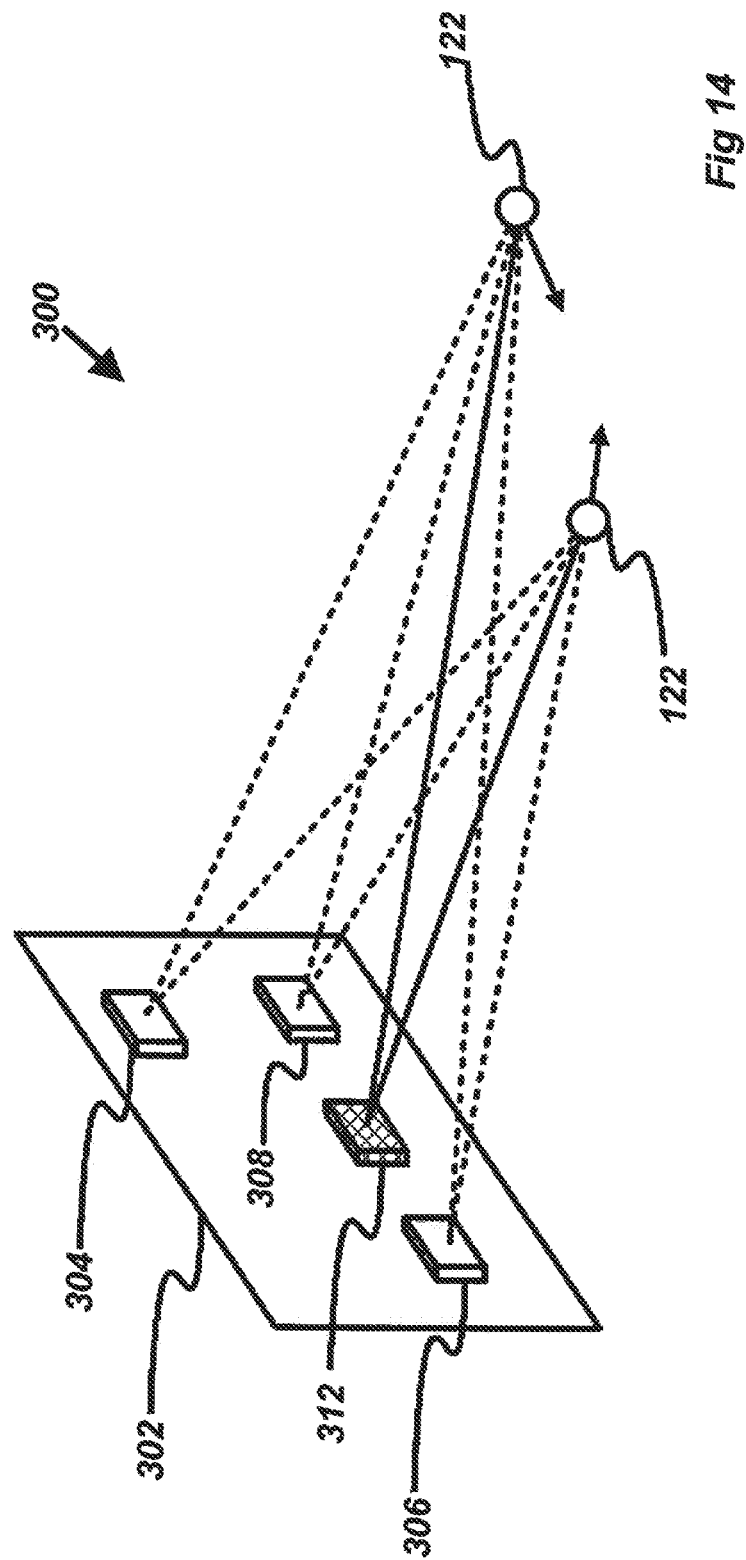
FIG. 14 shows a simple static sensor array suitable for use in embodiments of the radar system as described herein.

With reference to FIG. 14, there is shown a diagrammatic representation of a planar antenna array 300 suitable for use as a static sensor or the like in an embodiment of this invention.

The antenna array 300 is constructed on a (preferably insulative) substrate 302. The substrate may be a block of plastic or glassfibre composite material (or similar) having a flat supporting surface. In order that embodiments of the invention are available for use where space is restricted, the antenna array is compact, having a peripheral size depending on the arrangement of antenna. For example, the array may comprise an offset transmitter antenna and a trapezoidal/triangular receiver array, with the transmitter element comprising a four by two sub-array and each receiver element comprising a two by two sub-array. Alternatively the array may be arranged with a central transmitter and four peripheral receivers. Antenna elements are formed on the supporting surface of the substrate as conductors printed onto the surface. The antenna elements may be dipoles (for example, bow-tie dipoles), TEM horns, microstrip patches, stacked patches, or any other compact element or conductive structure suitable for operating at the required signal frequency. Such an antenna is described in WO01/059473; and is generally best suited for short range applications in which high sensitivity is less important and in which fewer targets are expected within the detection field.

For applications requiring higher sensitivity and the ability to resolve more targets a higher-power transmitter array and a larger receiver array may be required, each of whose sub-arrays has the same field of view as the transmitter array.

It will be appreciated that the elements/sub-arrays may not be mounted on a common substrate for mechanical robustness. In such an arrangement however, the elements/sub-arrays may still be mounted in a common plane.

In the example of FIG. 14, the array 300 has four antenna elements in total. Three of these elements are first, second, and third receiving elements 304, 306, 308 although other numbers of receiving elements, such as two, three, five or more, may be provided. The fourth element is a transmitting element 312. The receiving elements 304,306,308 are disposed at the vertices of a triangular shaped (which may, in a special case be a right angled triangle) locus, and with more elements these could be disposed at the vertices say of a trapezoid or an irregular planar locus. In the case of a three-dimensional substrate they may be at the vertices of a cuboid or other solid form. The transmitting element 312 is disposed at the centre of the same locus.

Subject to the requirements for sensitivity and resolution the size of the antenna array is preferably kept to a minimum. For example, in this minimum case, the spacing between the elements may be in the order of no more than a few half-wavelengths. For example at an operating frequency of 6 GHz, spacings may be a few centimeters, say between 1 and 10 cm, preferably between 2 and 8 cm.

In an alternative form of construction, the antenna elements may be located within a dielectric radome. Associated signal processing circuitry may also be located within the radome in order to provide the apparatus as a self-contained package. It will be appreciated, however, that the array may comprise any suitable configuration, and where accurate positional information is not required may comprise a single receiver antenna.

Defined Detection Zone

As described above, in the case of the detection augmentation application, the processing apparatus may be configured to sub-divide the detection field of the secondary transmitter/receiver into a first zone in which detection events are considered to be significant for the purposes of enhancing radar performance (a detection zone), and a second zone in which such radar enhancement is not required. Similarly, for the purposes of environmental condition analysis the processing apparatus may be configured to sub-divide the detection field into a plurality of different zones, for example for which different types of analysis may be performed (e.g. to allow the effects of different physical surface features such as localised land (or water) masses or environmental conditions to be catered for). The sub-division may be carried out by any suitable means, typically by a software program based on combining signals from different sub-arrays with appropriate phase and amplitude weightings.

The processing apparatus may operate to execute an algorithm that defines a 3-dimensional volume of space within the detection field as the detection zone. For example, the detection zone may be defined to lie between spaced planes by specifying that it is bounded by minimum and maximum values of X, Y, and Z ordinates in a Cartesian coordinate system within the detection field of the array. Alternatively, the detection zone may have an arbitrary shape, defined by a look-up table or a mathematical formula. Thus, the detection zone can have substantially any shape that can be defined algorithmically, and can have any volume, provided that it is entirely contained within the detection field. Flexible detection zone definition such as this is particularly advantageous in defining a zone in which enhancement is required because the regions of reduced radar performance may be subject to change, for example as new wind turbines are added to existing farms or as existing turbines are switched out of operation for maintenance purposes. Similarly, in the case of environmental condition detection, the flexibility allows a zone to be set-up to track a particular environmental feature of interest (e.g. a storm, squall or microburst).

In the case of radar augmentation, the processing apparatus may be operative to detect and track entry of an object of interest into and through the detection zone and to integrate data from both the secondary and primary transmitter/receivers thereby to enhance detection within the region of reduced radar performance.

As a development of this embodiment, the processing apparatus may define a plurality of detection zones. The detection zones may be non-coextensive (overlapping, separated or spatially different) and/or alternatively defined, by which it is meant that different characteristics are used for determining whether an object (or a particular environmental condition) is in the relevant detection zones. For example, different zones may be provided for detecting different speeds or different sizes of objects. This can, for example, be used to ensure continuous tracking of objects of different sizes and/or speeds into and out of the region of reduced performance.

In another development of this embodiment, the processing apparatus is operative to analyse characteristics of objects (or prevailing environmental conditions) outside of the detection zone. Such characteristics may be, for example, size of the object, distance of the object from the apparatus and/or the detection zone, direction of movement of the object relative to the apparatus and/or the detection zone, and relative speed of the object. As an example, the processing apparatus may be operative to track objects outside the detection zone and to predict their entry into the detection zone. It will be appreciated that such functionality is equally beneficial for monitoring the movement of environmental features of interest relative to the defined detection zone(s).

A further embodiment is summarised below by way of example only.

The embodiment is directed to augmenting the function of surveillance radar systems in the presence of new structures, for example to ameliorate the effect of new structures, and in particular wind farms on air traffic control radar systems.

The embodiment comprises the combination of a suitable form of radar sensor or sensors with the method of enhancing air traffic control by mounting them at the wind farm itself for example attached to the turbines.

Each radar sensor is one that does not require a large, rotating antenna, thereby avoiding mechanical interference with the turbines. A static sensor will be easier to install and less susceptible to the harsh environment to be expected at the wind farm. Many wind farms are sited offshore and are subject to severe weather.

A preferred implementation of the radar sensor is one using static (preferably asymmetric) arrays of transmitting and receiving elements whose region of illumination is the whole field of view and whose regions of sensitivity may be selected within that field. Their ability to measure the position of targets is provided by calculation of phase relationships or delays between signals received at different elements or combinations of elements of the receiving array.

Each radar sensor has a wide field of view and can measure directions in both azimuth and elevation. 360 degree coverage is provided by installing more than two planar antenna arrays, pointed appropriately, or by one or more non-planar arrays. These may be positioned separately, may be located at different positions around the perimeter of a turbine support shaft, or may be attached to different turbine supports.

Data related to targets detected by the radar sensors are communicated preferably by a wireless or optical link to the user, the air traffic control/air defence system or systems and integrated by suitable computer software with the data generated by other radar sensors.

Broad Beam Transmitter

As described for the holographic implementation above, the transmitter illuminates the whole volume of a field of view substantially (or indeed entirely) simultaneously. The receiver array of the holographic radar may comprise sub-arrays having any suitable arrangement of receiver elements, each having appropriate dimensions. Accordingly, the sub-arrays may be very small comprising only a few elements or even a single element. For example, as shown in and described with reference to FIG. 14 the receiver array may even comprise a plurality of individual receiver elements (each of which can be thought of as equivalent to a 'sub-array' comprising a single receiving element). Each receiver element or subarray receives signals from the same volume and beamforming and monopulse algorithms are applied to resolve the positions of targets.

In order to provide transmitter beam patterns which correspond to the field of view for each receiver sub-array (or element) as shown in and described with reference to FIG. 1(b), the transmitter may be designed to have a transmitting antenna aperture which is smaller than that of the receiver array but equal to that of the sub-array. Accordingly, in the holographic implementation described with reference to FIGS. 6(a) to 6(c) above, the transmitter array comprises the same number of transmitter elements as the receiver sub-array. Therefore, where the receiver sub-arrays are small (or where the receiver comprises a plurality of individual receiver elements) the transmitter comprises correspondingly few transmitter elements (or even a single transmitter element) through which all the transmitted power must be radiated. This results in a significant demand being placed on the transmitting circuitry in the control module 250 (including, for example, the signal generator amplifier, and/or power combining networks).

Another advantageous exemplary embodiment of a holographic radar in which the demand on transmitter circuitry may be reduced is shown in FIG. 15 generally at 400. The holographic radar 400 comprises at least one array 410 of transmitting elements 414 configured to illuminate a whole volume of interest simultaneously generally as described previously. The radar includes a control module 450 configured for controlling the signals transmitted via the transmitter array 410 in dependence on the nature of the application for which the holographic radar is to be used.

The holographic radar also includes a receiving array 420 comprising a plurality of individual receiving elements 424. Each element 424 of the receiving array is arranged to receive signals returned from substantially the whole of the illuminated volume, each element 424 essentially forming a signal channel. The receiving array 420 contains more elements than the transmitter array 410 and has a substantially larger total aperture. The receiver array is provided with signal processing module 440 as generally described previously with reference to the signal processing module 240 in FIGS. 6(a) and 6(c).

In this embodiment, the transmitter array comprises an extended array having a plurality of antenna elements and, accordingly, comprises a greater number of transmitter elements than the single receiver element used for each receiver signal channel. Using the extended array helps to mitigate the demands on the transmitting circuitry required for each transmitter element, when compared to use of a single transmitter element. It will be appreciated that although a square three by three array of transmitting elements is shown the extended transmitter array may comprise any suitable number of transmitting elements in any suitable arrangement. For example, the transmitter array may comprise as many as 20, 50, 100 or even more transmitting elements arranged in a square, rectangular or other appropriate shape array.

Generally, as a skilled person would understand it, an extended array of transmitter elements would inherently result in a narrower transmitter beam than that of each receiver sub-array (or element) as illustrated in FIG. 16(a)

and, accordingly, transmitter beam patterns which do not correspond to the field of view associated with each receiver element.

In order to allow transmitter beams to be generated which correspond (or virtually correspond) with the broad field of view desired for each receiver element, the control module in this embodiment is configured, with the antenna element interconnections, to control the phases and/or amplitudes of the radar signals transmitted by the transmitter elements forming the extended array. More specifically, the control module is configured to adjust the phases and/or amplitudes of the signals to tailor the transmitter beam (for example in a progression across the array) to form the desired beam pattern.

As shown in FIG. 16(b) for example, the phase of the signals transmitted from a planar array of transmitter elements may be adjusted to approximate a broader beam pattern that would be expected if the transmitter elements were located on a smooth curved surface such as a cylinder, sphere or dome. The amplitude of the transmitted signals may similarly be adjusted to further tailor the beam pattern and, in particular, to mitigate edge effects such as side lobe formation by tapering the signal amplitude toward the edge of the extended transmitter array.

Thus, in this embodiment, an extended 'multi-element' transmitting array is used but the amplitudes and phases of the elements are adjusted (or controlled explicitly) to generate a widely diverging beam instead of a narrow beam. Hence, in the transmitter circuitry, different sub-circuits may be used for each transmitting element and their combined power is radiated over the wide field of view. This mitigates the need either for a single, very high-power transmitting circuit, or for combining the power outputs of many transmitter sub-circuits into a single feed (which would result in associated losses).

In a variation of this embodiment the transmitter elements may be arranged in a non-planar configuration on the planar facets of a polyhedral surface approximating the curved surface which the phase adjustments are intended to mimic. In this case the phase (and amplitude) modifications required to produce a broad beam pattern (and mitigate edge effects) corresponding to that of the receiver elements can be simplified when compared to a planar transmitter array. The use of a polyhedral shape has the advantage that it is easier to fabricate than a smooth curved surface and therefore represents a good compromise between a planar transmitter array which requires relatively large phase adjustments and the relatively costly fabrication of a smooth curved transmitter surface. The structure could, for example, be any appropriate polyhedral shape such as a prismatic, pyramidal or geodesic shape.

Discrimination Based on Spread of Doppler Spectrum

Generally, conventional systems directed to mitigating the effects of moving clutter, such as wind turbines, on radar capability treat wind turbines as objects which effectively cannot be classified in their own right. Such systems are generally designed to reduce the effects of wind turbines on radar returns from objects of interest such as aircraft without actually tackling the root cause of the problem; an inability to effectively identify return signals originating from wind turbines and thereby separate them from return signals originating from other objects.

The implementation of a holographic radar system (as described previously) at or in the vicinity of a windfarm (either as a stand alone system or as an in-fill radar for a larger surveillance system), however, provides the possibility of significantly improving capabilities for actively discriminating between radar returns from wind turbines and radar returns from other objects of interest such as, for example, aircraft.

Accordingly, in another exemplary embodiment of the invention the holographic radar (implementations of which are described in more detail elsewhere) is configured to discriminate between signals returned from a wind turbine (or similar) and those returned from other targets. As described previously, the holographic radar is configured to operate within the holographic limit and, accordingly, is capable of measuring the full Doppler spectrum of a target with a resolution which depends on the observation interval.

In this embodiment the holographic radar is configured to carry out 10 observations a second and to measure a Doppler spectrum extending to a maximum Doppler frequency in the region of 1 kHz with a resolution of approximately 10 Hz. Thus, in operation, the Doppler spectrum measured by the holographic radar in this embodiment will comprise approximately 100 Doppler bins into which the Doppler spectrum of return signals may be divided. It will be appreciated, however, that the holographic radar may be configured to make observations using any suitable observation interval, over any suitable range of Doppler frequencies (subject to the holographic limit), and may be operable to measure a Doppler spectrum over any suitable range using any appropriate frequency resolution. In some applications, for example, observations may be made up to 10 kHz or even greater frequencies and the Doppler spectrum may be split into more than 100 Doppler bins, for example 200 bins, 800 bins, or even 1000 bins or more.

The holographic radar is also configured for forming a plurality of range gates defining a plurality of range bins (e.g. as illustrated in FIG. 12) into which targets detected by the radar may be categorised.

Figure 17B:
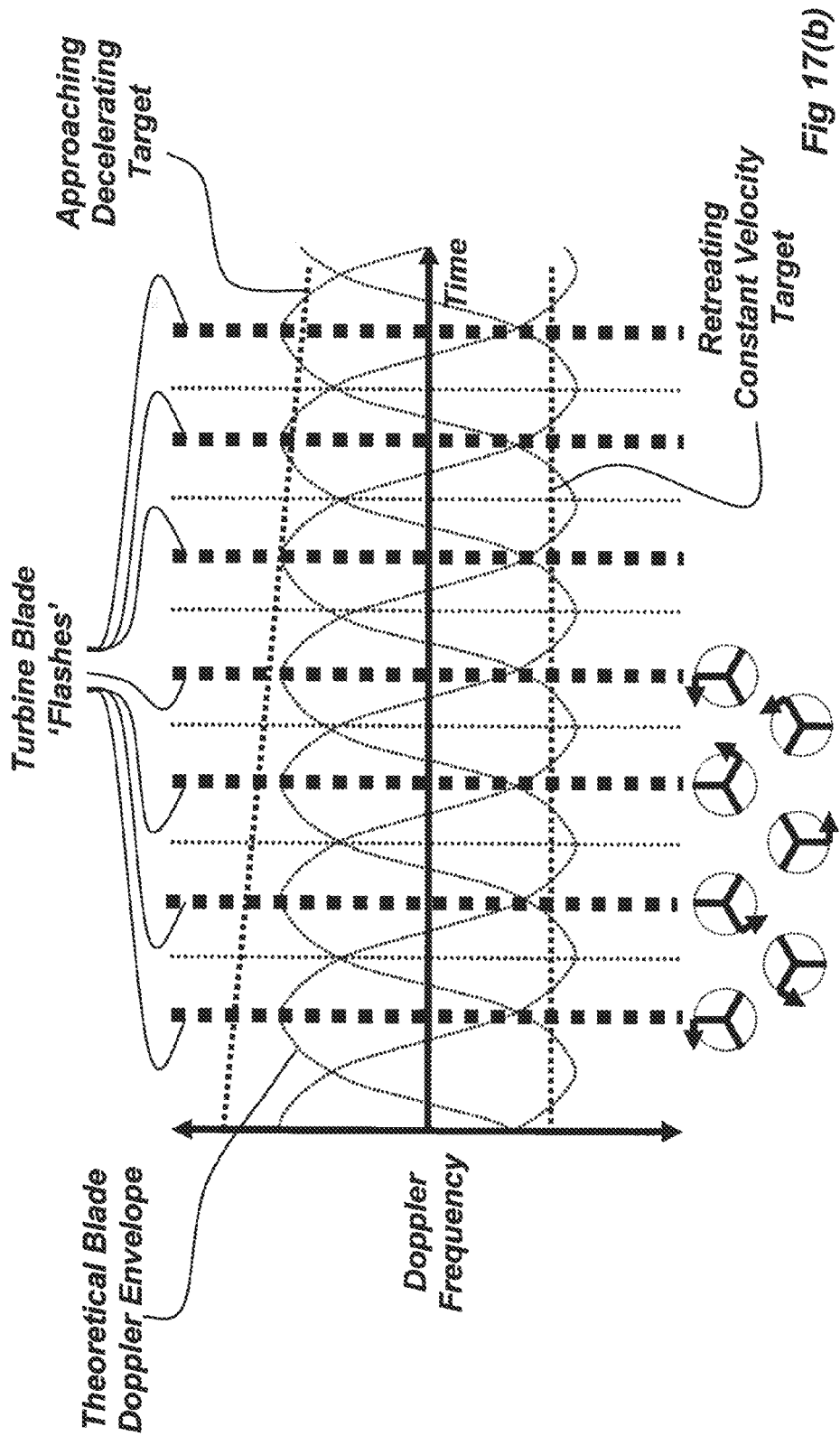
FIGS. 17(a) and (b) respectively illustrate Doppler-range and Doppler-time characteristics for different targets.

Exemplary Doppler-Range characteristics for different targets are illustrated, by way of example only, in FIG. 17(a) in which the arrows represent the evolution of the Doppler-Range characteristic for the targets over time. Exemplary Doppler-Time characteristics for the targets shown in FIG. 17(a) are illustrated in FIG. 17(b). It will be appreciated that FIGS. 17(a) and 17(b) are purely illustrative, and are simplified. Furthermore, other turbine designs (for example, vertical axis and/or helical blade designs) may yield significantly different Doppler characteristics.

As seen in FIG. 17(a), the Doppler spectrum associated with returns from a rotating turbine blade will generally be spread across the entire measured spectrum (10 Hz to 1 kHz in this embodiment). The effect of the turbine blade's rotation will therefore be observeable in most if not all 100 Doppler bins substantially simultaneously. Furthermore, since the turbine tower does not move in range, the effects of the rotation of the turbine blade will generally appear in only a single range bin.

Contrastingly, for the case of a typical radar operating frequency in the region of 1 GHz, the Doppler spectrum of an approaching or retreating target such as an aircraft will generally appear within only a single Doppler bin at a time (when subject to manoeuvres at less than 1 g ($9.81$ m/s$^2$)). Furthermore, as seen in FIG. 17(a) as the target approaches or retreats from the radar, it will be seen to move in range from one range bin to another.

In FIG. 17(b) the turbines are seen to exhibit turbine 'flashes', having Doppler components across the entire Doppler spectrum, as each blade (of the three blades in the illustrated example) in turn reaches an orientation (in a direction approaching the receiver) which is substantially perpendicular to the line of sight of the radar transmitter/receiver arrays.

At this point the returns from the blade are instantaneously coherent in phase resulting in a periodic, large radar cross-section flash. For the rest of the time, when the blades are not perpendicular to the line of sight, the vector sum of the different components is destructive, as a consequence of the variability of the phase. It is possible that 'flashes' may also be seen as each blade in turn reaches a perpendicular orientation when retreating from the receiver (shown as thinner lines in FIG. 17(b)) although these will tend to be less powerful, possibly as the result of the trailing blade edge having a lower radar cross-section than the leading edge.

FIG. 17(b) also shows a theoretical envelope for Doppler components seen for each blade between blade flashes. The edge of each envelope represents the theoretical Doppler components associated with the tip of the associated blade. In theory, Doppler components (for other parts of the blade) will be spread throughout the Doppler envelope although in practice the Doppler components may be more powerful (and hence more visible) as the blade approaches the receiver than when it retreats.

As seen in FIG. 17(b) the Doppler characteristics appear to 'swamp' other characteristics such as those shown for the approaching and retreating targets, especially during the turbine flashes. In the case of scanning radar these characteristics cause the aliasing previously discussed and effectively prevent targets of interest being discriminated from the effects of wind turbines.

The holographic radar in this embodiment, however, is configured to use the Doppler characteristics, in conjunction with range and historical information (which may comprise Doppler histories, range histories or both), to discriminate between signals returned from a wind turbine and those returned from targets of interest such as an aircraft, thereby allowing the wind turbine to be to detected and identified, and the target of interest to be detected, identified and tracked in the vicinity of the wind turbine.

The holographic radar of this embodiment is configured to identify a target in dependence on the spread of the Doppler components it produces across the Doppler spectrum. Accordingly, a target which appears simultaneously in more than a predetermined number (or proportion) of the available Doppler bins (referred to herein as the 'Doppler spread threshold') at substantially the same time (and at substantially the same distance) may be classified as a rotating object (such as a turbine blade). The Doppler spread threshold above which an object is classified as a rotating object (such as a turbine blade) may be any suitable number (or proportion) of Doppler bins typically, for example, anywhere between 5% and 100% (e.g. 5%, 10%, 20%, 50%, 80%, 90%, or 95%) of the available bins depending on the design of the wind turbines, and the expected nature of the targets of interest, which require discrimination from one another. An object identified and classified as a rotating object (such as a wind turbine) in this manner may then be ignored for subsequent threat analysis.

The holographic radar is also configured to retain and monitor historical data for detected targets (e.g. in 'process pixels'). Discrimination between wind turbines and other targets may therefore be further enhanced, based on this historical data, by analysing the range characteristics of the detected targets over time. If a target exhibiting a spread of Doppler above the Doppler spread threshold appears in a single range bin (or possibly a limited number of range bins), for example, and remains there for a predetermined number of observations, it is identified as a 'stationary' (in range) object exhibiting some form of rotation (e.g. a wind turbine). Contrastingly, if an object appears to move from one range bin to another over time it is unlikely to be a wind turbine regardless of the frequency components it exhibits (which may instead be associated with another rotating object such as a helicopter blade for example). It will be appreciated that changes in the azimuth angle of the object relative to the receiver may be used in a similar manner to discriminate between the wind turbines (which remain at substantially the same azimuth angle) and an object moving tangentially across the holographic radar's field of view with little or no radial velocity component.

It will also be appreciated that a wind turbine may appear in more than one range bin (or at more than one azimuth angle) (e.g. by virtue of the movement of the blades and/or rotation to face the wind) but will not move beyond a limited selection of ranges (or azimuth angles). Accordingly the classification algorithm may be adapted to take such situations into account.

In another version of this embodiment the identification of wind turbines is further enhanced by analysing the Doppler spread history of the detected targets. In this case not only is a target identified as an object such as a wind turbine based on the instantaneous spread of Doppler at a particular time but also on the evolution of the Doppler spread with respect to time. For example, if a detected target is seen to occupy a large number of Doppler bins (e.g. exceeding the Doppler spread threshold) and then fewer (or even zero) Doppler bins on a periodic basis it may be identified as a rotating object such as a wind turbine. Where the turbines to be viewed by the holographic radar are well characterised the Doppler evolution based classification algorithm may be more sophisticated allowing turbines to be identified even more accurately. For example, the algorithm may be adapted to identify a target to be a wind turbine if the set of Doppler frequencies characterising the object develop in accordance with a predefined mathematical model or function (e.g. comprising a sinusoidal, logarithmic, quadratic, and/or exponential, model or function). As a further example, by comparing the spread of Doppler frequencies (which is a measure of the speed of the fastest points on the clutter object, or the blade tip for a wind turbine) with the interval of repetition of the 'flashes', the length of the turbine blade may be inferred.

The holographic radar is also configured to positively identify a detected target as a target of interest (or a potential target of interest) if the detected target appears, or consistently appears in fewer than a further Doppler spread threshold comprising predetermined number (or proportion) of the available Doppler bins (referred to herein as the 'Doppler ceiling'). The Doppler ceiling threshold below which an object is classified as a target of interest (or a potential target of interest) such as an aircraft may be any suitable number (or proportion) of Doppler bins typically, for example, anywhere between a single Doppler bin and 25% of the available Doppler bins (e.g. 1%, 2%, 3% 5%, 10%, 20%, or 25%) of the available bins depending in particular on the expected nature of the targets of interest and also on the nature of expected (e.g. wind turbine related) clutter. An object identified and classified as a target of interest (or a potential target of interest) in this manner may then be subject to subsequent threat analysis.

It will be appreciated that these classification/identification/discrimination techniques may be used in conjunction with other such techniques to further enhance the accuracy of discrimination between interfering objects such as wind turbines and targets of interest and to enhance threat analysis once a target of interest is identified. For example, the techniques may be enhanced based on the elevation and/or azimuth angles at which the targets appear, the historical position of the target (e.g. the target's track), the direction a target is moving (e.g. the target's trajectory), the target's acceleration or the like.

Thus, under these conditions the use of this type of radar (operating subject to the holographic radar limit) can provide a potential improvement in the region of 100:1 or even better in terms of the detectability of an aircraft in the presence of a wind turbine or wind farm.

Fresnel Zone Clutter De-Emphasis

As described above, unlike a scanning radar, a holographic radar operating under the holographic limit can be configured to successfully discriminate between wind farm induced radar returns (which may be thought of as wind farm clutter 'WFC' or wind turbine clutter 'WTC'), including returns associated with rotating blades, even when the radar is located within the vicinity of a wind farm. Specifically, the holographic radar is operable to successfully identify and mitigate against substantially all wind farm induced clutter, and to successfully detect and track targets of interest, even at a proximity for which other radar systems (such as scanning radar) would not be able to detect targets of interest or would not be able to detect and track them with the degree of accuracy and consistency required (e.g. for accurate and hence safe air surveillance).

Configuration of a holographic radar to detect and identify radar returns from interfering objects such as wind turbines when the holographic radar is located at a relatively close proximity to the turbine provides additional surprising secondary benefits. Specifically, location of a holographic radar in the vicinity of a wind turbine has the potential to provide unexpected improvements in the accuracy and efficiency with which the returns from the turbine can be discriminated from returns induced by targets of interest, even when compared with a similar holographic radar located, and configured to operate at, a greater distance from the turbines.

To illustrate the benefits of locating the radar at close proximity, the situation in which there is a large distance between a target and a radar transmitter/receiver will first be considered. At these distances the effective radar cross-section 'a' of the target can generally be assumed to be constant with respect to range.

The assumption that radar cross-section remains constant, however, only holds when the signals returned from the target exhibit phase deviations that are determined by the local geometry of the target rather than by the radius of curvature of the incident wavefront. At these distances the radar waves incident on the target can be approximated as a plane-wave (for which the source would effectively be at infinity) and hence the phase deviation across the entire target will be dominated by the target geometry.

In the case of wind turbines the effective radar cross-section at long-distances is very large, partly because the turbine tower and the blades are themselves large, and partly because the beam reflected by the tower and/or blade is generally very narrow in the plane containing the reflector. The beam width reflected from the blade, for example, is dependent on the blade's curvature which is generally small thereby resulting in a narrow beam and large effective radar cross-section, and on its length, which defines a narrow diffraction pattern at the wavelength of operation of the radar (which may be between 1 and 30 cm). Hence, the tower and/or blade appear as a high cross-section reflector at such long distances.

Contrastingly, even though targets that are of interest such as aircraft may have large features such as fuselage and wing, they must be detectable when they are at a disadvantageous orientation (e.g. heading towards the radar). At such orientations the effective radar cross-section of an aircraft can be predominantly determined by scattering from features with smaller radii of curvature (such as corners between wing and fuselage, engine nacelles, etc.). Hence the effective cross-section of an aircraft, relative to that of a wind turbine, can be very small making it more difficult to identify the aircraft when the radar has to look past a wind farm (or even an individual turbine) to see it. In such situations conventional scanning radar can become effectively swamped by the returns from the turbines.

When a radar transmitter/receiver is closer to a target such as a wind turbine, however, the curvature of the incident wave becomes significant, the plane-wave approximation is therefore no longer applicable, and the phase deviation of the returns from a larger target cannot be assumed to be negligible. When the radar is particularly close to the target, for example, the returns from across the target begin to exhibit a phase deviation in excess of 180° (half a wavelength difference). The distance between a target and the radar at which this occurs will be referred to herein as the 'proximity limit'.

In the case of targets such as aircraft the radar cross-section is much less sensitive to the curvature of the incident wave even within the proximity limit because the less regular features of an aircraft can make the radar cross-section much less dependent on distance (and even effectively independent of distance). This is because even at relatively short distances the radii of curvature of the features themselves can be the dominant contributor to the radar cross-section.

The proximity limit '$D_p$' may be determined by considering the extent of a hypothetical ellipsoid of revolution (having a circular cross-section sometimes referred to as the First Fresnel zone or simply the Fresnel zone) extending from the radar transmitter towards a target, and within which a target will exhibit a phase deviation of less than 180°. The radius '$r_F$' (the Fresnel radius) of the circular cross-section of the ellipsoid at the target depends on the wavelength of the transmitted signal '$\lambda$' and the distance 'D' between the target and the transmitter as follows:

$$r_F \approx \sqrt{\frac{\lambda D}{2}}$$

When a target is at the proximity limit $D_p$, therefore, the extent of the Fresnel zone at the proximity limit will substantially coincide with the extent of the target. Thus, for a circular target of radius $r_{tg}$:

$$D_p \approx \frac{2}{\lambda} r_{tg}^2$$

When a radar is located within the proximity limit the large phase deviation of the returns effectively causes a reduction in the radar cross-section as seen by the radar receiver.

Accordingly, another embodiment of the holographic radar in which this principle is advantageously applied is illustrated in FIG. 18 generally at 500. The radar 500 comprises transmitter and receiver arrays 502 and radar control and analysis unit 504 including a transmitter controller and a receiver signal processor. The transmitter and receiver arrays 502, the transmitter controller and the receiver signal processor are generally as described for any of the other embodiments and will not be described again in detail.

The radar 500 is configured to illuminate a region including a wind farm 506, to receive and analyse signals returned from within the region, and to discriminate between signals returned from wind turbines and signals returned from other targets (such as aircraft) generally as described previously. The radar 500 is shown as a standalone radar in FIG. 18 and can be used as such. It will be appreciated, however, that the radar 500 may form part of an in-fill radar system as described earlier.

The radar transmitter and receiver arrays are located at a distance 'D' from the wind turbines of the wind farm. The distance 'D' is selected to be within the proximity limit of the turbine blades of the furthest wind turbine. Specifically, where $L_B$ is the length of each blade (assuming all turbines in the farm are of the same size), the distance from the furthest turbine blade '$D_{max}$' (at which distance the Fresnel radius is $r_{Fmax}$) may be selected based on the following design inequality:

$$D_{max} \le D_p \therefore D_{max} \le \frac{2}{\lambda} L_B^2$$

Hence, the extent of the Fresnel zone 508 at the wind turbine 510 furthest from the radar is no greater than the length of the turbine's blade. Accordingly, the extent of the Fresnel zone 508' at closer wind turbines 512 is even smaller.

It will be appreciated that wind farms may be very large and in those cases it may not be possible for the radar transmitter and receiver arrays to be located within the proximity limit of all the wind turbines. In this case the distance '$D_{max}$' will be selected for the furthest wind turbine, within the radar's field of view, for which the proximity inequality can be met. Accordingly, the distance '$D_{max}$' may be selected to maximise the proportion of the turbines within the field of view having a proximity limit '$D_p$' at or beyond the transmitter/receiver array.

It will be further appreciated that the holographic radar may comprise a plurality of transmitter/receiver arrays arranged and configured to operate as part of an integrated system (as described for other embodiments), and such that each wind turbine (or each of a substantial proportion of the wind turbines) at the wind farm are within the field of view of at least one transmitter/receiver array which is within its respective proximity limit.

The effective radar cross-section of the turbine blade is thus significantly reduced when compared with radar located at a distance for which the Fresnel zone extends over the whole length of the tower or blade (i.e. when the incident wave approximates a plane wave with a source effectively at infinity) leading to a very narrow, high-gain, reflected beam (and hence large effective cross-section). For example, if the transmitter/receiver is at approximately 1 km from the turbine, and if the half-wavelength of the transmitted signal is approximately 0.25 m, the radius of the Fresnel zone will be approximately 15 meters. Using these design parameters, therefore, the effective radar cross-section for a 30 m blade length (as seen by the receiver) will be reduced by a factor of approximately four relative to the long distance value of the cross-section.

As with the previously described embodiments, the receiver signal processor is configured to operate, at the distance within the proximity limit, to correctly detect and identify wind turbines and other targets by successfully discriminating between the radar returns from them. The accuracy of this process can therefore be enhanced because of the reduced effective radar cross-section of the wind turbines when compared to other generally smaller radar cross-section targets, such as aircraft. Thus, targets of interest, and in particular targets which may represent a threat, can be rendered easier to detect by appropriate configuration of the holographic radar to operate within the proximity limit of the wind-farm.

It will be appreciated that a radar configured to operate within the proximity limit could be located at the wind farm itself (as described previously) or at a distance from it (as exemplified in this embodiment) which is still within the proximity limit.

Advantageously, the holographic radar of this embodiment is configured to operate within the proximity limit as close to the turbines of the wind farm as reasonably possible (to minimise the observed radar cross-section) whilst ensuring that the field of view of the (or each) radar transmitter/receiver array covers all the turbines for which detection and discrimination via the receiver array are required (and is not obscured for example by a turbine tower).

Holographic Radar for Large and Small Turbine Arrays

In some wind turbine installations, a turbine array forming a wind farm may extend a distance which is comparable with the height to which it is necessary to detect and identify targets such as aircraft. In such cases it is particularly advantageous for the holographic radar to cover the entire area of the turbine array.

An embodiment of holographic radar suitable for covering the entire area of a large turbine array is shown illustratively in FIG. 19 generally at 600. The holographic radar is configured generally as described for previous embodiments and, like previous embodiments can be configured as a stand-alone radar or as part of an in fill radar system. In this embodiment, however, the holographic radar comprises transmitter/receiver arrays 602 comprising four substantially planar antenna faces, pointing just above the horizon (for example between ~5° and ~45°, typically ~20° or 30°) and in four orthogonal directions in azimuth (thereby covering substantially the entire field of view).

Whilst FIG. 19 shows the antenna arrays 602 physically pointing above the horizon it will be appreciated that a similar effect could be achieved by steering the transmitter/receiver beams appropriately from a substantially horizontally pointing array. It will also be appreciated that whilst turbine towers provide an advantageous location for siting the transmitter/receiver arrays, the arrays could be sited in any suitable manner including, for example, facing across the wind farm from locations at or beyond its extremities (for example within the proximity limit described previously) as opposed to from within the wind farm facing outwardly. Furthermore, the transmitter/receiver arrays could be located on any suitable structure, for example an electrical sub-station building at or in the vicinity of the wind farm.

In other cases a wind farm may be very small comprising only a few wind turbines or even a single turbine. However, even a single turbine represents a potential hazard to the successful and safe operation of air traffic control or air defence radar.

Vertically Facing Radar

An embodiment of the holographic radar which is particularly advantageous for a small array/single turbine is shown in FIG. 20 generally at 650. The holographic radar 650 is configured generally as described for previous embodiments. In this embodiment, however, the holographic radar 650 comprises at least one transmitter/receiver array 652 facing in substantially a vertical direction as opposed to just above the horizon. The holographic radar in this case is configured for the detection of a target 658 (such as an aircraft) flying in a generally conical region 654 extending outwardly above a single turbine 656 (or small wind turbine array).

It will be appreciated that although a substantially vertical direction is described for this embodiment, the upwardly facing receiver array could be arranged to face at any angle between about 45° and 90°, to give a field of view extending both vertically and towards the horizon. A receiver array that is arranged at such an angle may form part of a wider radar system comprising a plurality of similar receiver arrays configured to provide an upwardly pointing field of view in different directions around the single turbine/wind farm. For example, a similar arrangement to that shown in FIG. 19 may be employed in which each of the four receiver arrays point at an angle of at least 45°.

Thus, the holographic radar in this embodiment is different to conventional arrangements for air surveillance radars which look outwardly at the horizon to detect an incoming target such as aircraft early so that it can be tracked and, if necessary, pre-emptive action taken (such as warning other aircraft in the vicinity, raising a threat level etc.) as soon as possible.

Whilst this embodiment can be configured as a stand-alone radar in a particularly advantageous configuration it is configured as an in fill radar for a larger air traffic control, air defence or other surveillance system as described previously.

The holographic radar of this embodiment may be integrated with a holographic radar according to the previous embodiment. In such an embodiment the radar may be configured to survey a combined region extending upwardly from the vertically facing array (as described for this embodiment) and outwardly from the arrays facing just above the horizon (as described for the previous embodiment). This beneficial arrangement allows the roughly conical region above the wind farm, which is not covered by the horizon pointing arrays, effectively to be 'filled in' by the vertically facing array. Such a system thus provides a beneficial arrangement for tracking an approaching target, such as an aircraft, both as it approaches and as it flies directly over a wind farm (large or small).

Time-Frequency Transformation and Beamforming

Figure 21:
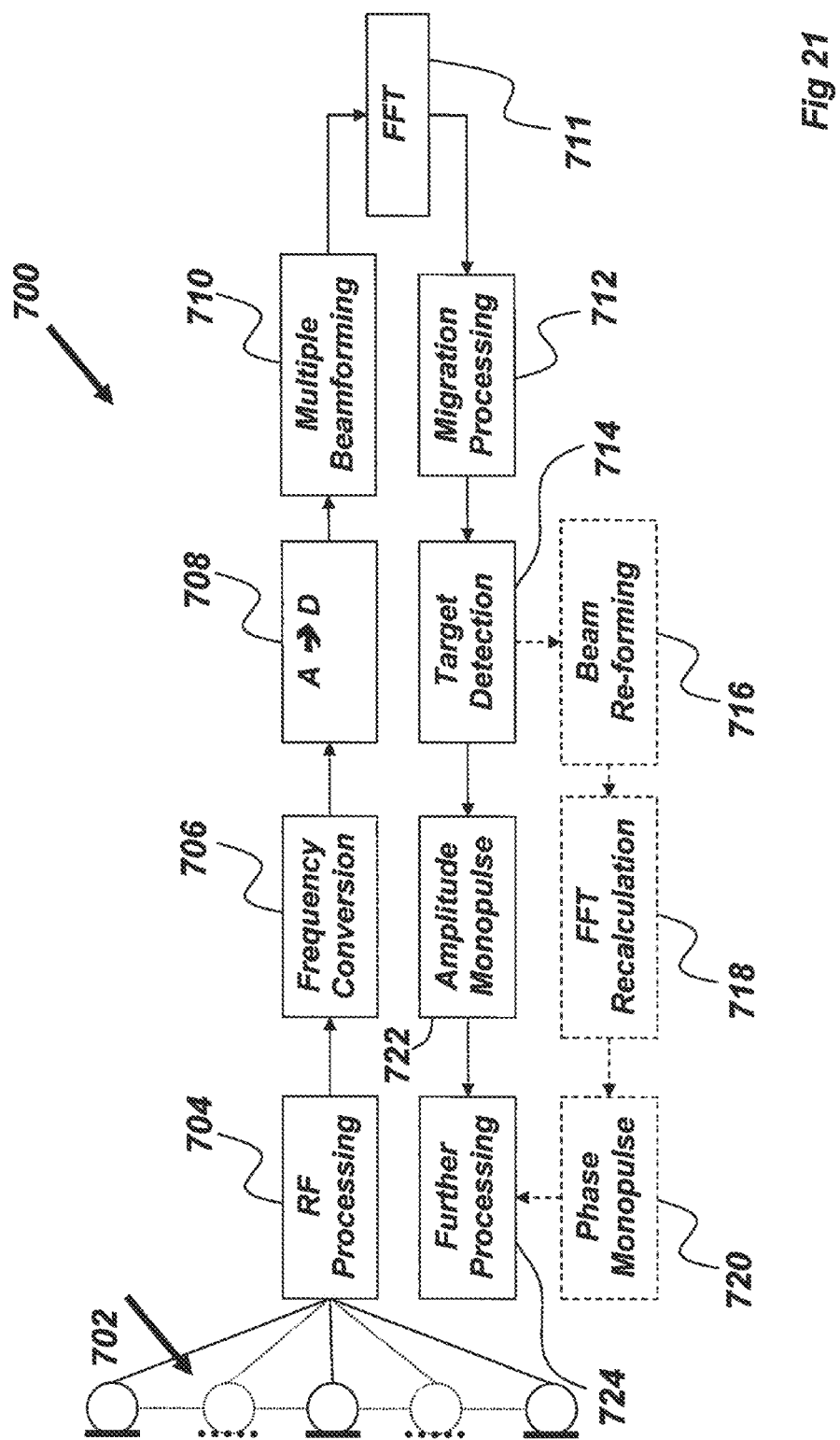
FIG. 21 shows a simplified functional block diagram of a first exemplary receiver for use with an embodiment of holographic radar as herein described.

In FIG. 21 a functional block diagram of circuitry/signal processing modules suitable for implementing the receiver signal processor referred to in any other embodiment is shown generally at 700. In this embodiment signals are received by the receiver elements of a receiver array 702 (which may be any of the receiver arrays generally as described previously). The signals received by the receiver array 702 receive preliminary RF processing by an RF processing circuit/module 704 prior being transformed in frequency to an intermediate frequency by an IF generation circuit/module 706. The analogue outputs of the IF circuit are converted to digital outputs by an analogue to digital (A-D) converter circuit/module 708.

It will be appreciated that although this embodiment is described with reference to receiver 'elements' the description is also generally applicable to the case of receiver sub-arrays each comprising a plurality of elements (as described previously).

A digital beamformer 710 (typically comprising an appropriate signal processing circuit or software module) forms multiple beams substantially concurrently (for example, one for each element), in the desired directions, from the outputs of the A-D converter 708 using appropriate phase and/or amplitude weightings. It will be appreciated that although a digital beamforming circuit/module is described (and shown in FIG. 21) the beams may be formed prior to analogue to digital conversion at the RF or IF stage using appropriate analogue beamforming circuitry, for example circuitry comprising phase modulators.

The beam outputs from the beam former 710 are then subject to various forms of signal processing to support the detection and tracking of targets, which generally includes a form of Fast Fourier Transform (FFT). The signal processing will now be described, by way of example only, with reference to a specific holographic radar example in which the receiver comprises an array of 288 elements, the radar is configured to detect targets in 256 range bins at a range gate rate of 2.56 MHz, and the FFT is of 1024 points. It will be appreciated, however, that other configurations are possible, for example, in which the radar receiver has a different number of receiving elements, is configured to detect targets in a different number of range bins and/or at a different range gate rate. Similarly the FFT may be of any suitable number of points.

For a receiver array of 288 elements approximately 288 beams are generated by the beam former 710 which may be a randomly programmable beam former. Accordingly, for a randomly programmable beam former, the beam will generally complete four multiplication operations per element, per beam at the range gate rate. This equates to approximately 0.85 Tera-operations per second (288 elements×288 beams×4 operations per beam per element×2.56 MHz range gate rate). Alternatively a Fourier Transform process may be used to form a regular series of beams (e.g. cosecant-evenly-spaced) more efficiently.

An FFT module 711 is configured to carry out complex FFTs on the beams. In this example the FFTs are carried out at approximately 10 Hz for a 10.24 kHz pulse rate although it will be appreciated that the FFTs may be carried out at other frequencies for other pulse rates. This equates to approximately 20 Giga-operations per second (256 range bins×288 beams×10 Hz FFT rate×4 operations per beam per range bin×1024 points in the FFT×ln(1024)).

A migration processing module 712 is configured to form a migration surface (e.g. a rang/range rate surface) for each beam and range and range rate sub-beams are formed using the FFT elementary outputs.

A target detection module 714 is configured to detect any targets in one or more of the migration surfaces and a positioning module 722 is configured to determine the position of each detected target using amplitude monopulse measurements in each beam. Further processing is then carried out as indicated at 724, for example, to store target information, to identify wind farm related clutter, to classify targets of interest etc.

It will be appreciated that positioning could be carried out more accurately using phase monopulse measurements as indicated in the alternative branch 716, 718, 720. However, this approach can be resource intensive as it requires the beams to be reformed by module 716 (which may be the beam former 710 or part thereof) and hence the FFTs to be recalculated by module 718 (which may be the FFT module 711 or part thereof) before a positioning module 720 can calculate the position of the detected target using phase monopulse.

Time-Frequency Transformation Prior to Beamforming

Figure 22:
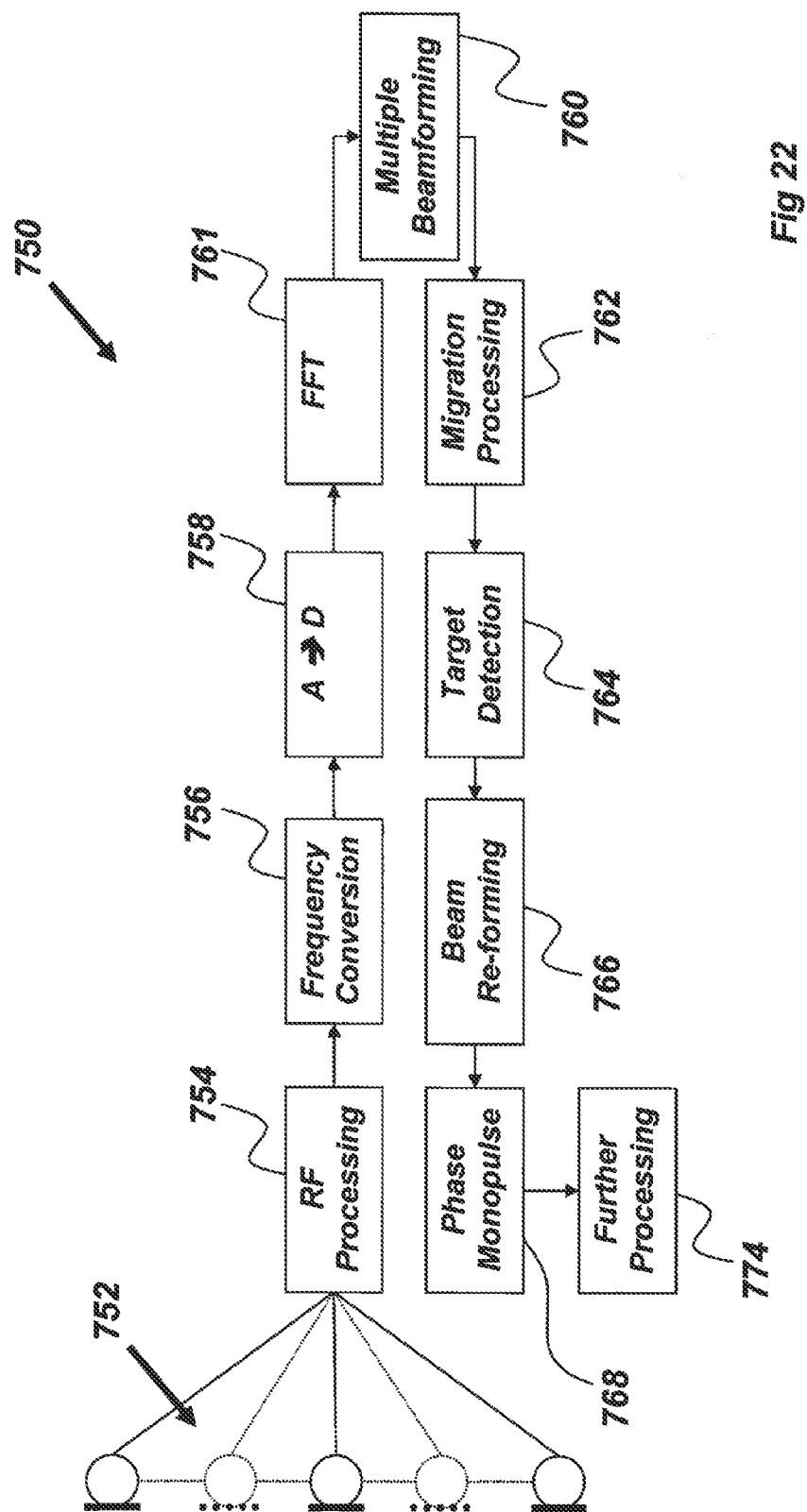
FIG. 22 shows a simplified functional block diagram of a second exemplary receiver for use with an embodiment of holographic radar as herein described.

In FIG. 22 a functional block diagram of alternative circuitry/signal processing modules suitable for implementing the receiver signal processor referred to in any other embodiment is shown generally at 750. As with the previous embodiment, in this embodiment signals are received by the receiver elements of a receiver array 752 (which may be any of the receiver arrays generally as described previously). The signals received by the receiver array 752 receive preliminary RF processing by an RF processing circuit/module 754 prior being transformed in frequency to an intermediate frequency by an IF generation circuit/module 756. The analogue outputs of the IF circuit are converted to digital outputs by an analogue to digital (A-D) converter circuit/module 758.

Unlike the previous module, however, complex FFTs are then carried out on the outputs of the A-D converter 758 by an FFT module 761, prior to beam formation. For FFTs carried out at approximately 10 Hz (for a 10.24 kHz pulse rate) this equates to approximately 20 Giga-operations per second as calculated previously (256 range bins×288 elements×10 Hz FFT rate×4 operations per element per range bin×1024 points in the FFT×ln(1024)). Thus the FFT's form a migration filter for each element prior to beam forming.

A beam former 760 then forms multiple concurrent beams, in the frequency domain, in the desired directions, from the FFT outputs using appropriate phase and/or amplitude weightings. Typically, for example, the beam former 760 will first form 'fan-in-elevation' azimuth beams before forming the elevation beams. In the case of a randomly programmable beam former, the beam former will generally complete approximately 0.87 Tera-operations per second (288 elements×288 beams×256 range gates×4 operations per beam per element per range gate×10 Hz FFT rate×1024 FFT points). Alternatively a Fourier Transform process may be used to form a regular series of beams more efficiently as discussed previously.

A migration processing module 762 is configured to form beam migration surfaces (e.g. range/range rate surfaces) for each beam, and a target detection module 764 is configured to detect any targets in one or more of the migration surfaces, as generally as described previously. In this embodiment, however, a positioning module 762 is configured to determine the position of each detected target using phase (as opposed to amplitude) monopulse measurements. Whilst this still requires the beams to be re-formed it does not require the recalculation of the FFTs that would be the case if the previous embodiment were adapted to calculate position using phase monopulse measurements. Accordingly, the beams are reformed (either different FFT beams, or beam pairs with known coefficients) by module 766 (which may be the beam former 760 or part thereof) based on stored outputs of the FFT module 761 without requiring resource intensive recalculation.

The use of phase monopulse can be advantageous over the use of amplitude monopulse because it is easier to calibrate (for such receiver arrays), being an element-oriented single parameter, rather than a beam-oriented 2-D plot. Phase monopulse measurements are also generally more accurate than amplitude monopulse measurements.

It will be appreciated that although the embodiments described herein are described primarily with reference to wind turbines, wind farms and the like the radar systems, methods and associated apparatus has many other applications including application in other cluttered and highly cluttered environments as described previously. In the context of wind farms it will be appreciated that the holographic radar (as described herein) may be used for analysing wake effects of turbines and in particular wind-wake effects especially for use in maximising the energy generation potential of a wind farm.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Statements in this specification of the "objects of the invention" relate to preferred embodiments of the invention, but not necessarily to all embodiments of the invention falling within the claims. Reference numerals appearing in the claims are illustrative only and the claims shall be interpreted as if they are not present.

The description of the invention with reference to the drawings is by way of example only.

What is claimed is:

1. A radar system for discriminating between sources of radar interference and targets of interest, the system comprising: a transmitter operable to transmit radar signals into a region; a receiver operable to receive return signals of said radar signals returned from within said region; and a processor operable to process the return signals to discriminate between return signals returned from a first object comprising a target of interest and return signals returned from a second object comprising a source of radar interference wherein said return signals from said objects comprise Doppler components; wherein said processor is operable for transforming said return signals from a time domain into a frequency domain and for discriminating between said return signals in dependence on the manner in which a spectral spread of Doppler components, including both phase and amplitude of each Doppler component, exhibited by said return signals from either targets of interest or from radar interference changes, in said frequency domain, progressively with time; and wherein said processor is operable to process said signals at a resolution, of at least 100 Doppler bins to be sufficient, when at least one of said first object and said second object comprises a rotating element, to characterize the manner in which the spectral spread of Doppler components exhibited by return signals from said rotating element changes progressively, and cyclically, within each period of rotation thereby discriminating between said first and second objects.

2. A radar system according to claim 1, wherein said processor is operable to determine that said return signals are returned from said second object if said Doppler components comprise a plurality of components at a plurality of locations across a pre-defined Doppler spectrum.

3. A radar system according to claim 1, wherein said processor is operable to determine that said return signals are returned from said first object if said Doppler components comprise a localised part of a pre-defined Doppler spectrum.

4. A radar system according to claim 1, wherein said processor is operable to place at least one of said Doppler components into at least one of a plurality of discrete Doppler bins and to discriminate between said return signals in dependence on the or each Doppler bin in which said at least one of said Doppler components is located.

5. A radar system according to claim 4, wherein said processor is operable to determine that said return signals are returned from said second object if said at least one of Doppler components of said return signal comprises a plurality of Doppler components located in a number of said plurality of Doppler bins which is not less then a first predetermined threshold.

6. A radar system according to claim 5, wherein said number of Doppler bins and said first threshold are each a proportion of said Doppler bins.

7. A radar system according to claim 6, wherein said first threshold comprises a threshold between 5% and 100% of the plurality of Doppler bins.

8. A radar system according to claim 4, wherein said processor is operable to determine that said return signals are returned from said first object if said at least one of Doppler components of said return signal is located in a number of Doppler bins which does not exceed a second predetermined threshold.

9. A radar system according to claim 8, wherein said number of Doppler bins and said second threshold are each a proportion of said Doppler bins.

10. A radar system according to claim 9, wherein said second threshold comprises any of a single Doppler bin to 1%, 2%, 5% or up to 25% of the plurality of Doppler bins.

11. A radar system according to claim 8, wherein said number of Doppler bins represents a target of interest comprising an environmental target.

12. A radar system according to claim 1, wherein said processor is operable to discriminate between said return signals in dependence on the conformity of said manner in which a spectral spread of Doppler components exhibited by said return signals changes progressively with a model or function.

13. A radar system according to claim 12, wherein said model or function comprises a sinusoidal, exponential, quadratic, and/or logarithmic model or function.

14. A radar system according to claim 1, wherein said system comprises a range determiner for determining a range of said objects based on said return signals, and wherein said processor is further operable to discriminate between said return signals in dependence on a change in said determined range of the objects over time.

15. A radar system according to claim 14, wherein said processor is operable to determine that said return signals are returned from said first object if said range changes over a time period.

16. A radar system according to claim 14, wherein said processor is operable to determine that said return signals are returned from said second object if said range remains substantially constant over a time period.

17. A method of discriminating between sources of radar interference and targets of interest, the method comprising: transmitting radar signals into a region; receiving return signals of said radar signals returned from within said region; and processing the return signals to transform said return signals from a time domain into a frequency domain and to discriminate between return signals returned from a first object comprising a target of interest and return signals returned from a second object comprising a source of radar interference wherein said return signals from said objects comprise Doppler components; wherein said processing comprises discriminating between said return signals in dependence on the manner in which a spectral spread of Doppler components, including both phase and amplitude of each Doppler component, exhibited by said return signals from either targets of interest or from radar interference changes, in said frequency domain, progressively with time; and wherein said processing step comprises processing said signals at a resolution, of at least 100 Doppler bins to be sufficient, when at least one of said first object and said second object comprises a rotating element, to characterize the manner in which the spectral spread of Doppler components exhibited by return signals from said rotating element changes progressively, and cyclically, within each period of rotation thereby discriminating between said first and second objects.

* * * * *